US012449899B2

(12) United States Patent
VanWyk et al.

(10) Patent No.: US 12,449,899 B2
(45) Date of Patent: Oct. 21, 2025

(54) TECHNIQUES FOR SELECTING SKIN-ELECTRODE INTERFACE MODULATION MODES BASED ON SENSITIVITY REQUIREMENTS AND PROVIDING ADJUSTMENTS AT THE SKIN-ELECTRODE INTERFACE TO ACHIEVE DESIRED SENSITIVITY NEEDS AND SYSTEMS AND METHODS OF USE THEREOF

(71) Applicant: Meta Platforms Technologies, LLC, Menlo Park, CA (US)

(72) Inventors: Eric VanWyk, Seattle, WA (US); Filipp Demenschonok, Bothell, WA (US); Pinghung Wei, Kirkland, WA (US); Brendan Patrick Flynn, Redmond, WA (US); Zidong Li, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/395,323

(22) Filed: Dec. 22, 2023

(65) Prior Publication Data

US 2024/0211045 A1  Jun. 27, 2024

Related U.S. Application Data

(60) Provisional application No. 63/497,387, filed on Apr. 20, 2023, provisional application No. 63/476,901, filed on Dec. 22, 2022.

(51) Int. Cl.
G06F 3/01 (2006.01)
G06F 11/30 (2006.01)

(52) U.S. Cl.
CPC .......... G06F 3/015 (2013.01); G06F 11/3041 (2013.01); G06F 11/3058 (2013.01); *G06F 3/017* (2013.01); *G06F 2201/86* (2013.01)

(58) Field of Classification Search
CPC ............ G06F 11/3041; G06F 11/3058; G06F 2201/86; G06F 3/015; G06F 3/017
See application file for complete search history.

(56) References Cited

U.S. PATENT DOCUMENTS

2013/0127708 A1* 5/2013 Jung ...................... A61B 5/291
345/156
2014/0267002 A1* 9/2014 Luna ..................... G06F 1/1698
345/156

(Continued)

*Primary Examiner* — Chun-Nan Lin
(74) *Attorney, Agent, or Firm* — Morgan, Lewis & Bockius LLP

(57) ABSTRACT

An apparatus, system, and method of reducing and controlling values of at least one characteristic (e.g., impedance) associated with biopotential-signal sensors is provided. The apparatus, system, and method includes monitoring—based on data from a wearable device that includes a biopotential-signal sensor, a characteristic-stabilizing component, and a characteristic monitor—a characteristic at the sensor-skin interface that impacts the biopotential-signal sensor's ability to sense biopotential signals. In accordance with selecting a biopotential-signal sensitivity need, provide an adjustment (e.g., stimulation) to the characteristic in accordance with a sensitivity-stabilizing mode until the characteristic satisfies the first biopotential-signal sensitivity need. The adjustments may be provided in various methods to achieve desired results.

20 Claims, 27 Drawing Sheets

(56) References Cited

U.S. PATENT DOCUMENTS

| | | | |
|---|---|---|---|
| 2016/0299570 A1* | 10/2016 | Davydov | G06F 3/167 |
| 2018/0001184 A1* | 1/2018 | Tran | G16H 50/20 |
| 2020/0038653 A1* | 2/2020 | Sitaram | A61N 1/36003 |
| 2020/0350787 A1* | 11/2020 | Enderlin | H01F 38/14 |
| 2021/0041953 A1* | 2/2021 | Poltorak | H04W 4/80 |
| 2021/0141444 A1* | 5/2021 | Speelman | G02B 27/017 |
| 2021/0286429 A1* | 9/2021 | Azemi | G06N 3/045 |
| 2023/0012960 A1* | 1/2023 | Krishnan | G16H 20/30 |
| 2023/0055264 A1* | 2/2023 | Bailey | G06F 3/015 |
| 2023/0073303 A1* | 3/2023 | Bailey | G06F 3/015 |
| 2024/0115202 A1* | 4/2024 | Tran | A61B 5/002 |

* cited by examiner

| Skin Interface | Impedance Line | Impedance Values | |
|---|---|---|---|
| | | $t_4$ | $t_5$ |
| 330 | 350 ·········· | 500 | 485 |
| 332 | 352 ———— | 490 | 475 |
| 334 | 354 – – – – | 480 | 465 |

| Skin Interface | Impedance Line | Impedance Values ||||
|---|---|---|---|---|---|
| | | $t_4$ | $t_5$ | $t_6$ | $t_7$ |
| 330 | 350 | 500 | 485 | 190 | 230 |
| 332 | 352 | 490 | 475 | 160 | 215 |
| 334 | 354 | 480 | 465 | 140 | 160 |

| Skin Interface | Impedance Line | Impedance Values ||||||
|---|---|---|---|---|---|---|---|
| | | $t_4$ | $t_5$ | $t_6$ | $t_7$ | $t_8$ | $t_9$ |
| 330 | 350 ········ | 500 | 485 | 190 | 230 | 170 | 215 |
| 332 | 352 ——— | 490 | 475 | 160 | 215 | 145 | 165 |
| 334 | 354 -------- | 480 | 465 | 140 | 160 | 150 | 155 |

| Skin Interface | Impedance Line | Impedance Values |||||||
|---|---|---|---|---|---|---|---|---|
| | | $t_4$ | $t_5$ | $t_6$ | $t_7$ | $t_8$ | $t_9$ | $t_{10}$ | $t_{11}$ |
| 330 | 350 ········ | 500 | 485 | 190 | 230 | 170 | 215 | 130 | 140 |
| 332 | 352 ——— | 490 | 475 | 160 | 215 | 145 | 165 | 155 | 160 |
| 334 | 354 -------- | 480 | 465 | 140 | 160 | 150 | 155 | 145 | 150 |

```
                    ┌─────────────────────┐
                    │  1002 Device Worn   │
                    └─────────────────────┘
                              ↓
┌──────────────────────────────────────────────────────────────┐
│ 1004 while bipotential signals from a first biopotential-    │
│ signal sensor of a wearable device are used to determine     │
│ gestures directed towards a first application                │
│  ┌────────────────────────────────────────────────────────┐  │
│  │ 1006 select a first biopotential-signal sensitivity    │  │
│  │ need for the first application                         │  │
│  └────────────────────────────────────────────────────────┘  │
│  ┌────────────────────────────────────────────────────────┐  │
│  │ 1008 provide a first adjustment to a first             │  │
│  │ characteristic at the sensor-skin interface in         │  │
│  │ accordance with a first sensitivity-stabilizing mode   │  │
│  │ until the characteristic satisfies the first           │  │
│  │ biopotential-signal sensitivity need                   │  │
│  └────────────────────────────────────────────────────────┘  │
└──────────────────────────────────────────────────────────────┘
                              ↓
┌──────────────────────────────────────────────────────────────┐
│ 1010 while bipotential signals from the first biopotential-  │
│ signal sensor of a wearable device are used to determine     │
│ gestures directed towards a second application               │
│  ┌────────────────────────────────────────────────────────┐  │
│  │ 1012 select a second biopotential-signal sensitivity   │  │
│  │ need for the second application                        │  │
│  └────────────────────────────────────────────────────────┘  │
│  ┌────────────────────────────────────────────────────────┐  │
│  │ 1014 provide a second adjustment to the characteristic │  │
│  │ at the sensor-skin interface in accordance with a      │  │
│  │ second sensitivity-stabilizing mode until the          │  │
│  │ characteristic satisfies the second biopotential-      │  │
│  │ signal sensitivity need                                │  │
│  └────────────────────────────────────────────────────────┘  │
└──────────────────────────────────────────────────────────────┘
                              ↓
┌──────────────────────────────────────────────────────────────┐
│ 1030 while bipotential signals from a second biopotential-   │
│ signal sensor of a wearable device are used to determine     │
│ gestures directed towards a third application                │
│  ┌────────────────────────────────────────────────────────┐  │
│  │ 1032 select a third biopotential-signal sensitivity    │  │
│  │ need for the third application                         │  │
│  └────────────────────────────────────────────────────────┘  │
│  ┌────────────────────────────────────────────────────────┐  │
│  │ 1034 provide a third adjustment to a second            │  │
│  │ characteristic at a second sensor-skin interface in    │  │
│  │ accordance with a third sensitivity-stabilizing mode   │  │
│  │ until the second characteristic satisfies the third    │  │
│  │ biopotential-signal sensitivity need                   │  │
│  └────────────────────────────────────────────────────────┘  │
└──────────────────────────────────────────────────────────────┘
                              ↓
              ┌───────────────────────────────────┐
              │ 1016 Sensitivity stabilizing      │
              │ complete                          │
              └───────────────────────────────────┘
```

Figure 10D

TECHNIQUES FOR SELECTING SKIN-ELECTRODE INTERFACE MODULATION MODES BASED ON SENSITIVITY REQUIREMENTS AND PROVIDING ADJUSTMENTS AT THE SKIN-ELECTRODE INTERFACE TO ACHIEVE DESIRED SENSITIVITY NEEDS AND SYSTEMS AND METHODS OF USE THEREOF

CROSS-REFERENCE TO RELATED APPLICATIONS

This application claims the benefit of U.S. Provisional Patent Application Ser. No. 63/476,901, filed Dec. 22, 2022, entitled "Electrode Stimulation At An Electrode-Skin Interface To Quickly Achieve Stable And Desirably Low Impedance Values," and claims the benefit of U.S. Provisional Patent Application Ser. No. 63/497,387, filed Apr. 20, 2023, entitled "Techniques For Selecting Skin-Electrode Interface Modulation Modes Based On Sensitivity Requirements And Providing Adjustments At The Skin-Electrode Interface To Achieve Desired Sensitivity Needs And Systems And Methods Of Use Thereof," each of which is hereby fully incorporated by reference in its respective entirety.

TECHNICAL FIELD

The present disclosure relates generally to sensing-stabilization techniques used by systems including wearable devices for sensing biopotential signals (e.g., electromyography (EMG), electroencephalography (EEG), or electrocardiography (EKG) signals that may be used to determine motor actions that the user intends to perform with their hand), and, more particularly, to applying a stimulation to (which may also be understood as directing a stimulation towards) a sensor-skin interface associated with a biopotential-signal sensor to quickly reduce and maintain desired impedances (e.g., to keep the sensor's electrode-skin impedance within a desired range and/or to match the sensor's impedance with impedances at one or more other biopotential-signal sensors). The disclosure also relates generally to selecting a biopotential-signal sensitivity need (e.g., which may correspond to a certain level of impedance, skin hydration, or other characteristic associated with a sensor-skin interface) for an application, and providing an adjustment (or stimulation) to the characteristic at the sensor-skin interface in accordance with a sensitivity-stabilizing mode until the characteristic satisfies the biopotential-signal sensitivity need.

BACKGROUND

Some wearable devices (including wrist-wearable devices) include sensors for sensing neuromuscular signals (e.g., surface electromyography signals) or other biopotential signals to allow the wearable devices to predict motor actions a user intends to perform. These sensors may have different performance variances based on a variety of factors, including, e.g., changing impedances at an interface between an electrode and a user's skin due to skin moisture, wrist or arm movement, anthropometric wrist variation during gestures (e.g., dynamic), etc., and also general demographic factors, such as age, body fat, hair density, tissue composition, anthropometric wrist variation (static), etc. These performance variances may create a number of challenges in designing wearable devices that may accurately sense neuromuscular signals with a sufficient degree of accuracy to enable reliable gesture detection. Changing impedances, in particular for dry electrodes (e.g., electrodes that do not require an electrode gel for sensing purposes), may result in significant noise in detected neuromuscular signals, which may degrade a system's ability to accurately predict intended, or detect ongoing, neuromuscular signals that cause motor actions to be performed by a user. As another example, an amount of time needed for an impedance to stabilize after a wearable device is donned by a user may be undesirably long, thereby requiring users to wait to be able to perform certain types of gestures, which may lead to user frustration and, eventually, users declining to adopt devices with neuromuscular-sensing capabilities to support these certain types of gestures.

These challenges are compounded by the need to ensure that the wearable device that may sense neuromuscular signals has a socially-acceptable form factor. Current designs of wearable devices for sensing neuromuscular signals may be large and bulky, often including a large number of sensors to detect neuromuscular signals. The large and bulky wearable devices may be uncomfortable to a user and may impede practicality and social-acceptability of such wearable devices for day-to-day use.

Additionally, current strategies for determining or adapting levels of sensitivity associated with detecting biopotential signals do not provide for variability between users, differences in environments, etc. such that they are not personalized or adaptable to specific users or applications. As a result, sensitivity levels and needs that a device or method selects or applies may be too high for some users, and may be too low for other users. Therefore, there is a need to address these and other shortcomings of the existing strategies, for example to develop strategies to integrate adjustment technology into biopotential-signal sensing systems to select a sensitivity-stabilizing mode depending on personalized, application-specific, and other needs.

As such, there is a need to address one or more of the above-identified challenges.

SUMMARY

To address one or more of the challenges discussed above, an impedance value at, for example, a sensor-skin interface (e.g., an impedance at the interface between a neuromuscular-signal (e.g., electromyography (EMG)) sensor or biopotential-signal (e.g., electromyography (EMG), electroencephalography (EEG), or electrocardiography (EKG)) sensor and a portion of a user's skin that is in contact with the biopotential-signal sensor) may be monitored (e.g., either by directly monitoring the impedance values or by monitoring other value(s) that may be used to derive or estimate the impedance values) to detect when the impedance is outside of a predefined range of impedance values and/or when the impedance is not matched with impedance values at one or more other biopotential-signal sensors. In response to such impedance changes, systems (which may include a smartphone that is controlling certain operations at a wearable device, such as a wrist-wearable device, or may include just the wrist-wearable device performing the operations on its own, as well as combinations thereof) may cause a stimulation (e.g., electrical, mechanical, or optical, in accordance with different embodiments described more below) at the sensor-skin interface, such that after the stimulation, the impedance value at the sensor-skin interface is within the predefined range of impedance values and/or is again matched with respective impedances associated with the one or more other biopotential-signal sensors. The stimulations described herein are gentle stimulations that are used to stabilize impedances, and may not actually be perceived by a user physiologically. The stimulations may be directed through various means. In some embodiments, the stimulations may be conducted current. In some embodiments, the stimulations may be of another nature, for example acoustic, ultrasonic, chemical, radiated, etc. These exemplary stimulations may also be referred to herein as, for example, adjustments.

For example, the wearable device may detect impedance values at a certain sensor-skin interface and direct a stimulation at a desirable location that will cause the impedance value at one or more sensor-skin interfaces to be reduced to a desirably low impedance value, which may improve the performance of the biopotential-signal sensor and a user's experience with having in-air hand gestures detected quickly and accurately (otherwise, user adoption of such new gesture paradigms would be frustrated as gesture detection, especially for a new paradigm, could become slow and undesirable, thereby leading users to decline to adopt or use such new paradigms). As discussed elsewhere in this descriptive text, stimulations may have different stimulation characteristics depending on a measured or estimated impedance value (or another value that may be measured and then used to derive or estimate an impedance value), the desired impedance value range, a particular user profile or characteristics of the user wearing the device, or other factors. As discussed herein, "measuring", "estimating", "deriving", etc. impedance values may be used interchangeably. In some embodiments, the impedance value may be directly measured. In some embodiments, the impedance value may be estimated or derived based on other information. In some embodiments, impedance may be determined based on second-order effects. In some embodiments a second-order effect is based on the spectral signature of a known event. For example, the wearable device may know what a certain muscle action looks like when the impedance is high, and know what that muscle action looks like when the impedance is low. Based on the detected information, the wearable device may be capable of estimating an impedance value by, for example, comparing the currently sensed muscle action and a known muscle action when the impedance was low or high or otherwise. In some embodiments, the wearable device may estimate that a specific channel has higher impedance than neighboring channels based on, for example, how much power-line interference (PLI) is detected.

While an intensity of the stimulation is one example of a stimulation characteristic, other operational characteristics may also be adjusted to create changes to a respective impedance value at a respective biopotential-signal sensors and sensor-skin interfaces. These other operational characteristics may include electrical characteristics associated with an analog front-end of the respective biopotential-signal sensor, such as an impedance-matching network. In some embodiments, the operational characteristic may be an electrical characteristic of a signal-generation component on or coupled with the biopotential-signal sensor or an element or characteristic associated with the biopotential-signal sensor. Electrical characteristics may include one or more of a phase, a gain, a frequency, a voltage, a current, and resistance. The operational characteristics may also be adjusted to create changes in the respective impedance value to account for power-line interference noise, baseline noise (e.g., other types of electrical-signal noise, which may be detected along with biopotential signals, that may be detected (picked up or sensed) by the respective biopotential-signal sensors), and motion artifacts (changes in the sensed biopotential-signal caused by voluntary or involuntary user movement during biopotential-signal acquisition), as well as electrode lift-off events (e.g., time intervals during which a biopotential-signal sensor does not contact the user's skin), temperature changes (e.g., an internal or external temperature proximate to a respective biopotential-signal sensor), and direct current (DC) offset level. In some embodiments, the operational characteristics may be adjusted to account for changes over time (e.g., changes to a biopotential-signal sensor that occur over time, such as wear and tear, deformation, etc.). The apparatuses, methods, and systems described herein may be performed by the wearable device or by a controlling device that is communicatively coupled to the wearable device.

Further, the wearable devices described herein may also improve users' interactions with artificial-reality environments and also improve user adoption of artificial-reality environments more generally by providing a form factor that is socially acceptable and compact, thereby allowing the user to wear the device throughout their day (and thus making it easier to interact with such environments in tandem with (as a complement to) everyday life). As one specific example, the simulations referred to herein may help to ensure that in-air-hand-gesture detection (e.g., gestures performed with a user's digits and fingers in the air and without contacting a touchscreen, which in-air hand gestures may be detected using biopotential-signal sensors, such as electromyography (EMG), electroencephalography (EEG), or electrocardiography (EKG) sensors, and these in-air hand gestures may be used to control user interfaces presented via artificial-reality headsets) occurs more quickly, particularly related to a point in time at which a user has donned the wrist-wearable device (e.g., such that accurate in-air hand gesture detection may occur within 2-10 ms of a user donning a wrist-wearable device). In ensuring quick gesture detection after a user dons the wearable device, the stimulation-providing techniques discussed herein may help to ensure user satisfaction with, and adoption of, new artificial-reality systems (e.g., including smart glasses that are controlled using in-air hand gestures detected via a wrist-wearable device). In the descriptions that follow, references are made to artificial-reality environments, which include, but are not limited to, virtual-reality (VR) environments (including non-immersive, semi-immersive, and fully-immersive VR environments), augmented-reality environments (including marker-based augmented-reality environments, marker-less augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein may be used with any of these types of artificial-reality environments (e.g., for more accurately controlling operations in an artificial-reality environment based on detecting biopotential signals that are sensed more reliably due to the impedance-control techniques described herein to adjust operational characteristics of biopotential-signal sensors). Additionally, while the primary example wearable device discussed herein is a wrist-wearable device, the skilled artisan will appreciate upon reading the descriptions provided herein that the stimulation-providing techniques used for impedance-stabilization purposes may also be used with other types of wearable devices, including wearable garments (such as gloves, t-shirts, socks, hats, etc., which may be made using soft fabrics that include integrated electronic components such as biopotential-signal sensors and their associated processing circuitry). The applications are also not limited to artificial reality applications and may be used in other situations and uses (e.g., activity tracker, smart-watch, movement control device associated with gaming console or other interactive devices (e.g., smart-mirrors, tablets, phones, etc.), and others). The applications are also not limited to impedance-stabilization and may be used for stabilization of other characteristics (e.g., skin-hydration, sensor pressure, etc.).

Before briefly introducing the drawings and then moving on to a detailed description, one example wrist-wearable device that is configured to perform an impedance-stabilization technique will be briefly summarized. In accordance with some embodiments, a wrist-wearable device for sensing biopotential signals is provided, including being provided with a non-transitory computer-readable storage medium with instructions that, when executed, cause the wrist-wearable device to perform an impedance-stabilization technique. The wrist-wearable device includes a plurality of biopotential-signal sensors, each respective biopotential-signal sensor being configured to contact a user's skin at a respective sensor-skin interface and being further configured to sense biopotential signals of the user (e.g., biopotential signals for controlling motor units that cause wrist and digit movements, such that an analysis of the biopotential signals may allow for detecting in-air hand gestures). The wrist-wearable device further includes a first impedance-stabilizing component associated with at least a first biopotential-signal sensor of the plurality of biopotential-signal sensors. The first impedance-stabilizing component is configured to direct a stimulation to a first sensor-skin interface associated with the first biopotential-signal sensor until an impedance value at the first sensor-skin interface is within a first desired range, the stimulation being compliant with a predefined safety standard. The wrist-wearable device further includes a second impedance-stabilizing component associated with at least a second biopotential-signal sensor of the plurality of biopotential-signal sensors. The second impedance-stabilizing component is configured to direct another stimulation to a second sensor-skin interface, distinct from the first sensor-skin interface, associated with the second biopotential-signal sensor until an impedance value at the second sensor-skin interface is within a second desired range, the other stimulation being compliant with the predefined safety standard. Example biopotential-signal sensors and associated impedance-stabilizing components are shown in FIGS. 1A-1B, and example of the process for stabilizing respective impedance values is shown at the bottom of those figures, which are also described in more detail below.

Additionally, one example method for sensing biopotential signals and stabilizing a sensitivity associated with sensing biopotential signals will be briefly summarized. While bipotential signals from a first biopotential-signal sensor of a wearable device are used to determine gestures directed towards a first application, the method selects a first biopotential-signal sensitivity need for the first application. The biopotential-signal sensor is configured to be in contact with skin of a wearer of the wearable device at a first sensor-skin interface. In accordance with selecting the first biopotential-signal sensitivity need for the first application, the method provides a first adjustment to a first characteristic at the sensor-skin interface in accordance with a first sensitivity-stabilizing mode until the characteristic satisfies the first biopotential-signal sensitivity need. While bipotential signals from the biopotential-signal sensor of the wearable device are used to determine gestures directed towards a second application, the method selects a second biopotential-signal sensitivity need for the second application. In accordance with selecting the second biopotential-signal sensitivity need for the second application, the method provides a second adjustment to the characteristic at the sensor-skin interface in accordance with a second sensitivity-stabilizing mode until the characteristic satisfies the second biopotential-signal sensitivity need. In some embodiments, the first biopotential-signal sensitivity need and the second biopotential-signal sensitivity need are distinct. Examples of some embodiments of are shown, for example, in at least FIGS. 10-11. Examples of methods of providing adjustments (e.g., stimulations) are described in at least FIGS. 1-4, 6. Examples of adjustment (e.g., stimulation) generating components are shown in at least FIGS. 1-3, 5, 7A, 12.

Note that the various embodiments described above (and elsewhere herein) may be combined with other embodiments described herein. For example, certain arrangements of one or more impedance monitors, one or more electrodes, and stimulation profiles discussed or otherwise envisioned herein may be combined. The features and advantages described in the specification are not all inclusive and, in particular, additional features and advantages will be apparent to one of ordinary skill in the art in view of the drawings, specification, and claims. Moreover, it should be noted that the language used in the specification has been principally selected for readability and instructional purposes.

BRIEF DESCRIPTION OF THE DRAWINGS

So that the present disclosure may be understood in greater detail, a more particular description may be had by reference to the features of various embodiments, some of which are illustrated in the appended drawings. The appended drawings, however, typically illustrate pertinent features of the present disclosure. The description may admit to other effective features as the person of skill in this art will appreciate upon reading this disclosure.

FIGS. 10A-10D are flow charts depicting example methods of selecting one or more sensitivity-stabilizing modes and providing adjustments in accordance with the one or more sensitivity-stabilizing modes, in accordance with some embodiments.

Figure 1A:
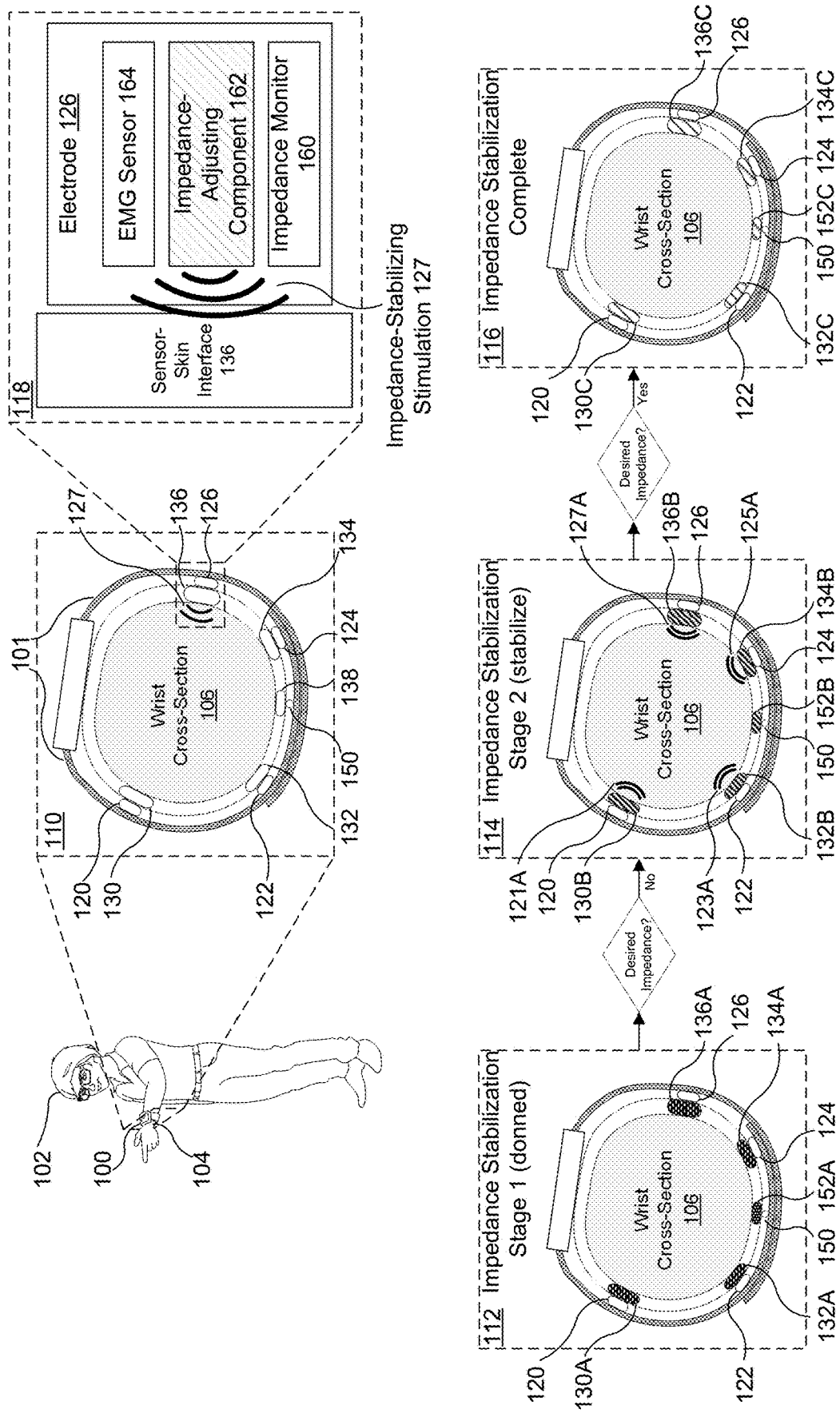
FIG. 1A illustrates an example wrist-wearable device configured to direct one or more stimulations at respective sensor-skin interfaces associated with a first user to achieve desirably low impedance values, and also illustrates an example impedance-stabilization method for use with the example wrist-wearable device, in accordance with some embodiments.

In accordance with common practice, various features illustrated in the drawings are not drawn to scale. Accordingly, dimensions of the various features may be arbitrarily expanded or reduced for clarity and/or illustrative purposes. In addition, some of the drawings may not depict all of the components of a given system, method, or device. Finally, consistent with common practice, like reference numerals denote like features throughout the specification and figures.

DETAILED DESCRIPTION

Numerous details are described herein to provide a thorough understanding of the example embodiments illustrated in the accompanying drawings. Some embodiments may be practiced without some of the specific details. Furthermore, well-known processes, components, and materials have not been described in exhaustive detail so as to avoid obscuring pertinent aspects of the embodiments described herein.

Embodiments of this disclosure may include or be implemented in conjunction with various types or embodiments of artificial-reality systems. Artificial-reality, as described herein, is any superimposed functionality and or sensory-detectable presentation provided by an artificial-reality system within (or rendered to appear on top of) a user's physical surroundings. Such artificial-realities may include and/or represent virtual reality (VR), augmented reality (AR), mixed artificial-reality (MAR), or some combination and/or variation one of these. For example, a user may perform a swiping in-air hand gesture to cause a song to be skipped by a song-providing API providing playback at, for example, a home speaker. In some embodiments, of an AR system, ambient light (e.g., a live feed of the surrounding environment that a user would normally see) may be passed through a display element of a respective head-wearable device presenting aspects of the AR system. In some embodiments, ambient light may be passed through respective aspect of the AR system. For example, a visual user interface element (e.g., a notification user interface element) may be presented at the head-wearable device, and an amount of ambient light (e.g., 15-50% of the ambient light) may be passed through the user interface element, such that the user may distinguish at least a portion of the physical environment over which the user interface element is being displayed.

Artificial-reality content may include completely generated content or generated content combined with captured (e.g., real-world) content. The artificial-reality content may include video, audio, haptic events, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Each of the figures will now be described in turn, beginning with FIG. 1A.

FIG. 1A illustrates an example wrist-wearable device configured to direct one or more stimulations at respective sensor-skin interfaces associated with a first user to achieve desirably low impedance values, and also illustrates an example impedance-stabilization method for use with the example wrist-wearable device, in accordance with some embodiments. As shown in FIG. 1A, a first user 102 is wearing a wrist-wearable device 100 on the user's wrist 104 (as noted earlier, while wrist-wearable devices are the primary examples discussed herein, the use of impedance-stabilization techniques is applicable to any of a number of different types of wearable devices that sense a signal (e.g., a biopotential signal) that may be affected by impedance, including sensing of biopotential signals). Cross-sectional view 110 shows a wrist cross-section 106 of the user's wrist 104 and also a cross-sectional view of the wrist-wearable device 100. The wrist-wearable device 100 includes a band portion 101, which may be a portion of the wrist-wearable device that surrounds the user's wrist 104 and has two band portions that are separated by a display capsule of the wrist-wearable device. A plurality of electrodes 120, 122, 124, 126 are provided and positioned at respective positions around a circumference of the band portion 101. Each electrode 120, 122, 124, 126 is associated with (e.g., in direct physical contact with) a corresponding sensor-skin interface 130, 132, 134, 136, respectively. The sensor-skin interfaces 130, 132, 134, 136 in FIG. 1A represent portions of the skin of user 102 that are contacted and interface a respective one of the electrodes 120, 122, 124, 126. In the depicted example of FIG. 1A, electrode 120 is associated with sensor-skin interface 130, electrode 122 is associated with sensor-skin interface 132, electrode 124 is associated with sensor-skin interface 134, and electrode 126 is associated with sensor-skin interface 134. The illustrated electrodes 120, 122, 124, 126 may be metallic structures configured to conduct a biopotential signal travelling through the user's skin (e.g., the biopotential signal may be a biopotential signal that may be conducted and then transferred to an analog front end associated with each electrode for signal processing), and other materials such as soft, conductive materials may also be used for one or more of the electrodes. Also shown in cross-sectional view 110 is an impedance monitor 150 and corresponding monitor-skin interface 138. In cross-sectional view 110, electrode 126 is applying an impedance-stabilizing stimulation 127.

In addition to altering the impedance of the skin-electrode interface (e.g., interface between electrodes and skin of a user), the skin-electrode interface modulation techniques disclosed herein can be used to reduce noise, improve signal-to-noise ratio (SnR), and/or improve system settling time (e.g., initial time after putting on the wearable device before a good signal is acquired).

FIG. 1A also includes a block diagram 118 that provides further detail of the components associated with the example electrode 126, skin sensor interface 136, and stimulation 127. As discussed in more detail herein, an electrode may include one or more components, three such components are shown in block diagram 118. Electrode 126 includes an electromyography (EMG) sensor 164, impedance-adjusting component 162, and impedance monitor 160. As shown in FIG. 1A, and discussed further herein, the wrist-wearable device 100 may include an impedance monitor 160 that is within an electrode (e.g. electrode 126) or that may be a separate component located directly on the band portion 101 (e.g. impedance monitor 150), or combinations of both configurations. FIG. 1A also depicts that impedance-adjusting component of electrode 126 is generating and directing an impedance-stabilizing stimulation 127 to the user's sensor-skin interface 136. In the example of FIG. 1A, the user has just donned the wrist-wearable device 100, which donning event may then cause the device to begin performing an impedance-stabilization technique (depicted in the sequence of three figures at the bottom of FIG. 1A). In other words, the act of donning the wrist-wearable device 100 may serve as a triggering event that then causes the device 100 to perform the impedance-stabilization technique. This may be an initial triggering event, such that other triggering events may later cause an impedance stabilization technique to be performed again for one or more of the electrodes. As discussed elsewhere, electrode 126 could also include, in addition or as a replacement to the EMG sensor, an electroencephalography (EEG) or electrocardiography (EKG) sensor.

Shown at the bottom of FIG. 1A is a sequence of cross-sectional views (112, 114, 116) that are respectively associated with three example stages of an impedance-stabilization process. Cross-sectional views 112, 114, and 116 show the wrist cross-section 106 of the wrist 104 of user 102 and of the wrist-wearable device 100. Cross-sectional views 112, 114, and 116 show the impedance stabilization process capable of being employed by the wrist-wearable device.

Cross-sectional view 112 shows a point in time when the user 102 has put on (i.e., donned) wrist-wearable device 100. In this example, this is referred to as impedance-stabilization stage 1. As noted above, the act of donning the wrist-wearable device 100 may be a triggering event to being execution of the impedance-stabilization process. The wrist-wearable device 100 may include circuitry that is configured to direct the electrodes 120, 122, 124, 126 to measure the impedance at respective sensor-skin interfaces 130A, 132A, 134A, 136A (e.g., directly measuring impedance values using circuitry or measuring other quantities, such as skin temperature, which may be used to derive or estimate impedance values). FIG. 1A also shows that circuitry of wrist-wearable device 100 may also be configured to direct an impedance monitor 150 to measure an impedance value at a respective monitor-skin interface 152A. As shown in cross-sectional view 112, the cross-hatch pattern on the sensor-skin interfaces 130A, 132A, 134A, 136A and monitor-skin interface 152A represents a relatively high impedance value associated with these interfaces. The circuitry of the wrist wearable device may be configured to determine whether respective impedance values at sensor-skin interfaces 130A, 132A, 134A, 136A and monitor-skin interface 152A are within desired impedance ranges (e.g., each sensor-skin interface may be associated with its own desired impedance range or multiple sensor-skin interfaces may each be associated with a same desired impedance range). While monitor-skin interface 152A is depicted separately in FIG. 1A for illustrative purposes, it should be appreciated that, in some embodiments, the monitor-skin interface may be one of the sensor-skin interfaces (e.g., since that the area of skin that is monitored is also the area of the skin that contacted by one of the electrodes).

If the measured impedance values are not within respective desired ranges associated with one or more of sensor-skin interfaces 130A, 132A, 134A, 136A, and monitor-skin interface 152A, the wrist wearable device 100 may be configured to proceed to a stabilizing stage, which may be referred to as Impedance Stabilization Stage 2 as shown in cross-sectional view 114. In other words, the wrist-wearable device 100 may be configured to monitor the measured impedance values after stage 1 and to then proceed to stage 2 only after it is determined that stage 2 is needed (e.g., that one the sensor-skin interfaces has an impedance value outside of a desired impedance range). In cross-sectional view 114, electrodes 120, 122, 124, 126 direct impedance-stabilizing stimulations 121A, 123A, 125A, 127A, respectively. During, and as a result of, these impedance-stabilizing stimulations 121A, 123A, 125A, 127A, the impedance value at the respective sensor-skin interfaces 130B, 132B, 134B, 136B, and monitor-skin interface 152B are lowered. This lowered impedance value is illustrated schematically in FIG. 1A by using a different cross-hatch pattern for sensor-skin interfaces 130B, 132B, 134B, 136B, and monitor-skin interface 152B. As shown in cross-sectional view 114, after the application of these impedance-stabilizing stimulations 121A, 123A, 125A, 127A, the wrist-wearable device 100 may be configured to measure the impedance value at the sensor-skin interfaces 130B, 132B, 134B, 136B, and monitor-skin interface 152B to re-assess/re-determine whether respective impedance values at each of the interfaces is within an associated desired impedance range (e.g., 1 kΩ-500 kΩ). Other examples of desired impedance ranges are discussed herein.

While the illustration of impedance-stabilization stage 2 depicts stimulations being applied at each of the sensor-skin interfaces, it should be understood that these stimulations may occur at different points in time and also that stage 2 may proceed by applying a simulation at just one of the sensor-skin interfaces (depending on a determination made by the device 100 as to where the stimulations are needed). In certain embodiments or circumstances, stimulations at one sensor-skin interface may also help to lower an impedance value at other sensor-skin interfaces, and the device accounts for these effects in determining how and where to apply subsequence stimulations.

As shown in cross-sectional view 116, if impedance values associated with the sensor-skin interfaces 130C, 132C, 134C, 136C, and monitor-skin interface 152C are within the desired values, the impedance stabilization is complete. As a result of the impedance-stabilizing stimulations 121A, 123A, 125A, 127A, the impedance values at the sensor-skin interfaces 130C, 132C, 134C, 136C, and monitor-skin interface 152C have impedance values that are within a desired impedance value range. This lowered impedance value is depicted visually in FIG. 1A through another different cross-hatch pattern (distinct from the ones used for the sensor-skin interfaces in stages 1 and 2 of the impedance-stabilization process). In the depicted impedance-stabilization stages, a less dense line pattern for the sensor-skin interface cross-hatch pattern indicates a lowered impedance value.

The measurement of impedance values and determinations of whether further impedance stabilization is required or whether impedance stabilization is complete may depend on a variety of elements. In some embodiments, the determination may include a requirement that each sensor-skin or monitor-skin interface have an impedance value that is within an associated desired impedance range (where a range may be associated with one or multiple sensor-skin and monitor-skin interfaces). In some embodiments, the determination may require that at least a majority (or certain other percentage, such as 80-95%) of sensor-skin and monitor-skin interfaces have an impedance value that is within the desired range. In some embodiments, the determination may focus on ensuring that certain electrodes or impedance monitors at desirable locations around a user's wrist have desirably low impedance values (e.g., below 100 KOhms). In other embodiments, the determination may be made based on the amount of time passed and may not be directly tied to the measured impedance values.

Figure 1B:
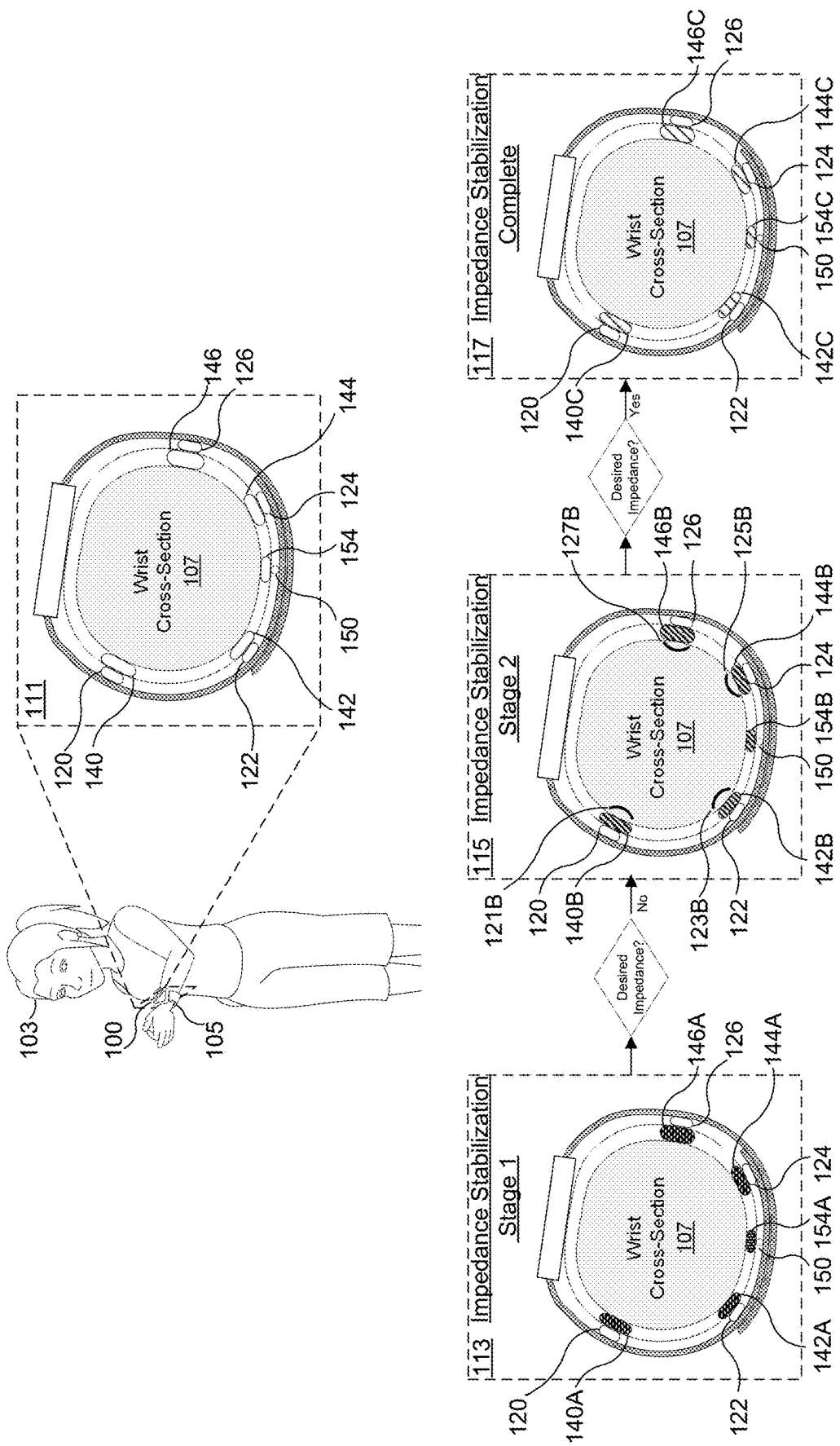
FIG. 1B illustrates the example wrist-wearable device of FIG. 1A that is further configured to direct one or more stimulations to respective sensor-skin interfaces associated with a second user to achieve desirably low impedance values, and also illustrates an example impedance-stabilization method for use with the example wrist-wearable device, in accordance with some embodiments.

FIG. 1B illustrates the example wrist-wearable device of FIG. 1A that is further configured to direct one or more stimulations to respective sensor-skin interfaces associated with a second user to achieve desirably low impedance values, and also illustrates an example impedance-stabilization method for use with the example wrist-wearable device, in accordance with some embodiments. FIG. 1B demonstrates a similar impedance stabilization process (to the one depicted and described with reference to FIG. 1A) using the same wrist-wearable device 100 that has been donned by a second user 103 with wrist 105. Cross-sectional view 113 shows a cross-section of the wrist 105 of the user 103 and of the wrist-wearable device 100. As the wrist-wearable device 100 is the same as that shown and discussed in FIG. 1A, the electrodes 120, 122, 124, 126 and impedance monitor 150 are also the same as shown and discussed in FIG. 1A. The sensor-skin interfaces 140, 142, 144, 146 and monitor-skin interface 154 correspond to skin of a particular user, and therefore are specific to user 103 and different from sensor-skin interfaces 130, 132, 134, 136 and monitor-skin interface 152 of user 102 in FIG. 1A.

Cross-sectional views 113, 115, and 115 in FIG. 1A show a similar impedance stabilization process capable of being employed by the wrist-wearable device as shown in FIG. 1A. Cross-sectional view 113 shows a point in time when the second user 103 has put on (i.e., donned) wrist-wearable device 100. Like with user 102 in FIG. 1A, when second user 103 donned the wrist-wearable device 100, the wrist wearable device may be configured to measure the impedance values at sensor-skin interfaces 140A, 142A, 144A, 146A and monitor-skin interface 154A. As shown in cross-sectional view 113, the cross-hatch pattern on the sensor-skin interfaces 140A, 142A, 144A, 146A and monitor-skin interface 154A represents a relatively high impedance value associated with these interfaces.

In cross-sectional view 115, electrodes 120, 122, 124, 126 direct impedance-stabilizing stimulations 121B, 123B, 125B, 127B, respectively. As shown in FIG. 1B, the impedance-stabilizing stimulations 121B, 123B, 125B, 127B have different stimulation characteristics than the impedance-stabilizing stimulations 121A, 123A, 125A, 127A shown in FIG. 1A. One reason for the impedance-stabilizing stimulations having different stimulation characteristics may be related to a stored user profile. In the example of FIG. 1B, the wrist-wearable device 100 detected, was informed, or otherwise knew that user 103 was the user that donned the wrist-wearable device 100. The user-specific profile may include information about previous impedance stabilizing procedures, where the wrist-wearable device 100 has found that the impedance-stabilizing stimulations for user 103 may possess different stimulation characteristics than the impedance-stabilizing stimulations for user 102 and still reach desirably low impedance values.

As shown in cross-sectional view 115, during, and as a result of, these impedance-stabilizing stimulations 121B, 123B, 125B, 127B, the impedance value at the respective sensor-skin interfaces 140B, 142B, 144B, 146B and monitor-skin interface 154B may be lowered. This lowered impedance value is demonstrated through a less-restrictive cross-hatch pattern in sensor-skin interfaces 140B, 142B, 144B, 146B and monitor-skin interface 152B. As shown in cross-sectional view 115, after the application of these impedance-stabilizing stimulations 121B, 123B, 125B, 127B, the wrist-wearable device 100 may be configured to measure the impedance value at sensor-skin interfaces 140B, 142B, 144B, 146B and monitor-skin interface 154B.

After the impedance stabilization stage two as shown in cross-sectional view 115, the impedance values at the sensor-skin and monitor-skin interfaces of user 103 are again measured. In cross-sectional view 117, as a result of the impedance-stabilizing stimulations 121B, 123B, 125B, 127B, the impedance values at the sensor-skin interfaces sensor-skin interfaces 140C, 142C, 144C, 146C and monitor-skin interface 154C have impedance values that are within a desired impedance value range. This lowered impedance value is demonstrated through a cross-hatch pattern that is even less-restrictive than that shown in cross-sectional view 115 for sensor-skin interfaces 140B, 142B, 144B, 146B and monitor-skin interface 154B. Because the measured impedance values are within a desired impedance value range, the impedance stabilization process is complete.

Figure 2:
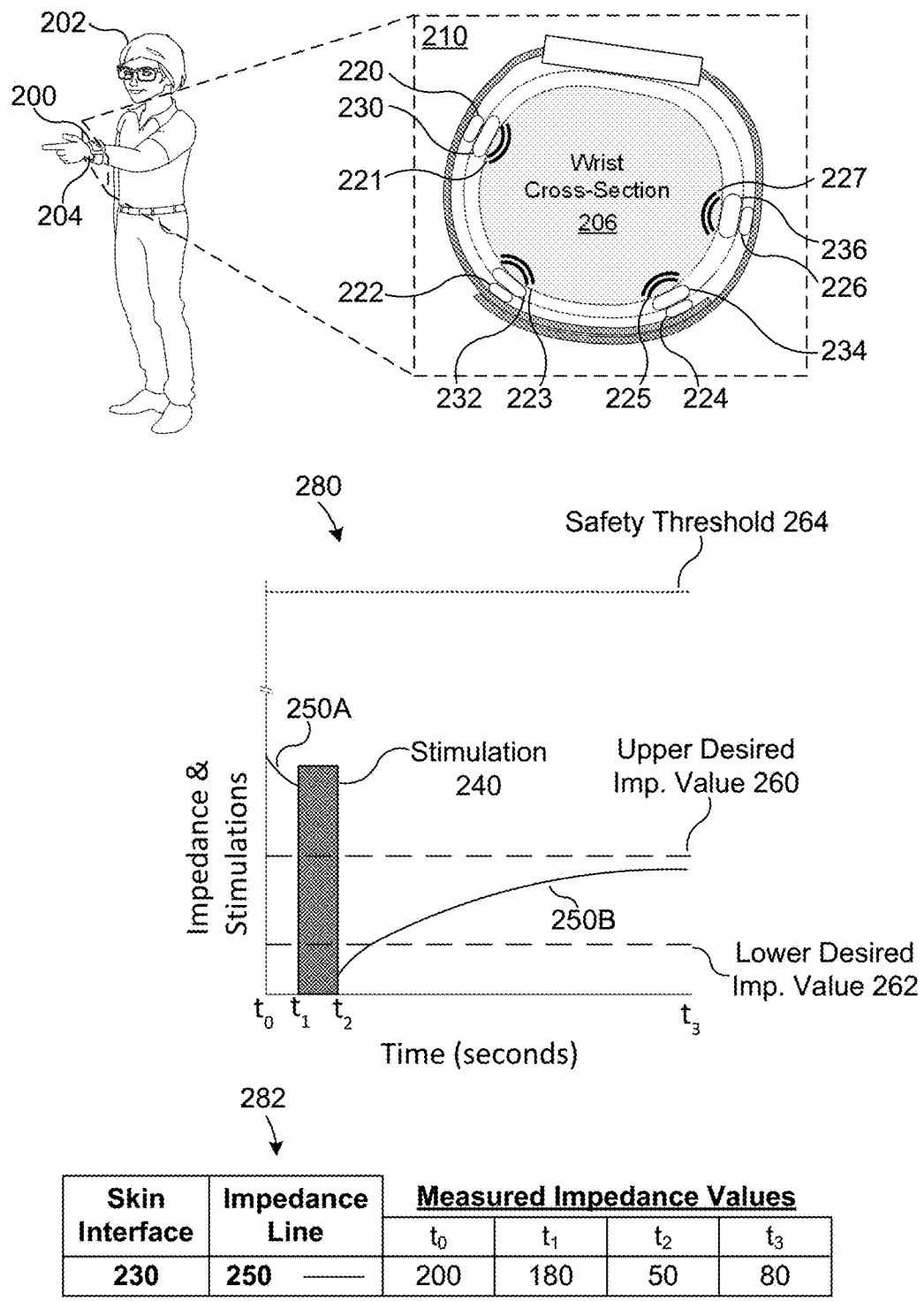
FIG. 2 illustrates another example wrist-wearable device configured to direct one or more stimulations to a user to achieve desirably low impedance values, illustrates an example impedance-stabilization method for use with the example wrist-wearable device, and also illustrates an example graph and table identifying exemplary impedance and stimulation values, in accordance with some embodiments.

FIG. 2 illustrates another example wrist-wearable device 200 configured to direct one or more stimulations to a user 202 to achieve desirably low impedance values, illustrates an example impedance-stabilization method for use with the example wrist-wearable device 200, and also illustrates an example graph and table identifying exemplary impedance and stimulation values, in accordance with some embodiments. User 202 is wearing a wrist-wearable device 200 on the wrist 204 of user 202. Cross-sectional view 210 shows a wrist cross section 206 of the user's wrist 204 and also a cross sectional view of the wrist-wearable device 200. Similar to wrist-wearable device 100 shown in FIGS. 1A and 1B, wrist-wearable device 200 includes a plurality of electrodes 220, 222, 224, 226. Each electrode 220, 222, 224, 226 has a corresponding sensor-skin interface 230, 232, 234, 236. The sensor-skin interfaces 230, 232, 234, 236 in FIG. 2 represent portions of the skin of user 202 that are contacted and interface a respective one of the electrodes 220, 222, 224, 226. Unlike the wrist-wearable device 100 of FIGS. 1A and 1B, wrist-wearable device 200 does not include a separate impedance monitor and therefore a monitor-skin interface is not shown or present in the embodiment shown in FIG. 2. Cross-sectional view 210 also shows impedance-stabilizing stimulations 221, 223, 225, 227 that are generated, respectively, by electrodes 220, 222, 224, 226 and directed to sensor-skin interfaces 230, 232, 234, 236 respectively.

FIG. 2 includes a graph 280 showing various parameters that may be monitored and used in conjunction with the impedance-stabilization techniques discussed herein. The y-axis of the graph corresponds to both measured impedance values, as well as particular stimulation characteristics of impedance-stabilizing stimulations. The x-axis of the graph is measured in seconds, including with certain time intervals $t_0$, $t_1$, $t_2$, $t_3$. The relative times between $t_0$ and $t_1$, $t_1$ and $t_2$, and $t_2$ and $t_3$ are examples. Graph 280 shows an upper desired impedance value 260 and lower desired impedance value 262. The values between and including the upper and lower desired impedance values represent the desirable range of impedance values. These upper and lower thresholds may vary depending on the embodiment, user (e.g., in certain embodiments, default desirable ranges of impedance values may be modified to account for physical characteristics of a user on which a wrist-wearable device 100 has been donned, such as to account for wrist-circumference variations that may affect electrode locations, hairiness of the user's wrist at different sensor-skin interfaces, etc.), or otherwise. The lower threshold may optimally be zero ohms, but, in more typical cases, may be 2-10 KOhms.

Graph 280 also includes a safety threshold 264, which represents a maximum magnitude of any stimulation (measured in voltage, current, etc.) that may be applied and still fall within certain predefined safety regulations or standards. The wrist-wearable device is configured to generate stimulations that are within the predefined safety regulations or standards. In some embodiments the stimulations that are applied are within the safety standard parameters as defined by the International Electrotechnical Commission (IEC) 62368-1 standard, and within ES1 levels of that standard. In some embodiments the stimulations that are applied are within the safety standard parameters as defined by the International Electrotechnical Commission (IEC) 62368-1 standard, and are within any range (e.g., ES2, ES3, etc.) defined therein.

Graph 280 shows the measured or estimated impedance values (as noted herein and as should be understood through this specification, impedance values may be directly measured, but may also be estimated or inferred based on measurements of other parameters, such as skin temperature or other values from which an impedance value may be estimated or inferred) as shown with impedance line 250 (represented by a combination of 250A and 250B in graph 280). Impedance line 250 represents the impedance values measured at sensor-skin interface 230 as shown in cross-sectional view 210. As shown in graph 280, impedance line 250A starts at a higher value and begins to decrease from $t_0$ to $t_1$. This decrease may be a natural result of an impedance monitor or electrode resting on a user's skin over a period of time. The reduction in impedance is, generally, slower than desired (e.g., if just this natural reduction is relied on, then users would have to wait an unacceptably long period of time to being using in-air hand gestures, thereby leading to frustrations and discarding of new devices relying on these new gesture paradigms). Graph 280 also includes stimulation 240, which is identified by the rectangular bar with cross-hatching, that is applied from a time from $t_1$ to $t_2$. The stimulation 240 in graph 280 corresponds, in this example, with one or more of the impedance-stabilizing stimulations 221, 223, 225, 227 in cross-sectional view 210. At time $t_2$, after the stimulation has been applied, the impedance value at the respective sensor-skin interfaces 230, 232, 234, 236 drops down to a point that is lower than the impedance value at $t_1$ before the stimulation was applied. This is shown through the representative impedance line 250 showing an example impedance value measurement at sensor-skin interface 230. After the stimulation, the impedance value may gradually start to increase and then level off, as shown with impedance line 250B. The impedance value associated with line 250B are within the desired impedance values at time $t_3$—i.e. the impedance value in this example is below the upper impedance value 260 and above the lower impedance value 262.

In this example, the measured or estimated impedance values are not provided during the time of stimulation in FIG. 2. The wrist-wearable device may be configured to measure or estimate the impedance values during some or all of the stimulations. The measurement of the impedance during the stimulation may be advantageous because it may enable the wrist-wearable device to more efficiently apply the length or other stimulation characteristic (frequency, intensity, etc.) of the stimulation.

Table 282 in FIG. 2 presents additional information associated with graph 280. This information and the values in table 282 are non-limiting and the values in the table are provided for example purposes. Table 282 relates to the impedance values of impedance line 250 and the corresponding sensor-skin interface 230. As shown in table 282, the measured impedance value at sensor-skin interface 230 at to was 200, the impedance value at $t_1$ was 180, the impedance value at $t_2$ was 50, and the impedance value at $t_3$ was 80. Impedance may be measured in ohms, kilohms, or other appropriate units.

FIGS. 3A-3D illustrate another example wrist-wearable device configured to direct one or more stimulations to a user to achieve desirably low impedance values, illustrates an example impedance-stabilization method for use with the example wrist-wearable device, and also illustrates an example graph and table identifying exemplary impedance and stimulation values, in accordance with some embodiments. FIGS. 3A-3D demonstrate additional details of an impedance-stabilizing process performed at or using a wrist-wearable device 300. FIGS. 3A-3D depict wrist-wearable device 300 around wrist 304 of a user 302. Cross-sectional views 310A-310D are shown in each of FIGS. 3A-3D. The wrist-wearable device in each cross-sectional view includes three electrodes 320, 322, 324 with three corresponding sensor-skin interfaces 330, 332, and 334. Cross-sectional views 310A-310D also show the wrist cross-section 306 of the wrist 304 of user 302.

Each of FIGS. 3A-3D also includes a graph 380-1 to 380-4 that include additional example details regarding at least the stimulations, stimulation characteristics, and impedance values in this example sequence of an impedance-stabilizing process. Each graph 380-1 to 380-4 has a y-axis that corresponds to measured impedance values and stimulation characteristics of the applicable impedance-stabilizing stimulations. The x-axis of the graph is measured in seconds. Impedance line 350 in graphs 380-1 to 380-4 corresponds with sensor-skin interface 330, impedance line 352 corresponds with sensor-skin interface 332, and impedance line 354 corresponds with sensor-skin interface 334. Each of the graphs 380-1 to 380-4 also includes an indication as to an example upper desired impedance value 360 and lower desired impedance value 362. The desired impedance value range is within, and inclusive of, the upper desired impedance value 360 and lower desired impedance value 362. In some embodiments, different electrodes and other components may have different impedance value ranges.

FIGS. 3A-3D also include table 382-1 to 382-4 that include additional example details regarding at least the impedance values at certain points in time as shown in this example embodiment. The information in tables 382-1 to 382-4 is non-limiting and are provided for purely example purposes to describe an example embodiment. As described with respect to graphs 380-1 to 380-4, tables 382-1 to 382-4 relate to the impedance values of skin interfaces 330, 332, 334 as shown by impedance lines 350, 352, 354, respectively. Impedance may be measured or estimated in ohms, kilohms, or other appropriate units.

Each of FIGS. 3A-3D represent and include different points in time—e.g. $t_4$ through $t_{11}$. While the same symbols are employed for illustrative purposes, these time periods are different than the time periods to through $t_3$ in FIG. 2. The time periods in FIGS. 3A-3D may occur before, after, or may overlap (wholly or partially) with the time periods discussed with respect to FIG. 3 any other Figure. As noted with respect to FIG. 2, the relative time displayed in graphs 380-1 to 380-4 is also not limiting and does not limit the relative time associated with any particular time period. For example, the time between $t_5$ and $t_6$ appears larger than the time between $t_6$ and $t_7$. While the time from $t_5$ to $t_6$ may be longer than the time between $t_6$ and $t_7$, the time from $t_5$ to $t_6$ may actually be shorter than, or the same as, $t_6$ to $t_7$. The same is true with all other time periods discussed or shown in this specification. The relative times may vary depending on the apparatus, user, conditions, etc. associated with a particular embodiment.

Figure 3A:
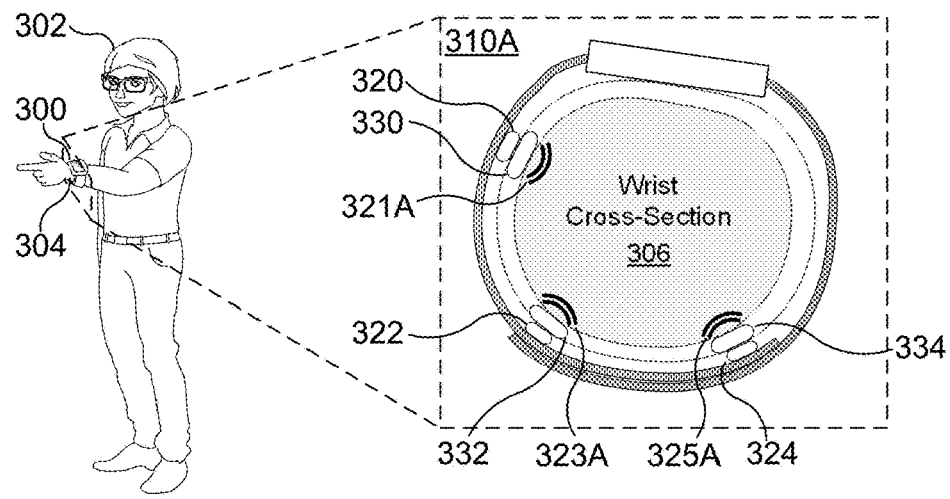
FIGS. 3A-3D illustrate another example wrist-wearable device configured to direct one or more stimulations to a user to achieve desirably low impedance values, illustrates an example impedance-stabilization method for use with the example wrist-wearable device, and also illustrates an example graph and table identifying exemplary impedance and stimulation values, in accordance with some embodiments.
Figure 3A:
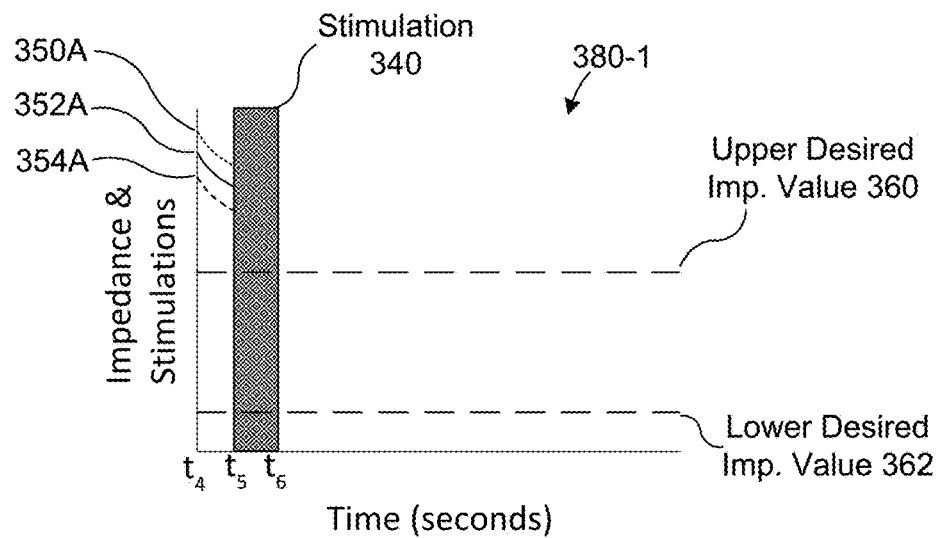

FIG. 3A represents the wrist-wearable device and the stimulations, measurements, etc. that occur during a time period of $t_4$ to $t_6$. Graph 380-1 shows the impedance measurements that are taken during that time period at sensor-skin interfaces 330, 332, and 334. As shown in graph 380-1, the impedance values at each of 330, 332, and 334 (shown through impedance lines 350A, 352A, 354A, respectively) start at a relatively higher value. Each sensor-skin interface in this example has a different starting impedance value at $t_4$ and begins to decrease in value until time $t_5$. At time $t_5$ the impedance values of each of the sensor-skin interfaces 330, 332, 334 is outside the desired impedance value range and stimulation 340 is applied. Stimulation 340 represents the stimulation that is applied by all three of the electrodes 320, 322, 324 and that has been directed toward the respective sensor-skin interfaces 330, 332, 334. These stimulations are shown in cross-section 310A as stimulations 321A, 323A, and 325A, which are applied from a time $t_5$ to $t_6$.

Table 382-1 shows the example impedance values as measured at times $t_4$ and $t_5$. As shown in table 382-1, from $t_4$ to $t_5$, the impedance value of impedance line 350A (sensor-skin interface 330) decreased from 500 to 485, the impedance value of impedance line 352A (sensor-skin interface 332) decreased from 490 to 475, the impedance value of impedance line 354A (sensor-skin interface 334) decreased from 480 to 465.

In some embodiments, stimulations applied at a certain sensor-skin interface may also impact desired impedance ranges at other sensor-skin interfaces, such that one impedance-stabilizing component may be configured to control the impedance values for multiple different biopotential-signal sensors that might be associated with different sensor-skin interfaces (e.g., a point where an electrode associated with the sensor contacts the user's skin, as is shown in, for example, FIGS. 3A-3D). In certain other embodiments, each sensor may be associated with its own impedance-stabilizing component, while still other embodiments may have each sensor in a differential pair be associated with one impedance-stabilizing component for the pair (in the example of one impedance-stabilizing component being associated with a differential pair, then a monitor-skin interface may be selected to be between two electrodes so that an average impedance for the differential pair may be known and monitored for the wrist-wearable device).

Figure 3B:
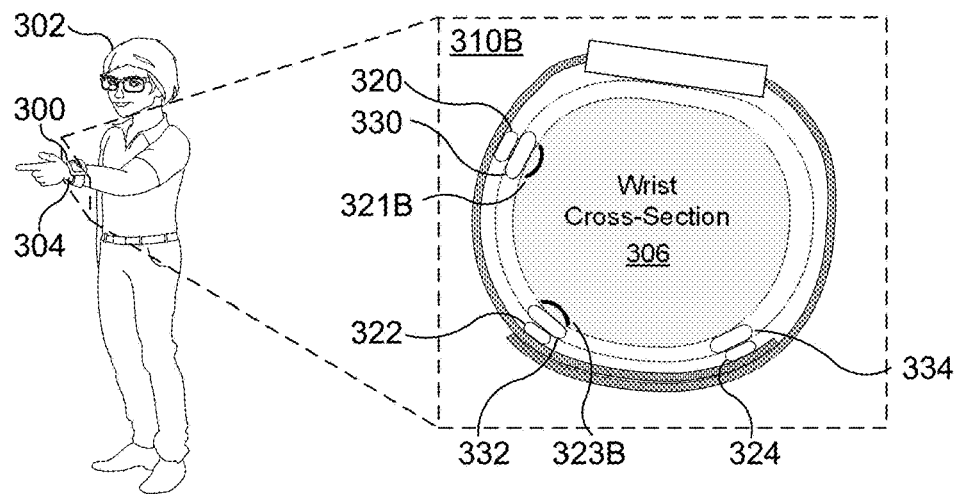
Figure 3B:
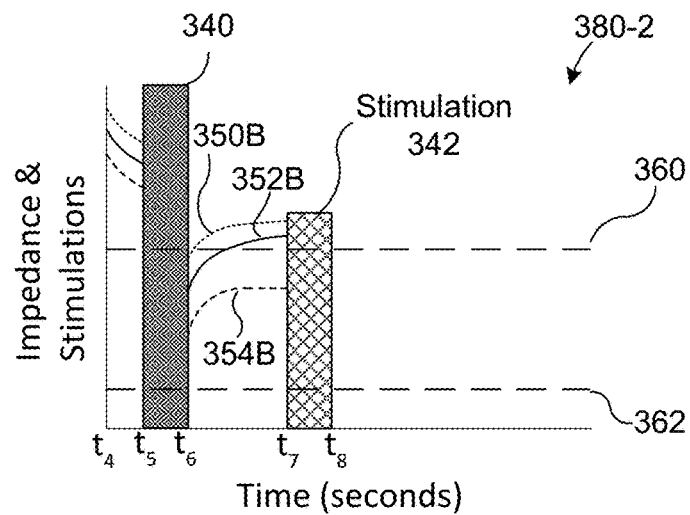

FIG. 3B represents the wrist-wearable device and the stimulations, measurements, etc. that occur during a time period of $t_6$ to $t_8$. Graph 380-2 shows the impedance measurements that are taken during that time period at sensor-skin interfaces 330, 332, and 334. As shown in graph 380-2, the impedance values at each of 330, 332, and 334 (shown through impedance lines 350B, 352B, 354B, respectively) have decreased as a result of stimulation 340. Each sensor-skin interface in this example has a different impedance value at $t_6$ and begins to increase in value and progressively level off time $t_7$. At time $t_7$ the impedance value of sensor-skin interface 334 (impedance line 354B) is within the desired impedance value range, and the impedance values of sensor-skin interfaces 330 and 332 (impedance lines 350 and 352, respectively) are outside the desired impedance value range. As a result, in this embodiment, the wrist-wearable device 300 applies a stimulation at only electrodes 320 and 322 where the corresponding sensor-skin interface impedance values are outside the desired range. Stimulation 342 represents the stimulation that is applied by electrodes 320, 322 and that have been directed into the respective sensor-skin interfaces 330, 332. These stimulations are shown in cross-section 310B as stimulations 321B, 323B, which are applied from a time $t_7$ to $t_8$. In some embodiments, the stimulation characteristics of a second stimulation may be different from a first or any other proceeding or following stimulation. For example, in FIG. 3B, the stimulation 342 has a different stimulation characteristic as stimulation 340. At least one reason for the different stimulation characteristic is that the difference in the measured impedance value and the desired impedance value has decreased from time is (before stimulation 340) as compared to time $t_7$ (before stimulation 342).

Table 382-2 shows example impedance values as measured at times $t_4$ through $t_7$. The impedance values from $t_4$ to is remain the same as discussed with respect to FIG. 3A and are presented in FIG. 3B for reference. As shown in table 382-2, from is to $t_6$ after the stimulation 340 was applied, the impedance value of impedance line 350B (sensor-skin interface 330) decreased from 485 to 190, the impedance value of impedance line 352B (sensor-skin interface 332) decreased from 475 to 160, and the impedance value of impedance line 354B (sensor-skin interface 334) decreased from 465 to 140. From $t_6$ to $t_7$, the impedance value of impedance line 350B (sensor-skin interface 330) increased from 190 to 230, the impedance value of impedance line 352B (sensor-skin interface 332) increased from 160 to 215, and the impedance value of impedance line 354B (sensor-skin interface 334) increased from 140 to 160.

Figure 3C:
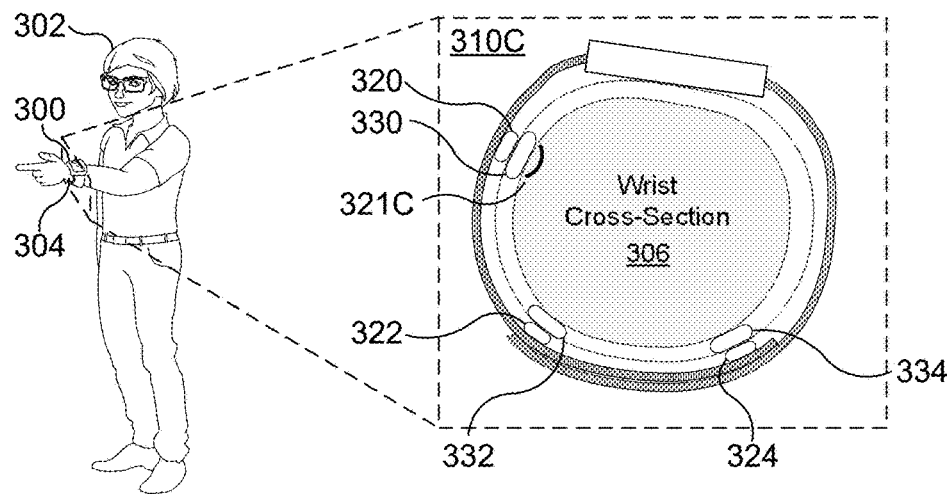
Figure 3C:
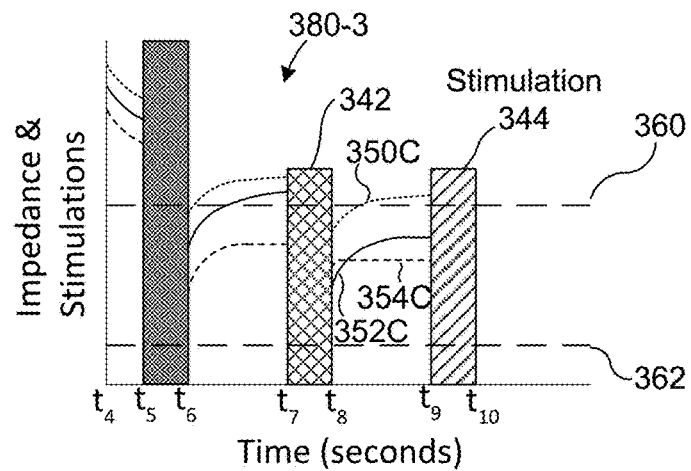
Figure 3C:
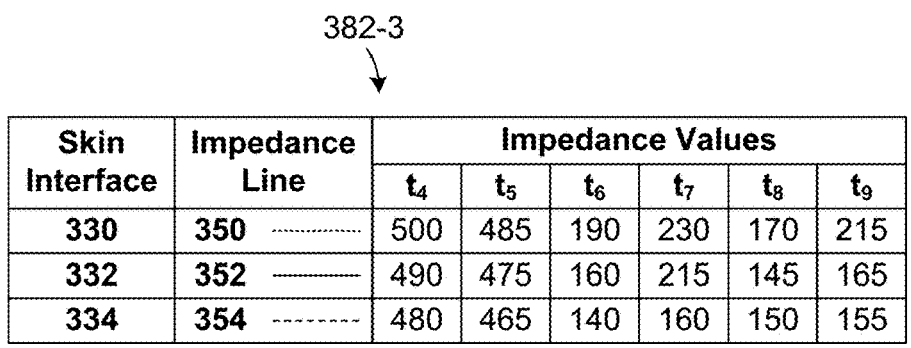

FIG. 3C represents the wrist-wearable device and the stimulations, measurements, etc. that occur during a time period of $t_8$ to $t_{10}$. Graph 380-3 shows the impedance measurements that are taken during that time period at sensor-skin interfaces 330, 332, and 334. As shown in graph 380-3, the impedance values at each of 330, 332, and 334 (shown through impedance lines 350C, 352C, 354C, respectively) have decreased as a result of stimulation 342. Each sensor-skin interface in this example has a different impedance value at $t_8$ and begins to increase in value and progressively level off until time $t_9$. At time $t_8$ the impedance value of sensor-skin interface 334 (impedance line 354) and sensor-skin interface 332 (impedance line 352) is within the desired impedance value range, and the impedance values of sensor-skin interface 330 (impedance line 350) is outside the desired impedance value range. The impedance value at sensor-skin interface 334 may also decrease from $t_7$ to $t_8$ as a result of the stimulations at electrodes 320 or 322. As a result of the measured impedance values in this embodiment, where the impedance value is outside the desired impedance range at only sensor-skin interface 330, the wrist-wearable device 300 applies a stimulation at only electrode 320. Stimulation 344 represents the stimulation that is applied by electrode 320 and that is directed into the respective sensor-skin interface 330. This stimulation is shown in cross-section 310C as stimulation 321C, which is applied from a time $t_9$ to $t_{10}$.

Table 382-3 shows example impedance values as measured at times $t_4$ through $t_9$. The impedance values from $t_4$ to $t_7$ remain the same as discussed with respect to FIG. 3B and are presented in FIG. 3C for reference. As shown in table 382-3, from $t_7$ to $t_8$ after the stimulation 342 was applied, the impedance value of impedance line 350C (sensor-skin interface 330) decreased from 230 to 170, the impedance value of impedance line 352C (sensor-skin interface 332) decreased from 215 to 145, and the impedance value of impedance line 354C (sensor-skin interface 334) decreased from 160 to 150. From $t_8$ to $t_9$, the impedance value of impedance line 350C (sensor-skin interface 330) increased from 170 to 215, the impedance value of impedance line 352C (sensor-skin interface 332) increased from 145 to 165, and the impedance value of impedance line 354C (sensor-skin interface 334) increased from 150 to 155.

Figure 3D:
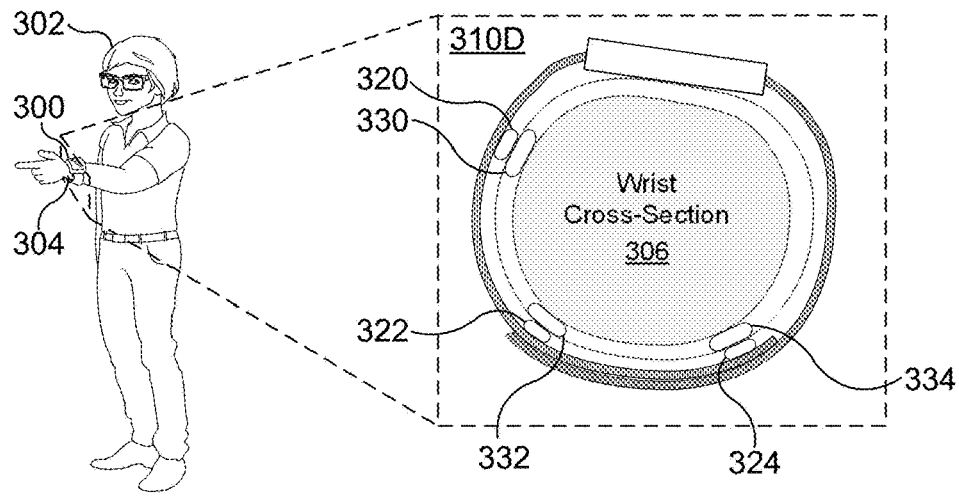
Figure 3D:
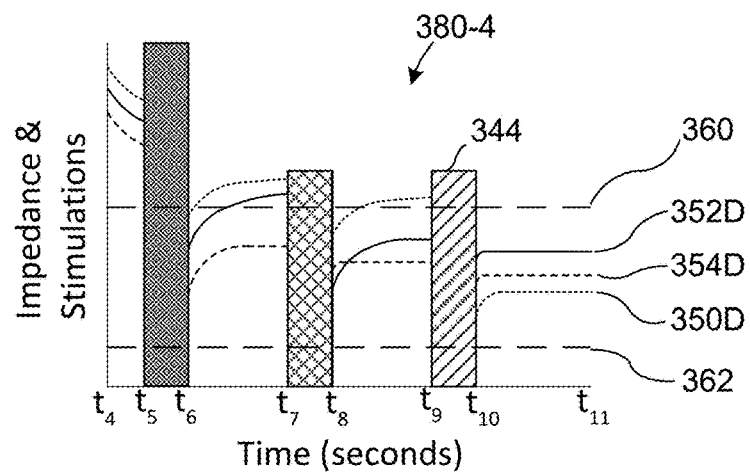

FIG. 3D represents the wrist-wearable device and at least the measurements that occur during a time period of $t_{10}$ to $t_{11}$. Graph 380-4 shows the impedance measurements that are taken during that time period at sensor-skin interfaces 330, 332, and 334. As shown in graph 380-4, the impedance values at each of 330, 332, and 334 (shown through impedance lines 350D, 352D, 354D, respectively) have decreased as a result of stimulation 344. Each sensor-skin interface in this example has a different impedance value at $t_{10}$ and begins to increase in value and progressively level off until time $t_{11}$. At time $t_{11}$ the impedance value of all sensor-skin interfaces 334 (impedance line 354), 332 (impedance line 352), and sensor-skin interface 330 (impedance line 350) are within the desired impedance value range. The impedance value at sensor-skin interfaces 332 and 334 may also decrease from $t_9$ to $t_{10}$ as a result of the stimulation at electrodes 320 as stimulations from electrodes that are further from sensor-skin interfaces may further cause lower impedance values at those sensor-skin interfaces. As a result of the measured impedance values in this embodiment, where the impedance values are within the desired impedance range, the wrist-wearable device 300 determines that it does not need to apply any further stimulations.

Table 382-4 shows example impedance values as measured at times $t_4$ through $t_{11}$. The impedance values from $t_4$ to $t_9$ remain the same as discussed with respect to FIG. 3C and are presented in FIG. 3D for reference. As shown in Table 382-4, from $t_9$ to $t_{10}$ after the stimulation 344 was applied, the impedance value of impedance line 350D (sensor-skin interface 330) decreased from 215 to 130, the impedance value of impedance line 352C (sensor-skin interface 332) decreased from 165 to 155, and the impedance value of impedance line 354C (sensor-skin interface 334) decreased from 155 to 145. From $t_{10}$ to $t_{11}$, the impedance value of impedance line 350D (sensor-skin interface 330) increased from 130 to 140, the impedance value of impedance line 352C (sensor-skin interface 332) increased from 155 to 160, and the impedance value of impedance line 354C (sensor-skin interface 334) increased from 145 to 150.

FIGS. 4A-4D illustrate example stimulation methods and corresponding example ways in which impedance values associated with skin interfaces may be affected, in accordance with some embodiments. In each of FIGS. 4A-4D, a graph is presented where the y-axis corresponds to both measured impedance values, as well as particular stimulation characteristics of impedance-stabilizing stimulations. The x-axis of the graph is measured in seconds, including with certain time intervals. The relative time between, for example, $t_0$ and $t_1$, $t_1$ and $t_2$, and $t_2$ and $t_3$, etc. are purely example. FIGS. 4A to 4D also includes an indication as to an example upper desired impedance value 460 and lower desired impedance value 462. The desired impedance value range is within, and inclusive of, the upper desired impedance value 460 and lower desired impedance value 462.

Figure 4A:
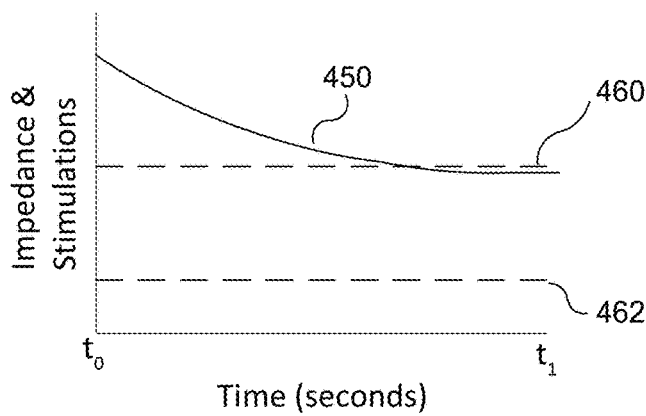
FIGS. 4A-4D illustrate example stimulation methods and corresponding example ways in which impedance values associated with skin interfaces may be affected, in accordance with some embodiments.

FIG. 4A depicts a scenario during which no stimulations are applied. Impedance value line 450 begins at a relatively high value at $t_0$ and begins to gradually decline until $t_1$. Depending on at least a user and other circumstances, the value of impedance line 450 may eventually level off at a level that is within the desired impedance value range. The time it takes for the desired impedance value to be reached is longer than desired.

Figure 4B:
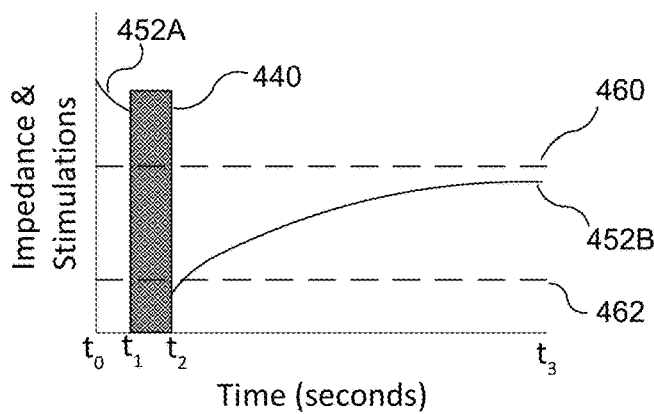

FIG. 4B depicts a scenario during which a single stimulation is applied, similar to the embodiment discussed with respect to FIG. 2. In FIG. 4B, a single stimulation 440 is applied. The impedance values, represented by impedance line 452A and 452B, start at a relatively high value as shown in line 452A from $t_0$ to $t_1$ that is above the upper desired impedance value 460. After the stimulation 440, which occurs from $t_1$ to $t_2$, the impedance value decreases and gradually increases and levels off from $t_2$ to $t_3$ at a value that is within the desired impedance value range, as shown by impedance line 452B.

Figure 4C:
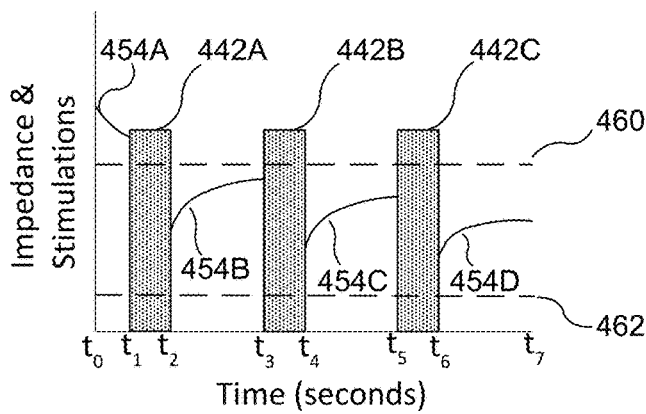

FIG. 4C depicts a scenario during which stimulations are applied repeatedly, one or more times, to maintain desirably low impedance values. The impedance values, represented by impedance line 454A to 454D, start at a relatively high value as shown in line 454A from $t_0$ to $t_1$ that is above the upper desired impedance value 460. Stimulation 442A occurs from $t_1$ to $t_2$. Stimulation 442A may have a lower stimulation characteristic than stimulation 440 in FIG. 4B. As a result of stimulation 442A, the impedance value may decrease (though less than the decrease from the stimulation 440 in FIG. 4B that had a higher stimulation characteristic) and gradually increase and begin to level off from $t_2$ to $t_3$ at a place that is within the desired impedance value range but that is close to the upper desired impedance value 460, as shown by impedance line 454B. Stimulation 442B occurs from $t_3$ to $t_4$. Stimulation 442B may have a stimulation characteristic that is similar to stimulation 442A. As a result of stimulation 442B, the impedance values decrease and begin to level off from a time $t_4$ to $t_5$, as shown in line 454C. Stimulation 442C occurs from $t_5$ to $t_6$. Stimulation 442C may have a stimulation characteristic that is similar to stimulation 442A or 442B. As a result of stimulation 442C, the impedance values decrease and level off in a middle portion of the desired impedance value range from a time $t_6$ to $t_7$, as shown in line 454D.

In FIG. 4C, three stimulations 442A, 442B, 442C are shown. In some embodiments, more or fewer stimulations are applied. In some embodiments stimulations are applied throughout the duration of a user's use of the wrist-wearable device. In some embodiments, the stimulations are applied until the wrist-wearable device determines that the impedance is stable and that further stimulations are not required. In some embodiments, the stimulations are applied at a first rate when the user dons the wrist-wearable device, and then are applied at a different rate to, for example, maintain a desirably low impedance value.

Figure 4D:
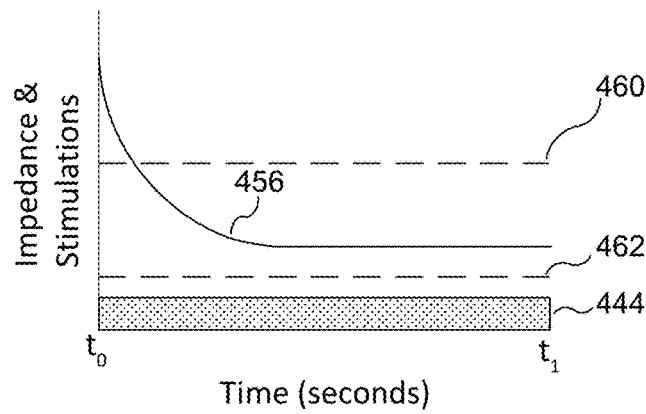

FIG. 4D depicts a scenario during which stimulations are applied continuously. The impedance values, represented by impedance line 456, start at a relatively high value as shown at to that is above the upper desired impedance value 460. A continuous stimulation 444 is applied. The continuous stimulation 444 may have a lower stimulation characteristic than stimulation 440 in FIG. 4B or stimulation 442 in FIG. 4C. As a result of the continuous stimulation, the impedance values may be lowered at a consistent rate and level off within the desired impedance value range at a rate that is faster than one or more of the processes discussed herein.

In addition to altering the impedance of the skin-electrode interface, the skin-electrode interface modulation techniques disclosed herein can be used to reduce noise, improve SnR, and/or improve system settling time.

FIG. 5A-5E illustrate example configurations for certain components (e.g., including impedance-stabilizing and impedance monitoring components) on band portions 501 of a wrist-wearable device 500, in accordance with some embodiments.

The spacing of electrodes and/or other components as shown in FIGS. 5A-5E may be different or the same as shown in those Figures. Additionally, the placement of electrodes and/or other components (e.g., higher or lower on the band portion) may differ from FIGS. 5A-5E. Further, one side of the band portion 501-0, 501-2, 501-4, 501-6, 501-8 may include more or fewer electrodes than the other side of the band portion 501-1, 501-3, 501-5, 501-7, 501-9. In some embodiments, the band portion is comprised of a series of links (e.g. FIG. 7D). The electrodes and/or other components may likewise be placed at various intervals and numbers depending on the configuration and links of the band portion of any suitable wrist-wearable device.

Figure 5A:
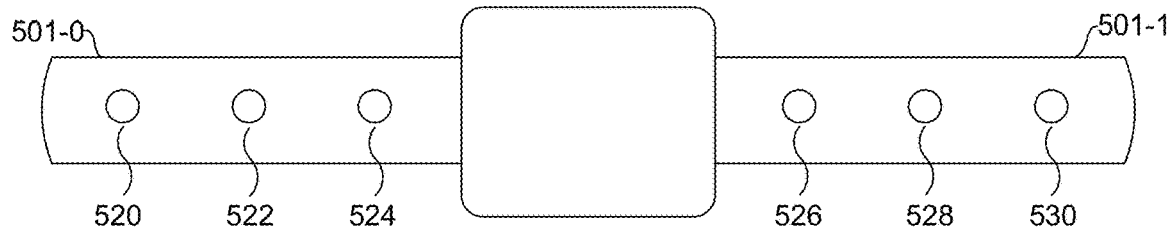
FIGS. 5A-5E illustrate example configurations for certain components (e.g., including impedance-stabilizing and impedance monitoring components) on band portions of a wrist-wearable device, in accordance with some embodiments.

FIG. 5A depicts an example of some embodiments of a wrist-wearable device 500 where electrodes are present on the band portion 501. As shown in FIG. 5A, electrodes 520, 522, 524 are approximately equally spaced on one side of the band portion 501-0, and electrodes 526, 528, 530 are approximately equally spaced on the other side of the band portion 501-1.

Figure 5B:
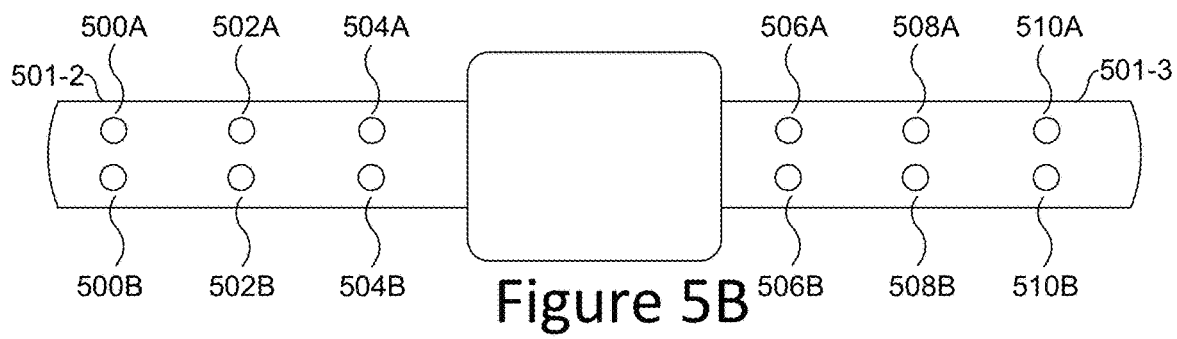

FIG. 5B depicts an example of some embodiments of a wrist-wearable device 500 where the electrodes may be differential pairs. In other embodiments (or even with a same embodiment using different sensing techniques at different points along the band portion), the electrodes may be used for monopolar-sensing purposes. As shown in FIG. 5B, electrodes 500A, 500B, 502A, 502B, 504A, 504B are approximately equally spaced on one side of the band portion 501-2, and electrodes 506A, 506B, 508A, 508B, 510A, 510B are approximately equally spaced on the other side of the band portion 501-3.

Figure 5C:
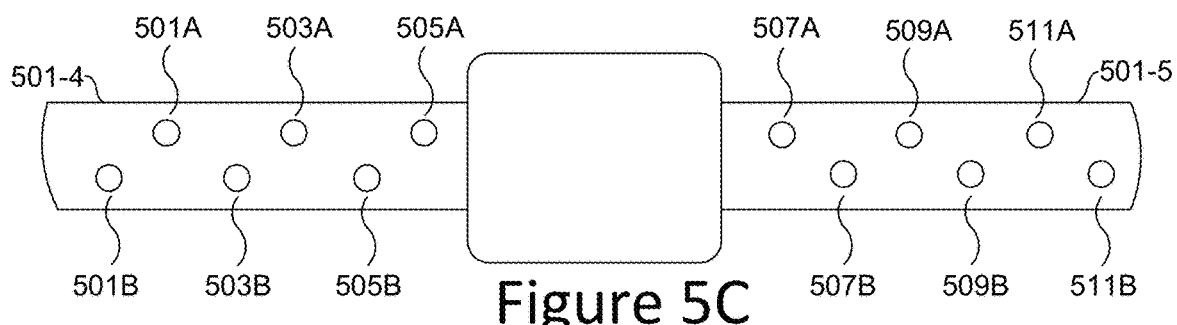

FIG. 5C depicts an example of some embodiments of a wrist-wearable device 500 where electrodes may be offset from one another. As shown in FIG. 5C, electrodes 501A, 501B, 503A, 503B, 503A, 503B are approximately equally spaced on one side of the band portion 501-4, and electrodes 507A, 507B, 509A, 509B, 511A, 511B are approximately equally spaced on the other side of the band portion 501-5. The spacing and offset distance may be different or the same as shown in FIG. 5C.

Figure 5D:
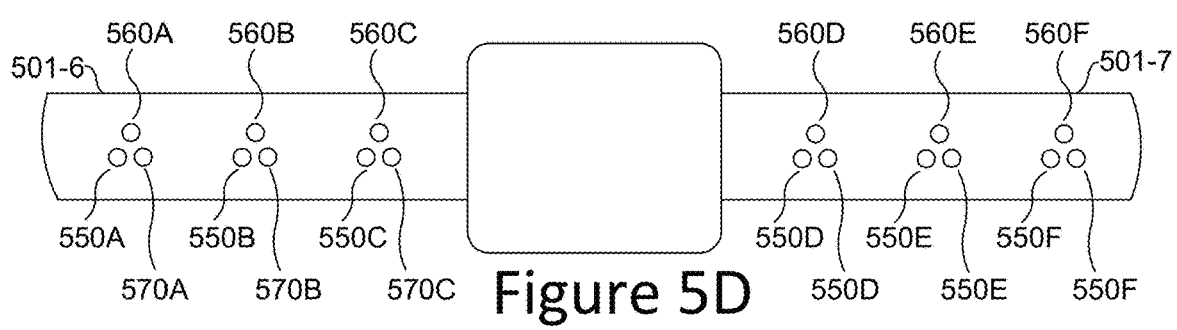

FIG. 5D depicts an example of some embodiments of a wrist-wearable device 500 where one or more of the components of the electrodes are standalone components and not housed inside the electrode. As shown in FIG. 5D, an impedance-stabilizing component 560A, impedance monitor 550A, and EMG sensor 570A are positioned in a triangular design on band portion 501-6. The positioning design of these components may differ, for example they may all be in a single line horizontally, vertically, diagonally. They may be also spread out or placed closer together in other configurations. FIG. 5D shows an example embodiment where impedance-stabilizing component 560B, impedance monitor 550B, and EMG sensor 570B and impedance-stabilizing component 560C, impedance monitor 550C, and EMG sensor 570C are also positioned on band portion 501-6. FIG. 5D further shows an example embodiment where impedance-stabilizing component 560D, impedance monitor 550D, and EMG sensor 570D; impedance-stabilizing component 560E, impedance monitor 550E, and EMG sensor 570E; and impedance-stabilizing component 560F, impedance monitor 550F, and EMG sensor 570F positioned on band portion 501-7.

Figure 5E:
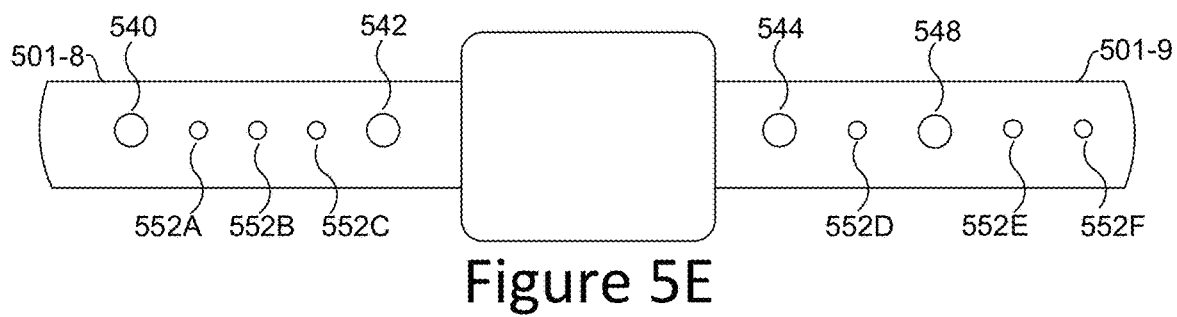

FIG. 5E depicts an example of some embodiments of a wrist-wearable device 500 where electrodes are located on the band portion of the wrist-wearable device and where the band portion also includes impedance monitors or other standalone components and not housed inside the electrode. As shown in FIG. 5E, impedance monitors 552A, 552B, 552C are located in-between electrodes 540 and 542 on band portion 501-8. The configuration and placement of the impedance monitors with respect to the electrodes may differ. For example, one possible other configuration is also shown in FIG. 5E on band portion 501-9, which includes an impedance monitor 552D in between electrodes 544 and 548, and two impedance monitors 552E and 552F to one side of electrode 548.

Figure 6:
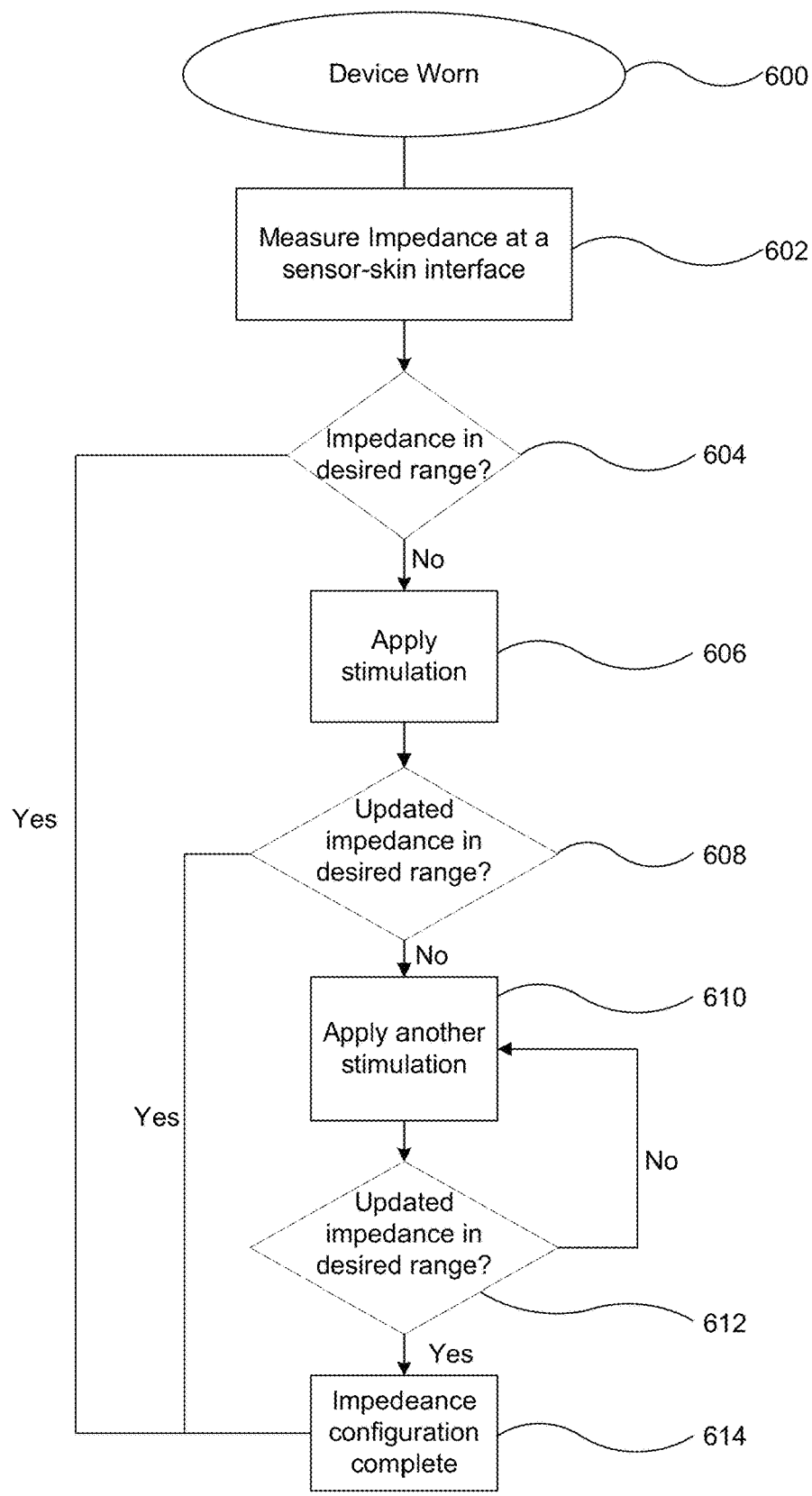
FIG. 6 is a flow chart depicting a method of directing one or more stimulations to a user to achieve desirably low impedance values, in accordance with some embodiments.

FIG. 6 is a flow chart depicting a method of directing one or more stimulations to a user to achieve desirably low impedance values, in accordance with some embodiments. FIG. 6 depicts an example method of an impedance-stabilization technique. The example method of FIG. 6 may be implemented in a computer-readable storage medium (e.g., a non-transitory medium) that includes instructions for execution at a wrist-wearable device (e.g., one of the devices 100) or at a device that is configured to control the wrist-wearable device. At step 600, the wrist-wearable device determines whether the device is worn. At step 602, the wrist-wearable device measures impedance at one or more sensor-skin interface (or, instead of directly measuring an impedance, an estimated value may be determined as was discussed above). At step 604, the wrist-wearable device conducts a determination as to whether the measured impedance is within the desired range. If yes, the impedance configuration proceeds to step 616 and the impedance configuration is complete. If no, the wrist wearable device moves to step 606 and applies a stimulation. At step 608, the wrist-wearable device again measures (or estimates) the impedance at one or more sensor-skin interfaces and determines whether the updated impedance is within the desired range. If yes, the impedance configuration proceeds to step 616 and the impedance configuration is complete. If no, the impedance configuration process moves to step 610. At step 610, the wrist-wearable device applies another stimulation. At step 612, the wrist-wearable device again measures (or estimates) the impedance at one or more sensor-skin interfaces and determines whether the updated impedance is within the desired range. If yes, the impedance configuration proceeds to step 616 and the impedance configuration is complete. If no, the impedance configuration process returns to step 610. At various points during the method of FIG. 6, the device may also be configured to make adjustments to characteristics of the stimulations and/or to time periods at which the scenarios are to be applied.

FIG. 6 depicts a simplified method for explanatory purposes. As a skilled artisan will appreciate upon reading this descriptive text, operations described with references to any of the other Figures may also be used in conjunction with the method of FIG. 6.

To provide a further example, paragraphs preceded with A1-A19 (and B1-D1) below describe a more detailed example of a wrist-wearable device that performs an impedance-stabilization process.

(A1) In accordance with some embodiments, a wrist-wearable device for sensing biopotential signals is provided. The wrist-wearable device includes a plurality of biopotential-signal sensors, each respective biopotential-signal sensor being configured to contact a user's skin at a respective sensor-skin interface and being further configured to sense biopotential signals of the user. The wrist-wearable device further includes a first impedance-stabilizing component associated with at least a first biopotential-signal sensor of the plurality of biopotential-signal sensors. The first impedance-stabilizing component is configured to direct a stimulation to a first sensor-skin interface associated with the first biopotential-signal sensor until an impedance value at the first sensor-skin interface is within a first desired range, the stimulation being compliant with a predefined safety standard. The wrist-wearable device further includes a second impedance-stabilizing component associated with at least a second biopotential-signal sensor of the plurality of biopotential-signal sensors. The second impedance-stabilizing component is configured to direct another stimulation to a second sensor-skin interface, distinct from the first sensor-skin interface, associated with the second biopotential-signal sensor until an impedance value at the second sensor-skin interface is within a second desired range, the other stimulation being compliant with the predefined safety standard. This is shown, for example, in at least FIGS. 1-2.

In some embodiments, each of the plurality of biopotential-signal sensors is a dry electrode configured to sense a biopotential-signal without needing the assistance of a substance like an electrode gel. For example, FIGS. 1A and 1B shows a plurality of dry biopotential-signal sensors positioned circumferentially around a wrist-wearable device (e.g., a smart watch), but other wearable devices are also contemplated, including anklets, bracelets, rings, arm sleeves, gloves, among others.

Preferably, each sensor of the plurality of sensors contacts the user's skin to sense a biopotential signal. The point of contact between a user's skin and a sensor may be referred to herein as the "sensor-skin interface" or a "sensor-skin interface."

In some embodiments, functions executed by the wrist-wearable device 100 may include, without limitation, display of visual content to the user, sensing user input (e.g., sensing a touch, sensing biometric data, sensing biopotential signals, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. In some embodiments, the wrist-wearable device 100 may display one or more messages concerning the impedance stabilization process, impedance stabilization measurements, etc. In some embodiments, functions may be executed on the wrist-wearable device 100 in conjunction with an artificial-reality environment which includes, but is not limited to, virtual-reality (VR) environments (including non-immersive, semi-immersive, and fully-immersive VR environments), augmented-reality environments (including marker-based augmented-reality environments, marker-less augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein may be used with any of these types of artificial-reality environments.

(A2) In some embodiments of A1, the wrist-wearable device further includes circuitry. The circuitry is configured for detecting that the device has been worn by a user. The first impedance-stabilizing component of the wrist wearable device is further configured to direct the stimulation as a result of the circuitry detecting that the device has been worn. And the second impedance-stabilizing component is further configured to direct the other stimulation as a result of the circuitry detecting that the device has been worn. This is shown, for example, in at least FIGS. 1-3, 6, 7C, 10-11.

In some embodiments, the wrist-wearable device includes circuitry, which may be configured at least for detecting that the device has been worn by the user. The circuity may be configured to detect whether the device is being worn in many ways. Several example ways include through detecting motion typically associated with movement when the device is being worn, recognizing that the sensors are activated through contacting the user's skin, as a result of a user pressing a button, for example a power button, connect button, detect button, configuration button, or otherwise, to indicate that the device is being worn or about to be worn. Still other examples include communication with another device or application running on another device—such as on a phone, gaming device, laptop, PC, or similar device—that detects whether the device is being worn.

The circuitry may be further configured to communicate with the impedance-stabilizing components. This communication may include indicating to the impedance-stabilizing components that the device has been worn. This may trigger the impedance-stabilizing components to initiate or direct one or more stimulations.

In one example, the circuitry configured for detecting that the device has been worn by a user may be a microprocessor with programming (e.g., software programming) that assists with the detecting operation (e.g., data from a sensor, such as a PPG sensor or an IMU) and may be provided as an input to the programming executing on the microprocessor to then allow for the detecting operation to be performed.

(A3) In some embodiments of any of A1-A2, in accordance with a determination that the impedance value at the first sensor-skin interface is not within the first desired range, the first impedance-stabilizing component is further configured to direct a stimulation as a result of the determination that the impedance value at the first sensor-skin interface is not within the first desired range. In accordance with a determination that the impedance value at the second sensor-skin interface is not within the second desired range, the second impedance-stabilizing component is further configured to direct a stimulation as a result of the determination that the impedance value at the second sensor-skin interface is not within the second desired range. This is shown, for example, in at least FIGS. 1-4, 6, 10-11.

In some embodiments, the wrist-wearable device includes impedance monitors that may be used to assist with the determinations discussed above. The impedance monitors may be configured to monitor or estimate impedance values. In some embodiments, the wrist-wearable device includes circuitry that is configured to determine whether the impedance values are within certain ranges (which may be the impedance monitors discussed in the prior sentence). The circuitry may be further configured to be in communication with one or more of the impedance-stabilizing components. If the measured or monitored impedance value is found to be outside a desired range, the circuitry may communicate with one or more of the impedance-stabilizing components to instruct or initiate the impedance-stabilizing component to direct a stimulation. The stimulation may be applied until the impedance reaches a value within a desired range, which may be the same or different from a range initially specified.

In some embodiments the desired impedance value range is between 2-15 MΩ. In some embodiments, the predefined range of impedance values may be 500 kΩ-5 MΩ. In some embodiments, the predefined range of impedance values is narrower, such as 2-5 MΩ. In some embodiments, the predefined range of impedance values is further narrower, such as 2-3 MΩ. The specified range of desired impedance values may also be between 50 and 300 Kiloohms. In some embodiments it may be desirable for the impedance value to be less than 100 Kiloohms. The desired impedance value range may include other ranges. The specified range may be the same, or may be different, from user to user and from time to time. The specified range may also be the same, or may be different, depending on the location of the measurement of impedance. Depending on the characteristics of a certain person, the sensor-skin interface, quality of reception, location of the particular sensor, electrode, impedance monitor, etc., room temperature or humidity, or depend upon other conditions.

The determinations discussed above may be conducted on an ongoing basis while the wrist-wearable device is worn by the user, such as being conducted every 2 seconds to continuously monitor whether the impedance values remain within the known and desirable ranges. In this way, the system repeatedly checks and then makes any needed corrections to impedance values that might shift over time. In this one example, the determinations discussed above may be conducted after the initial stimulations were applied, such that this example provides one instance where the system has made a necessary correction to keep impedance values in the desired ranges.

(A4) In some embodiments of any of A1-A3, the first impedance-stabilizing component is further configured to direct the stimulation to the first sensor-skin interface associated with the first biopotential-signal sensor for no more than a particular duration of time. The second impedance-stabilizing component is configured to direct the stimulation to the second sensor-skin interface associated with the second biopotential-signal sensor for no more than the particular duration of time. This may be shown, for example, in at least FIGS. 1-4, 6, 10-11.

In some embodiments, the wrist-wearable device may direct one or more stimulations such that the impedance value reaches a desired range within a particular period of time. The period of time is preferably less than a minute, but may include other time periods or a range of time periods. As one non-limiting example, the impedance value range may be reached in under 30 ms. In another non-limiting example, the desired impedance value range may be reached in a time period of 2-15 ms.

(A5) In some embodiments of any of A1-A4, the wrist-wearable device further includes a first impedance monitor. The first impedance monitor is configured to determine an impedance value at a first monitor-skin interface associated with the first biopotential-signal sensor, or the first impedance-stabilizing component, or both. The first monitor-skin interface is distinct from the first sensor-skin interface. The wrist-wearable device also includes a second impedance monitor. The second impedance monitor is configured to determine an impedance value at a second monitor-skin interface associated with the second biopotential-signal sensor, or the second impedance-stabilizing component, or both. The second monitor-skin interface is distinct from the second sensor-skin interface. Each respective impedance monitor is different from each respective biopotential-signal sensor and different from each respective impedance-stabilizing component. This is shown, for example, in at least FIGS. 1, 10-11.

In some embodiments, the wrist-wearable device may include different components for achieving different, related, or the same purposes. For example, one component may be dedicated to impedance monitoring. These components may be referred to herein as impedance monitors or impedance sensors or the like. One component may be dedicated to sensing biopotential-signals. These components may be referred to herein as biopotential-signal sensors or monitors, electromyography (EMG) sensors or monitors, electroencephalography (EEG) or monitors, electrocardiography (EKG) or monitors, or the like. One further component may be dedicated to directing stimulations. These components may be referred to herein as impedance-stabilizing components.

In some embodiments the stimulations directed by one or more of the impedance-stabilizing components is mechanical, optical, or electrical.

In some embodiments, all of the above mentioned functions—for example, impedance monitoring, biopotential-signal sensing, and stimulation directing—can be within the same component, which may be referred to herein as an electrode. However, the use of the term electrode throughout the specification is not limited only to electrodes that are capable of accomplishing the above three functions. An electrode, as referred to herein, may refer to a component capable of accomplishing one, two, three, or none of these functions. The electrode's functionality is not limited to these three functionalities. The electrode may also be capable of accomplishing all three of these functions, as well as many others.

In some embodiments, for example embodiments where the components are not within the same electrode or where the impedance monitors are separate from one or more other component, the impedance monitors may have an impedance monitor-skin interface that is different from the sensor-skin interface. In such an example situation, the monitor-skin interface may be close to, or may be further from, one or more of the sensor-skin interfaces. In some embodiments, a particular monitor-skin interface may be associated with a sensor-skin interface. Such an association may include, but is not limited to, where the monitor-skin interface of a first impedance monitor estimates, measures, or monitors impedance values of the first biopotential-signal sensor. In some embodiments, there may be a direct relationship between a single impedance monitor and a single biopotential-signal sensor. In some embodiments, there a single impedance monitor may determine the impedance associated with one or more biopotential-signal sensors.

In some embodiments, the wrist-wearable device may also include a combination of electrodes that are capable of accomplishing one or more of the impedance monitoring, biopotential-signal sensing, and stimulation direction functions, along with other electrodes that may accomplish less than all of these functions. The wrist-wearable device may also include, in addition to the one or more different electrodes, additional stand-alone impedance monitors, biopotential-signal sensors, or stimulation directors as may be useful.

(A6) In some embodiments of any of A1-A5, the wrist-wearable device further includes a plurality of electrodes. The wrist-wearable device further includes a first impedance monitor that is configured to determine the impedance value at the first sensor-skin interface. The wrist-wearable device further includes a second impedance monitor that is configured to determine the impedance value at the second sensor-skin interface. The first impedance monitor, the first impedance-stabilizing component, and the first biopotential-signal sensor are within a first electrode of the plurality of electrodes. The second impedance monitor, the second impedance-stabilizing component, and the second biopotential-signal sensor are within a second electrode of the plurality of electrodes. This is shown, for example, in at least FIGS. 1-4, 12.

(A7) In some embodiments of any of A1-A6, each electrode of the plurality of electrodes is paired with another electrode of the plurality of electrodes to form a differential sensing channel. This is shown, for example, in at least FIGS. 1-5, 7E.

(A8) In some embodiments of any of A1-A7, the first impedance-stabilizing component is further configured to direct the stimulation continuously. This is shown, for example, in at least FIGS. 1-4, 6.

In some embodiments, the stimulation directed by one or more of the impedance-stabilizing components may be applied in different ways. The stimulation may be applied continuously for an entire period. The stimulation may also be applied in intervals, such that the stimulation is applied for a certain period and then is not applied for a certain period. The stimulation may also be applied more intensely for a certain period, and then applied less or more intensely for another period of time. In some embodiments the stimulation may be applied for a period ranging from 1 millisecond to 60 seconds, though the stimulation may be applied for a longer or shorter amount of time.

The periods of time may correspond to a predetermined time, or may correspond to a time set by certain user settings, user profile, user characteristics, or otherwise. The period may also be tied to the corresponding impedance values, such that the length of the periods of time is at least partially determined by the sensed impedance values such that the periods of time are longer, shorter, more frequent, or less frequent based on, for example, how close the measured impedance value is to the desired impedance value range and/or how quickly the measured impedance value is approaching or going away from a desired impedance value range.

The stimulations applied by the respective impedance-stabilizing components may be applied in the same or different ways. As one non-limiting example, the stimulation directed by a first impedance-stabilizing component may be applied continuously for a first period of time, the stimulation directed by a second impedance-stabilizing component may be applied at a first set of intervals, the stimulation directed by a third impedance-stabilizing component may be applied continuously for a second period of time that is different or the same as the first period of time, and the stimulation directed by a fourth impedance-stabilizing component may be applied at a second set of intervals that may be different or the same as the first set of intervals. In this non-limiting example, one or more of the respective impedance-stabilizing components may be at a different, or be at the same, sensor-skin interface location. In some embodiments, a stimulation characteristic of the stimulations may also be the same or be different.

(A9) In some embodiments of any of A1-A8, the first impedance-stabilizing component is further configured to direct the stimulation for a certain time period. The certain time period being within the range of 1 millisecond to 60 seconds. This may be shown, for example, in at least FIGS. 1-4, 6.

(A10) In some embodiments of any of A1-A9, the first impedance-stabilizing component is further configured to direct mechanical, optical, or electrical stimulations. This is shown, for example, in at least FIGS. 1-4.

(A11) In some embodiments of any of A1-A10, the first desired impedance range and the second desired impedance range is less than 100 Kiloohms. This is shown, for example, in at least FIGS. 1-4.

(A12) In some embodiments of any of A1-A11, the first impedance-stabilizing component is a current generator configured to direct a stimulation of between 5 and 20 Volts. This is shown, for example, in at least FIGS. 1-4.

In some embodiments one or more of the impedance-stabilizing or impedance-adjusting component is a current generator. The current generator may be of any type known to those of ordinary skill in the art. The current generator may be configured to direct a stimulation of between 5 and 20 volts. The current generator may also be configured to direct a stimulation of other values.

(A13) In some embodiments of any of A1-A12, the predefined safety standard is the International Electrotechnical Commission (IEC) 62368-1 standard and the stimulations are within ES1 levels. This is shown, for example, in at least FIGS. 1-4.

(A14) In some embodiments of any of A1-A13, the wrist-wearable device further includes circuitry. The circuitry is configured for learning characteristics of a user and is further configured for storing the characteristics of the user. The first and second impedance-stabilizing components are further configured to direct respective stimulations based on at least one stored characteristic of the user. This is shown, for example, in at least FIGS. 1-4, 6, 7C, 9A, 10-11.

The wrist-wearable device 100 may include circuitry or other electronics, memory, non-transitory, computer-readable storage medium including instructions that, one or more processors, or other components. In addition to enabling other capabilities as may be discussed herein or well known to those of ordinary skill in the art, such components may be configured to enable the wrist-wearable device to store user-specific profiles. The user specific profiles may include many types of information related to the user, including information input by the user (e.g., body weight, height, hair and eye color, location, etc.) or information that has been determined by the wrist-wearable device. For example, the wrist-wearable device may learn certain characteristics regarding impedance values associated with certain users. The wrist-wearable device may also learn how a user reacts to certain stimulations, including at least the magnitude, duration, and progression of any stimulations applied to the user. The wrist-wearable device may also learn the time in which the user's impedance values are usually lowered to within a desired range, and the rate at which those impedance values are typically lowered. The wrist-wearable device may also implement different stimulation programs—for example by implementing longer or shorter stimulations, or by applying stimulations in intervals, or by applying stimulations in intervals that are different form intervals that have been previously applied—to determine whether the user's impedance values may be lowered more quickly or into a more desirable range of impedance values through a different stimulation program.

By learning, storing, and using certain user information in user-specific profiles, the wrist-wearable device is capable of enhancing the user's experience by enabling optimal impedance values to be reached in a more rapid and efficient manner. Storing such values may be advantageous for other reasons. For example, if the wrist-wearable device applies stimulations in a manner that typically results in a user's impedance values to be lowered to a certain range within a certain period of time, but this time the same stimulations have no (or a different) effect on the user, it may indicate to the wrist-wearable device that there is an issue. Example, non-limiting, issues may include electrode contact, electrode placement, interference from user's clothing, hair, sweat, etc. This may also enable possibilities regarding detecting problems with the user's health.

(A15) In some embodiments of any of A1-A14, the first and second impedance-stabilizing components are further configured to monitor impedance at a rate of least once every 200 milliseconds. This is shown, for example, in at least FIGS. 1-4, 6.

In some embodiments, the impedance-stabilizing components are configured to monitor impedance values at a rate. The rate may change based on certain characteristics, such as pre-defined rates set by the wrist-wearable device, user settings, the user profile, or otherwise. In some embodiments, impedance is monitored through large scale time slicing, for example through measuring the impedance values no more than once every 200 milliseconds but at least once a minute. In some embodiments, impedance is monitored through small scale time slicing, for example through measuring impedance values at least once every 200 milliseconds. In some other embodiments, impedance may be monitored through tiny slicing between samples, for example through measuring impedance values at least once every millisecond. In yet another embodiment, impedance may be monitored continuously.

In some embodiments, the impedance measurement rate may change through the use of the device by the user. For example, when applying simulations to reduce impedance values to within the desired range, the impedance monitoring may be performed at a higher rate. And, after a certain time or once the impedance values have stabilized, the impedance monitoring may be performed at a lower rate. Such a lowering of the rate of measuring impedance values may be beneficial to, for example, reduce battery drain. The impedance value may also be monitored at a faster rate when the measured impedance values are closer to the boundaries of the desired impedance range, and may monitor at a slower rate when the impedance values are within the desired range and further from the boundaries of the range.

In some embodiments, the impedance measurement rate may also depend on a user's profile or on the feedback from a particular user. For example, if measured impedance values have a high level of variation, or are changing at a rate that is faster than normal, the impedance values may be monitored at a faster rate for a certain duration until the level of variation or rate of change has reduced to a normal amount. As another example, if the wrist-wearable device knows, at least through a user's stored profile, that a certain user typically has stable impedance values or has impedance values within a certain range, but the measured impedance values are unstable or are outside that certain range, the impedance monitor may increase the rate at which it monitors impedance.

In some embodiments, the impedance monitoring rate may be increased if, for example, the wrist-wearable device detects that there has been movement of the wrist-wearable device in relation to the user. For example, if the wrist-wearable device senses a movement in positioning or senses a disturbance or other shift in the sensor-skin interface, the wrist-wearable device might monitor impedance at a faster rate. In some embodiments, an impedance value of a biopotential-signal sensor may fall outside of the predefined range of impedance values due to a detected change in the impedance at respective biopotential-signal sensors (e.g., a change caused by moisture at the user's skin, user movement, interference between the user's skin and the biopotential-signal sensor (e.g., hair, dirt, or any other foreign object contacting or positioned between the biopotential-signal sensor and the user's skin; in some embodiments, a foreign object is any object other than the user's skin and a biopotential-signal sensor), a user sweating, or other examples). Additionally, or alternatively, in some embodiments, an impedance value of a biopotential-signal sensor may fall outside of the predefined range of impedance values due to the biopotential-signal sensor's position or relative movement on the user's skin (e.g., poor contact with the user's skin, position over a user's bone that provides poor signal readings, and/or improper placement of the biopotential-signal sensor on the user's skin).

In some embodiments, the impedance monitoring rate may be increased based on the certain activity that the user is performing. For example, if the wrist-wearable device knows that the user is engaging in an activity that is likely to introduce more movement and potential disruption or movement in the sensor-skin interface, the impedance monitoring rate might be increased to, for example, quickly account for any such movement. As another example, if the wrist-wearable device knows that the user is engaging in an activity that is likely to introduce less or little movement or the potential for disruption of the sensor-skin interface is lower, the impedance monitoring rate may be decreased.

In some embodiments, the wearable device may also be wearable on locations other than the wrist of a user. For example, the device may be wearable on a user's forearm, upper arm, ankle, lower leg, upper leg, foot, or in any other suitable location. The specification's discussion of a wrist-wearable device is not intended, and should not be interpreted, to limit the wearable device to only being placeable or wearable on a wrist.

(A16) In some embodiments of any of A1-A15, the first impedance-stabilizing component being configured to direct the stimulation to the first sensor-skin interface associated with the first biopotential-signal sensor until the impedance value at the first sensor-skin interface is within the first desired range includes the first impedance-stabilizing component being configured to direct a first stimulation with a first value for a stimulation characteristic at the first sensor-skin interface. The wrist-wearable device further includes an impedance monitor configured to, after the first stimulation, measure or estimate a first impedance value at the first sensor-skin interface. The first impedance-stabilizing component is further configured to, after the measurement or estimation of the first impedance value at the first sensor-skin interface, apply a second stimulation with a second value for the stimulation characteristic, the second value being distinct from the first value. This is shown, for example, in at least FIGS. 1-4, 6, 10-11.

In some embodiments, the impedance-stabilizing components are configured for directing stimulations based on the effectiveness of the applied stimulations. In one example embodiment, the impedance-stabilizing component may direct a first stimulation that has a stimulation characteristic that is lower than the stimulation characteristic that is anticipated to be the optimal level of the stimulation characteristic for the stimulation. The optimal level of the stimulation characteristic(s) may be based on pre-stored information loaded by the manufacturer, user, or predictive algorithms. The optimal level may also be based on a given user's profile and historical information concerning impedance values and a certain user's reactions to certain stimulations, intensities, patterns, etc. The optimal level may also be universal.

A stimulation characteristic may be a variety of characteristics of the stimulation, including the intensity, power, voltage, current, length, location, wavelength, etc. of the stimulation.

It should be noted that throughout the specification the measurement, sensing, or otherwise of impedance values may represent or correspond to an actual measured impedance values or may also represent an estimation of the impedance value.

After the first stimulation has been applied, the impedance-stabilizing component, impedance monitor, electrode, or otherwise may measure or estimate the impedance value. The impedance value measurement may be the first impedance value measurement performed, or may be compared to a previous impedance value measurement that was taken before the application of the first stimulation or that was taken at any other point of time.

The impedance-stabilizing component may further be configured to then direct a second stimulation to the sensor-skin interface. The second stimulation is applied with a stimulation characteristic that may be higher than the first stimulation applied. The stimulation characteristic of the second stimulation may also be lower than the stimulation characteristic of the first stimulation applied. The stimulation characteristic of the second stimulation may be lower than the stimulation characteristic of the first stimulation if, for example, the first stimulation had a greater effect on the impedance value than expected, for example in a situation where the measured impedance after the first stimulation is closer to the desired threshold than expected.

The impedance-stabilizing component may further be configured to, after the second stimulation has been directed, to take a second measurement or estimate of the impedance value at the sensor-skin interface. The impedance-stabilizing component may be configured to, based at least on the second measurement, determine the change in the measured or estimated impedance from the first measured impedance value to the second measured impedance value. If, for example, the change from the first to second impedance values was greater than expected, the impedance-stabilizing component may decrease the stimulation characteristic of a subsequent stimulation. If, for example, the change from the first to second impedance value was lower than expected, the impedance-stabilizing component may increase the stimulation characteristic of a subsequent stimulation. If, for example, the change from the first to second impedance values was as expected, the impedance-stabilizing component may maintain the stimulation characteristic of a subsequent stimulation.

In some embodiments, the increase or decrease of the stimulation characteristic(s) of a subsequent stimulation may be a pre-defined change to the stimulation characteristic of the stimulation regardless of the difference in the expected difference of impedance from a first measurement to a second measurement. In some other embodiments the change of the stimulation characteristic(s) of a subsequent stimulation will vary based on the difference in expected versus actual effectiveness of a previous stimulation. For example, if the actual effect of the second stimulation was much lower than expected, the subsequent stimulation applied may have a stimulation characteristic that is higher than if the actual effect of the second stimulation was only slightly lower than expected.

In some embodiments, this measurement and adjustment of subsequent stimulations may be repeated at various intervals. For example, it may be repeated after every stimulation, after every other stimulation, after a set period of time during which one or more stimulation has been applied, or at any other rate. This may be repeated until the measured impedance value is within the desired impedance value range.

In some embodiments, each respective impedance-stabilizing component, electrode, or otherwise may be configured to perform the above discussed actions at the same times, at different times, or to apply different levels of stimulations and adjustments in the stimulation characteristic(s) as necessary based on the particular user and the impedance measurements or estimations at a particular sensor-skin interface.

(A17) In some embodiments of any of A1-A16, the first impedance-stabilizing component is further configured to measure one or more properties of the first impedance-stabilizing component. The first impedance-stabilizing component is further configured to determine stimulation parameters from the measured properties and from at least one stored characteristic of the user And the first impedance-stabilizing component is further configured to direct a stimulation based on the determination. This is shown, for example, in at least FIGS. 1-4, 6, 10-11.

(A18) In some embodiments of any of A1-A17, the wrist wearable device further includes a third biopotential-signal sensor of the plurality of biopotential-signal sensors. The first impedance-stabilizing component is also associated with the third biopotential-signal sensor of the plurality of biopotential-signal sensors, the first impedance-stabilizing component configured to direct the stimulation to a third sensor-skin interface associated with the third biopotential-signal sensor until an impedance value at the third sensor-skin interface is within a third desired range, the stimulation being compliant with the predefined safety standard. In other words, one impedance-stabilizing component may be used to help stabilize impedances at multiple different sensor-skin interfaces. This may help to reduce the number of impedance-stabilizing components included with a wrist-wearable device 100. This is shown, for example, in at least FIGS. 1-4, 6, 10-11.

In some embodiments, the impedance-stabilizing components are configured for directing stimulations based on active measurements and tracking. In some embodiments, the impedance-stabilizing components may be further configured to measure one or more properties of one or more respective impedance-stabilizing components. Such properties may include electrical, mechanical, optical, and/other properties of the component, associated electrode, or otherwise. By way of further example, such properties may include (1) the current-voltage relationship, for example as a sweep or at several points, (2) the impedance phase at one or more frequencies, (3) the total charge transferred in a specified waveform, and/or (4) the half-cell potential. These properties are strictly by way of example any may include other properties.

Based on the measured properties of one or more of the respective impedance-stabilizing components, the impedance-stabilizing component may be further configured to infer stimulation parameters based on the measured properties. The stimulation parameters may also be based on a user's historical data that may be acquired through the user's profile or from previous impedance and/or stimulation data acquired through a user's use of the wrist-wearable device or any other related system. The stimulation parameters may vary in accordance with any of the potential stimulations and stimulation processes as discussed herein or as would be useful. For example, through applying stimulations continuously, in intervals, at different intensities, and so forth.

The impedance-stabilizing components may be further configured to apply a stimulation to the respective sensor-skin interface according to the determined or inferred stimulation parameters.

(A19) In some embodiments of any of A1-A18, the wrist wearable device may apply stimulations in accordance with sensitivity-stabilizing mode in accordance with a selected biopotential-signal sensitivity need until a characteristic at the first sensor-skin interface satisfies the selected biopotential-signal sensitivity need. This is shown, for example, in at least FIGS. 1-4, 6, 10-11.

(B1) In another aspect example described herein a method is provided. The method includes a wrist-wearable device, the wrist-wearable device being configured to perform or cause performance of a method of any of any of A1-A19. Means for performing a method of any of A1-A19 may also be provided.

(C1) Another aspect example described herein is a non-transitory, computer-readable storage medium including instructions that, when executed by a wrist-wearable device, cause the wrist-wearable device to perform or cause performance of a method of any of A1-A19.

(D1) Another aspect example described herein is a head-worn display device (e.g., augmented-reality glasses or a virtual-reality headset), the system configured to present user interfaces via the head-worn device, the wrist-wearable device comprising any of A1-A19.

Having thus described FIGS. 1A-6, as well as various example aspects of A1-D1 above, certain system-level block diagrams (depicting components used with the impedance-stabilizing techniques discussed herein) will now be described.

Example System-Level Block Diagrams

Figure 7A:
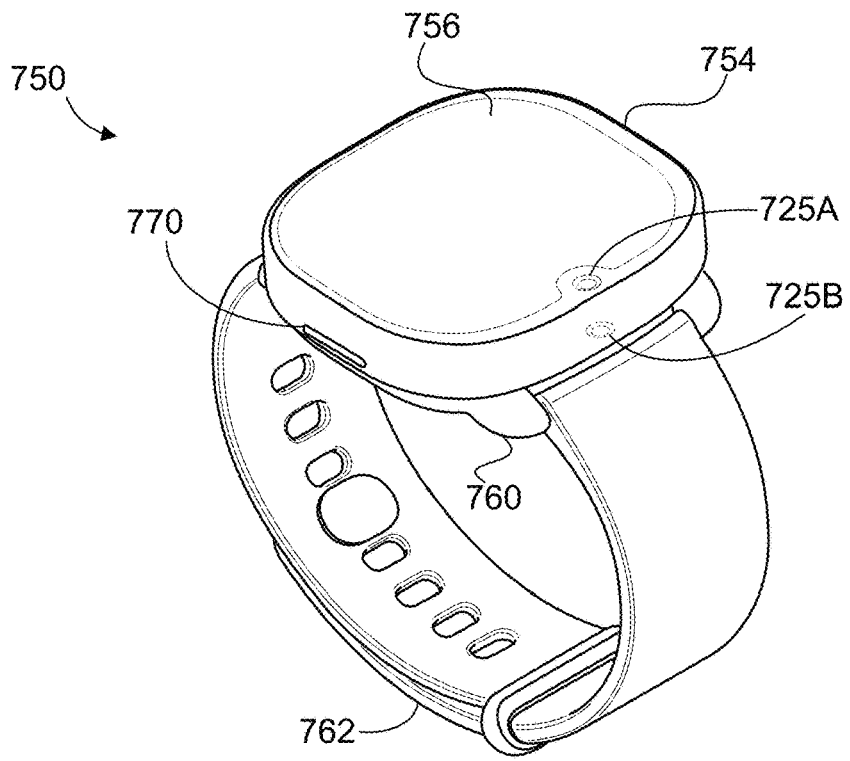
FIGS. 7A-7E illustrate example wrist-wearable devices, in accordance with some embodiments.
Figure 7A:
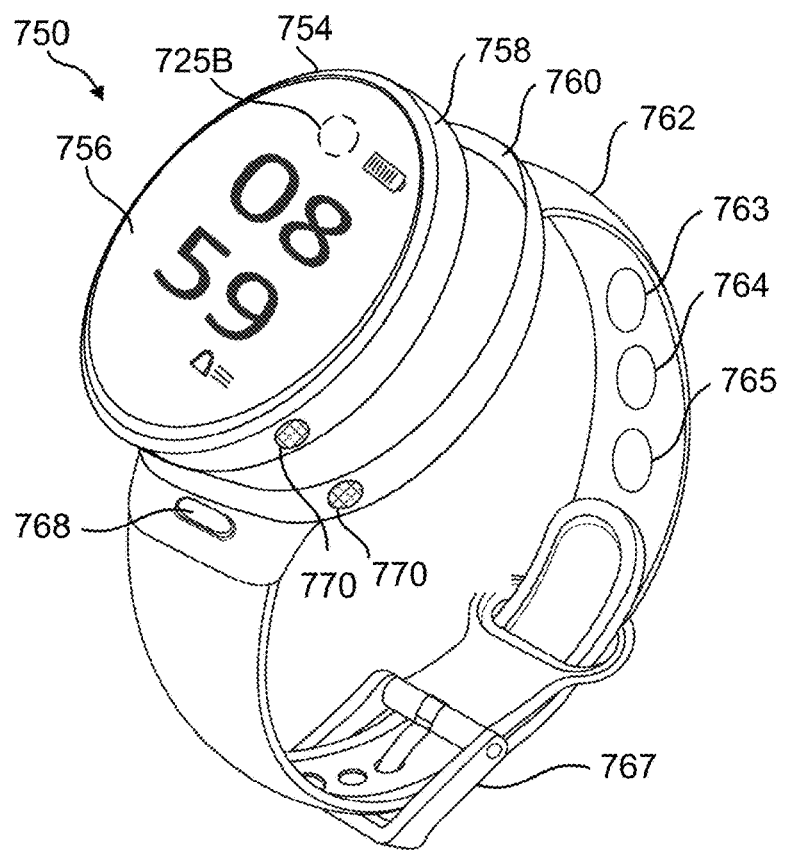
Figure 7B:
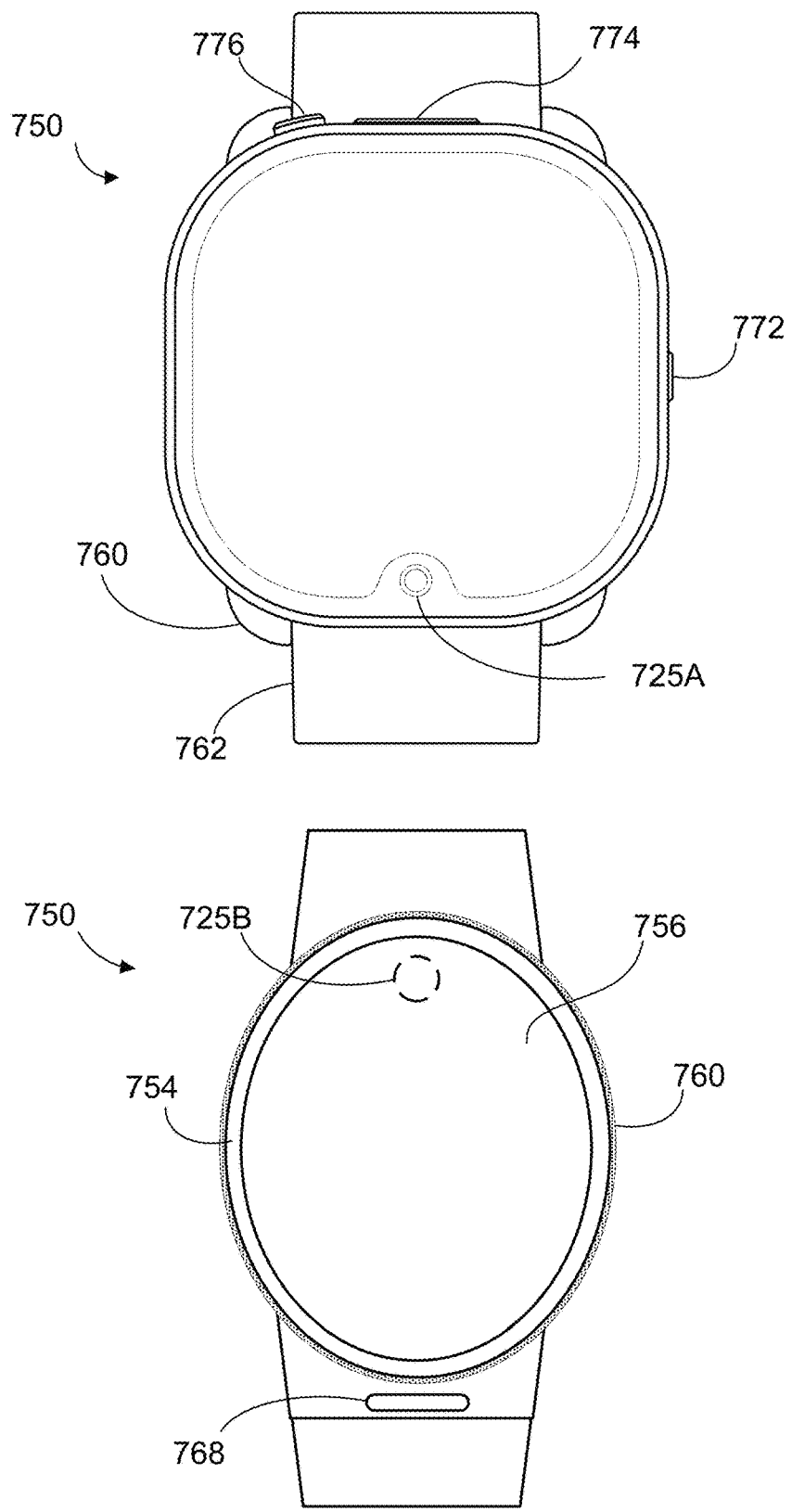

FIGS. 7A and 7B illustrate an example wrist-wearable device 750, in accordance with some embodiments. The wrist-wearable device 750 is an instance of the wearable device described herein (e.g., device 100), such that the wearable device should be understood to have the features of the wrist-wearable device 750 and vice versa. FIG. 7A illustrates a perspective view of the wrist-wearable device 750 that includes a watch body 754 coupled with a watch band 762. The watch body 754 and the watch band 762 may have a substantially rectangular or circular shape and may be configured to allow a user to wear the wrist-wearable device 750 on a body part (e.g., a wrist). The wrist-wearable device 750 may include a retaining mechanism 767 (e.g., a buckle, a hook and loop fastener, etc.) for securing the watch band 762 to the user's wrist. The wrist-wearable device 750 may also include a coupling mechanism 760 (e.g., a cradle) for detachably coupling the capsule or watch body 754 (via a coupling surface of the watch body 754) to the watch band 762.

The wrist-wearable device 750 may perform various functions associated with navigating through user interfaces and selectively opening applications. As will be described in more detail below, operations executed by the wrist-wearable device 750 may include, without limitation, display of visual content to the user (e.g., visual content displayed on display 756); sensing user input (e.g., sensing a touch on peripheral button 768, sensing biometric data on sensor 764, sensing biopotential signals on biopotential sensor 765, etc.); messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions may be executed independently in the watch body 754, independently in the watch band 762, and/or in communication between the watch body 754 and the watch band 762. In some embodiments, functions may be executed on the wrist-wearable device 750 in conjunction with an artificial-reality environment that includes, but is not limited to, virtual-reality (VR) environments (including non-immersive, semi-immersive, and fully immersive VR environments); augmented-reality environments (including marker-based augmented-reality environments, marker-less augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein may be used with any of these types of artificial-reality environments.

The watch band 762 may be configured to be worn by a user such that an inner surface of the watch band 762 is in contact with the user's skin. When worn by a user, sensor 764 is in contact with the user's skin. The sensor 764 may be a biosensor that senses a user's heart rate, saturated oxygen level, temperature, sweat level, muscle intentions, or a combination thereof. The watch band 762 may include multiple sensors 764 that may be distributed on an inside and/or an outside surface of the watch band 762. Additionally, or alternatively, the watch body 754 may include sensors that are the same or different than those of the watch band 762 (or the watch band 762 may include no sensors at all in some embodiments). For example, multiple sensors may be distributed on an inside and/or an outside surface of the watch body 754. As described below with reference to FIGS. 7B and/or 7C, the watch body 754 may include, without limitation, a front-facing image sensor 725A and/or a rear-facing image sensor 725B, a biometric sensor, an IMU, a heart rate sensor, a saturated oxygen sensor, a biopotential sensor(s), an altimeter sensor, a temperature sensor, a bioimpedance sensor, a pedometer sensor, an optical sensor (e.g., imaging sensor 7104), a touch sensor, a sweat sensor, etc. The sensor 764 may also include a sensor that provides data about a user's environment including a user's motion (e.g., an IMU), altitude, location, orientation, gait, or a combination thereof. The sensor 764 may also include a light sensor (e.g., an infrared light sensor, a visible light sensor) that is configured to track a position and/or motion of the watch body 754 and/or the watch band 762.

The watch band 762 may transmit the data acquired by sensor 764 to the watch body 754 using a wired communication method (e.g., a Universal Asynchronous Receiver/Transmitter (UART), a USB transceiver, etc.) and/or a wireless communication method (e.g., near field communication, Bluetooth, etc.). The watch band 762 may be configured to operate (e.g., to collect data using sensor 764) independent of whether the watch body 754 is coupled to or decoupled from watch band 762.

In some examples, the watch band 762 may include a biopotential sensor 765 (e.g., an EMG sensor, a mechanomyogram (MMG) sensor, a sonomyography (SMG) sensor, etc.). Biopotential sensor 765 may sense a user's intention to perform certain motor actions. The sensed muscle intention may be used to control certain user interfaces displayed on the display 756 of the wrist-wearable device 750 and/or may be transmitted to a device responsible for rendering an artificial-reality environment (e.g., a head-mounted display) to perform an action in an associated artificial-reality environment, such as to control the motion of a virtual device displayed to the user.

Signals from biopotential sensor 765 may be used to provide a user with an enhanced interaction with a physical object and/or a virtual object in an artificial-reality application generated by an artificial-reality system (e.g., user interface objects presented on the display 756, or another computing device (e.g., a smartphone)). Signals from biopotential sensor 765 may be obtained (e.g., sensed and recorded) by one or more biopotential sensors 765 of the watch band 762. Although FIG. 7A shows one biopotential sensor 765, the watch band 762 may include a plurality of biopotential sensors 765 arranged circumferentially on an inside surface of the watch band 762 such that the plurality of biopotential sensors 765 contact the skin of the user. The watch band 762 may include a plurality of biopotential sensors 765 arranged circumferentially on an inside surface of the watch band 762. Biopotential sensor 765 may sense and record biopotential signals from the user as the user performs muscular activations (e.g., movements, gestures, etc.). The muscular activations performed by the user may include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user may include symbolic gestures (e.g., gestures mapped to other gestures, interactions, or commands, for example, based on a gesture vocabulary that specifies the mapping of gestures to commands).

The watch band 762 and/or watch body 754 may include a haptic device 763 (e.g., a vibratory haptic actuator) that is configured to provide haptic feedback (e.g., a cutaneous and/or kinesthetic sensation, etc.) to the user's skin. The sensors 764 and 765, and/or the haptic device 763 may be configured to operate in conjunction with multiple applications including, without limitation, health monitoring, social media, game playing, and artificial reality (e.g., the applications associated with artificial reality).

The wrist-wearable device 750 may include a coupling mechanism (also referred to as a cradle) for detachably coupling the watch body 754 to the watch band 762. A user may detach the watch body 754 from the watch band 762 to reduce the encumbrance of the wrist-wearable device 750 to the user. The wrist-wearable device 750 may include a coupling surface on the watch body 754 and/or coupling mechanism(s) 760 (e.g., a cradle, a tracker band, a support base, a clasp). A user may perform any type of motion to couple the watch body 754 to the watch band 762 and to decouple the watch body 754 from the watch band 762. For example, a user may twist, slide, turn, push, pull, or rotate the watch body 754 relative to the watch band 762, or a combination thereof, to attach the watch body 754 to the watch band 762 and to detach the watch body 754 from the watch band 762.

As shown in the example of FIG. 7A, the watch band coupling mechanism 760 may include a type of frame or shell that allows the watch body 754 coupling surface to be retained within the watch band coupling mechanism 760. The watch body 754 may be detachably coupled to the watch band 762 through a friction fit, magnetic coupling, a rotation-based connector, a shear-pin coupler, a retention spring, one or more magnets, a clip, a pin shaft, a hook and loop fastener, or a combination thereof. In some examples, the watch body 754 may be decoupled from the watch band 762 by actuation of the release mechanism 770. The release mechanism 770 may include, without limitation, a button, a knob, a plunger, a handle, a lever, a fastener, a clasp, a dial, a latch, or a combination thereof.

As shown in FIGS. 7A-7B, the coupling mechanism 760 may be configured to receive a coupling surface proximate to the bottom side of the watch body 754 (e.g., a side opposite to a front side of the watch body 754 where the display 756 is located), such that a user may push the watch body 754 downward into the coupling mechanism 760 to attach the watch body 754 to the coupling mechanism 760. In some embodiments, the coupling mechanism 760 may be configured to receive a top side of the watch body 754 (e.g., a side proximate to the front side of the watch body 754 where the display 756 is located) that is pushed upward into the cradle, as opposed to being pushed downward into the coupling mechanism 760. In some embodiments, the coupling mechanism 760 is an integrated component of the watch band 762 such that the watch band 762 and the coupling mechanism 760 are a single unitary structure.

The wrist-wearable device 750 may include a single release mechanism 770 or multiple release mechanisms 770 (e.g., two release mechanisms 770 positioned on opposing sides of the wrist-wearable device 750 such as spring-loaded buttons). As shown in FIG. 7A, the release mechanism 770 may be positioned on the watch body 754 and/or the watch band coupling mechanism 760. Although FIG. 7A shows release mechanism 770 positioned at a corner of watch body 754 and at a corner of watch band coupling mechanism 760, the release mechanism 770 may be positioned anywhere on watch body 754 and/or watch band coupling mechanism 760 that is convenient for a user of wrist-wearable device 750 to actuate. A user of the wrist-wearable device 750 may actuate the release mechanism 770 by pushing, turning, lifting, depressing, shifting, or performing other actions on the release mechanism 770. Actuation of the release mechanism 770 may release (e.g., decouple) the watch body 754 from the watch band coupling mechanism 760 and the watch band 762 allowing the user to use the watch body 754 independently from watch band 762. For example, decoupling the watch body 754 from the watch band 762 may allow the user to capture images using rear-facing image sensor 725B.

FIG. 7B includes top views of examples of the wrist-wearable device 750. The examples of the wrist-wearable device 750 shown in FIGS. 7A-7B may include a coupling mechanism 760 (as shown in FIG. 7B, the shape of the coupling mechanism may correspond to the shape of the watch body 754 of the wrist-wearable device 750). The watch body 754 may be detachably coupled to the coupling mechanism 760 through a friction fit, magnetic coupling, a rotation-based connector, a shear-pin coupler, a retention spring, one or more magnets, a clip, a pin shaft, a hook and loop fastener, or any combination thereof.

In some examples, the watch body 754 may be decoupled from the coupling mechanism 760 by actuation of a release mechanism 770. The release mechanism 770 may include, without limitation, a button, a knob, a plunger, a handle, a lever, a fastener, a clasp, a dial, a latch, or a combination thereof. In some examples, the wristband system functions may be executed independently in the watch body 754, independently in the coupling mechanism 760, and/or in communication between the watch body 754 and the coupling mechanism 760. The coupling mechanism 760 may be configured to operate independently (e.g., execute functions independently) from watch body 754. Additionally, or alternatively, the watch body 754 may be configured to operate independently (e.g., execute functions independently) from the coupling mechanism 760. As described below with reference to the block diagram of FIG. 7A, the coupling mechanism 760 and/or the watch body 754 may each include the independent resources required to independently execute functions. For example, the coupling mechanism 760 and/or the watch body 754 may each include a power source (e.g., a battery), a memory, data storage, a processor (e.g., a central processing unit (CPU)), communications, a light source, and/or input/output devices.

The wrist-wearable device 750 may have various peripheral buttons 772, 774, and 776, for performing various operations at the wrist-wearable device 750. Also, various sensors, including one or both of the sensors 764 and 765, may be located on the bottom of the watch body 754, and may optionally be used even when the watch body 754 is detached from the watch band 762.

Figure 7C:
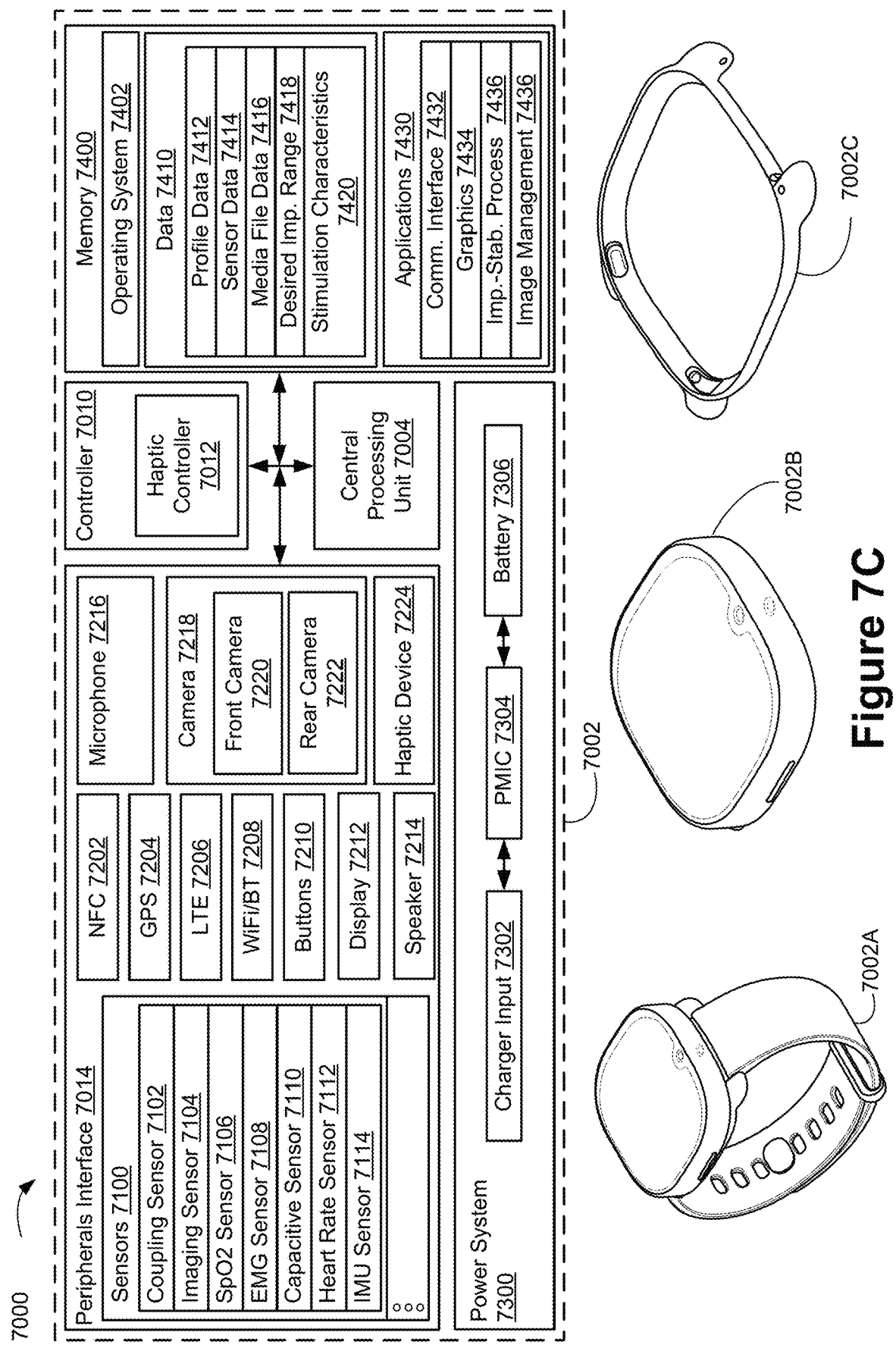

FIG. 7C is a block diagram of a computing system 7000, according to at least one embodiment of the present disclosure. The computing system 7000 includes an electronic device 7002, which may be, for example, a wrist-wearable device. The wrist-wearable device 750 described in detail above with respect to FIGS. 7A-7B is an example of the electronic device 7002, so the electronic device 7002 will be understood to include the components shown and described below for the computing system 7000. In some embodiments, all, or a substantial portion of the components of the computing system 7000 are included in a single integrated circuit. In some embodiments, the computing system 7000 may have a split architecture (e.g., a split mechanical architecture, a split electrical architecture) between a watch body (e.g., a watch body 754 in FIGS. 7A-7B) and a watch band (e.g., a watch band 762 in FIGS. 7A-7B). The electronic device 7002 may include a processor (e.g., a central processing unit 7004), a controller 7010, a peripherals interface 7014 that includes one or more sensors 7100 and various peripheral devices, a power source (e.g., a power system 7300), and memory (e.g., a memory 7400) that includes an operating system (e.g., an operating system 7402), data (e.g., data 7410), and one or more applications (e.g., applications 7430).

In some embodiments, the computing system 7000 includes the power system 7300 which includes a charger input 7302, a power-management integrated circuit (PMIC) 7304, and a battery 7306.

In some embodiments, a watch body and a watch band may each be electronic devices 7002 that each have respective batteries (e.g., battery 7306), and may share power with each other. The watch body and the watch band may receive a charge using a variety of techniques. In some embodiments, the watch body and the watch band may use a wired charging assembly (e.g., power cords) to receive the charge. Alternatively, or in addition, the watch body and/or the watch band may be configured for wireless charging. For example, a portable charging device may be designed to mate with a portion of watch body and/or watch band and wirelessly deliver usable power to a battery of watch body and/or watch band.

The watch body and the watch band may have independent power systems 7300 to enable each to operate independently. The watch body and watch band may also share power (e.g., one may charge the other) via respective PMICs 7304 that may share power over power and ground conductors and/or over wireless charging antennas.

In some embodiments, the peripherals interface 7014 may include one or more sensors 7100. The sensors 7100 may include a coupling sensor 7102 for detecting when the electronic device 7002 is coupled with another electronic device 7002 (e.g., a watch body may detect when it is coupled to a watch band, and vice versa). The sensors 7100 may include imaging sensors 7104 for collecting imaging data, which may optionally be the same device as one or more of the cameras 7218. In some embodiments, the imaging sensors 7104 may be separate from the cameras 7218. In some embodiments the sensors include an SpO2 sensor 7106. In some embodiments, the sensors 7100 include an EMG sensor 7108 for detecting, for example muscular movements by a user of the electronic device 7002. In some embodiments, the sensors 7100 include a capacitive sensor 7110 for detecting changes in potential of a portion of a user's body. In some embodiments, the sensors 7100 include a heart rate sensor 7112. In some embodiments, the sensors 5100 include an inertial measurement unit (IMU) sensor 7114 for detecting, for example, changes in acceleration of the user's hand.

In some embodiments, the peripherals interface 7014 includes a near-field communication (NFC) component 7202, a global-position system (GPS) component 7204, a long-term evolution (LTE) component 7206, and or a Wi-Fi or Bluetooth communication component 7208.

In some embodiments, the peripherals interface includes one or more buttons (e.g., the peripheral buttons 757, 758, and 759 in FIG. 7B), which, when selected by a user, cause operation to be performed at the electronic device 7002.

The electronic device 7002 may include at least one display 7212, for displaying visual affordances to the user, including user-interface elements and/or three-dimensional virtual objects. The display may also include a touch screen for inputting user inputs, such as touch gestures, swipe gestures, and the like.

The electronic device 7002 may include at least one speaker 7214 and at least one microphone 7216 for providing audio signals to the user and receiving audio input from the user. The user may provide user inputs through the microphone 7216 and may also receive audio output from the speaker 7214 as part of a haptic event provided by the haptic controller 7012.

The electronic device 7002 may include at least one camera 7218, including a front camera 7220 and a rear camera 7222. In some embodiments, the electronic device 7002 may be a head-wearable device, and one of the cameras 7218 may be integrated with a lens assembly of the head-wearable device.

One or more of the electronic devices 7002 may include one or more haptic controllers 7012 and associated componentry for providing haptic events at one or more of the electronic devices 7002 (e.g., a vibrating sensation or audio output in response to an event at the electronic device 7002). The haptic controllers 7012 may communicate with one or more electroacoustic devices, including a speaker of the one or more speakers 7214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 7012 may provide haptic events to that are capable of being sensed by a user of the electronic devices 7002. In some embodiments, the one or more haptic controllers 7012 may receive input signals from an application of the applications 7430.

Memory 7400 optionally includes high-speed random-access memory and optionally also includes non-volatile memory, such as one or more magnetic disk storage devices, flash memory devices, or other non-volatile solid-state memory devices. Access to the memory 7400 by other components of the electronic device 7002, such as the one or more processors of the central processing unit 7004, and the peripherals interface 7014 is optionally controlled by a memory controller of the controllers 7010.

In some embodiments, software components stored in the memory 7400 may include one or more operating systems 7402 (e.g., a Linux-based operating system, an Android operating system, etc.). The memory 7400 may also include data 7410, including structured data (e.g., SQL databases, MongoDB databases, GraphQL data, JSON data, etc.). The data 7410 may include profile data 7412, sensor data 7414, media file data 7416, desired impedance range data 7418, and stimulation characteristics data 7420.

In some embodiments, software components stored in the memory 7400 include one or more applications 7430 configured to be perform operations at the electronic devices 7002. In some embodiments, the one or more applications 7430 include one or more communication interface modules 7432, one or more graphics modules 7434, one or more impedance-stabilization process modules 7436. In some embodiments, a plurality of applications 7430 may work in conjunction with one another to perform various tasks at one or more of the electronic devices 7002.

It should be appreciated that the electronic devices 7002 are only some examples of the electronic devices 7002 within the computing system 7000, and that other electronic devices 7002 that are part of the computing system 7000 may have more or fewer components than shown optionally combines two or more components, or optionally have a different configuration or arrangement of the components. The various components shown in FIG. 7C are implemented in hardware, software, firmware, or a combination thereof, including one or more signal processing and/or application-specific integrated circuits.

As illustrated by the lower portion of FIG. 7C, various individual components of a wrist-wearable device may be examples of the electronic device 7002. For example, some or all of the components shown in the electronic device 7002 may be housed or otherwise disposed in a combined watch device 7002A, or within individual components of the capsule device watch body 7002B, the cradle portion 7002C, and/or a watch band.

Figure 7D:
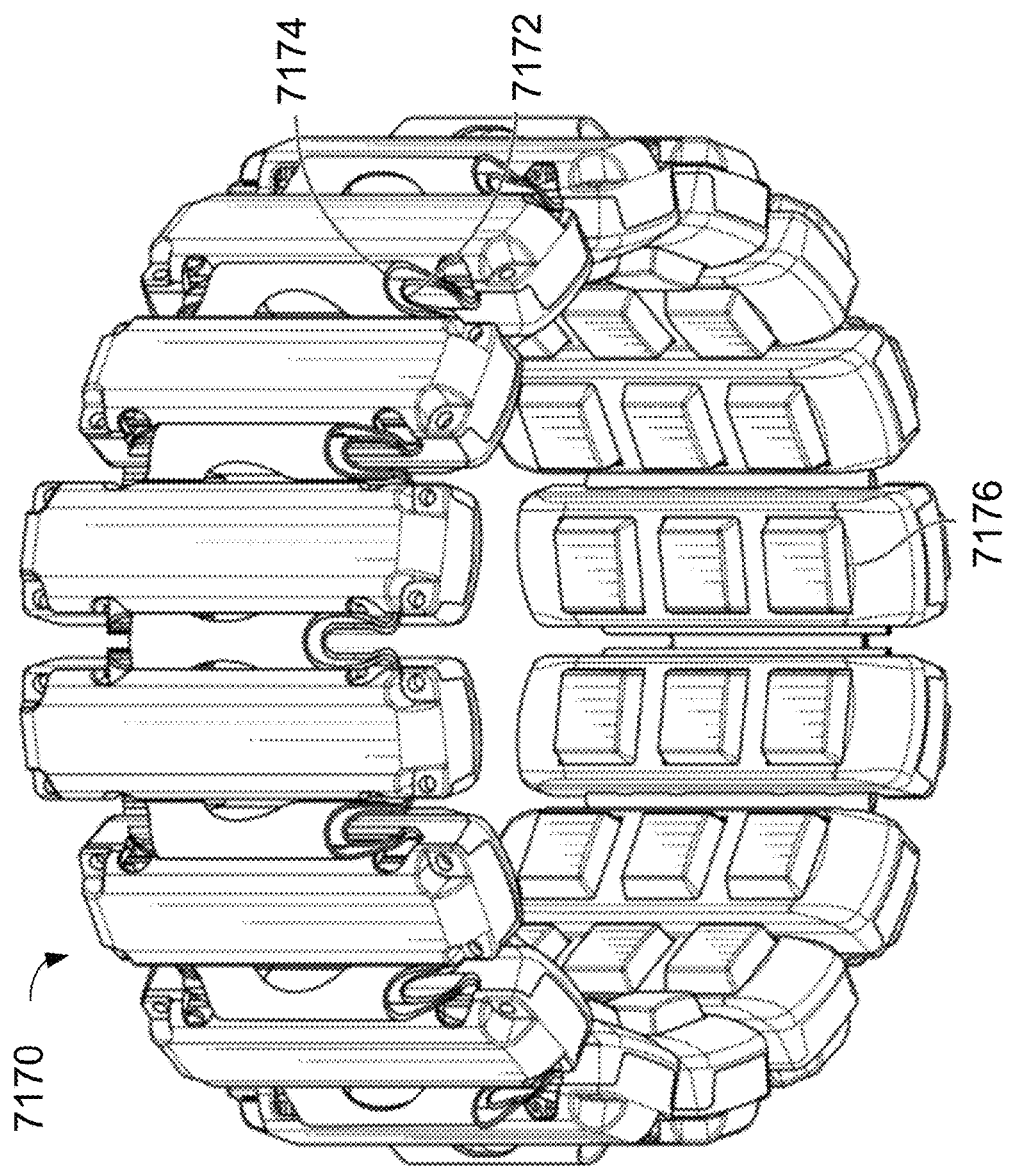

FIG. 7D illustrates a wearable device 7170, in accordance with some embodiments. In some embodiments, the wearable device 7170 is used to generate control information (e.g., sensed data about biopotential signals or instructions to perform certain commands after the data is sensed) for causing a computing device to perform one or more input commands. In some embodiments, the wearable device 7170 includes a plurality of biopotential sensors 7176. In some embodiments, the plurality of biopotential sensors 7176 includes a predetermined number of (e.g., 16) biopotential sensors (e.g., EMG sensors) arranged circumferentially around an elastic band 7174. The plurality of biopotential sensors 7176 may include any suitable number of biopotential sensors. In some embodiments, the number and arrangement of biopotential sensors 7176 depends on the particular application for which the wearable device 7170 is used. For instance, a wearable device 7170 configured as an armband, wristband, or chest-band may include a plurality of biopotential sensors 7176 with different number of biopotential sensors and different arrangement for each use case, such as medical use cases as compared to gaming or general day-to-day use cases. For example, at least 16 biopotential sensors 7176 may be arranged circumferentially around elastic band 7174.

In some embodiments, the elastic band 7174 is configured to be worn around a user's lower arm or wrist. The elastic band 7174 may include a flexible electronic connector 7172. In some embodiments, the flexible electronic connector 7172 interconnects separate sensors and electronic circuitry that are enclosed in one or more sensor housings. Alternatively, in some embodiments, the flexible electronic connector 7172 interconnects separate sensors and electronic circuitry that are outside of the one or more sensor housings. Each biopotential sensor of the plurality of biopotential sensors 7176 may include a skin-contacting surface that includes one or more electrodes. One or more sensors of the plurality of biopotential sensors 7176 may be coupled together using flexible electronics incorporated into the wearable device 7170. In some embodiments, one or more sensors of the plurality of biopotential sensors 7176 may be integrated into a woven fabric, wherein the fabric one or more sensors of the plurality of biopotential sensors 7176 are sewn into the fabric and mimic the pliability of fabric (e.g., the one or more sensors of the plurality of biopotential sensors 7176 may be constructed from a series woven strands of fabric). In some embodiments, the sensors are flush with the surface of the textile and are indistinguishable from the textile when worn by the user.

Figure 7E:
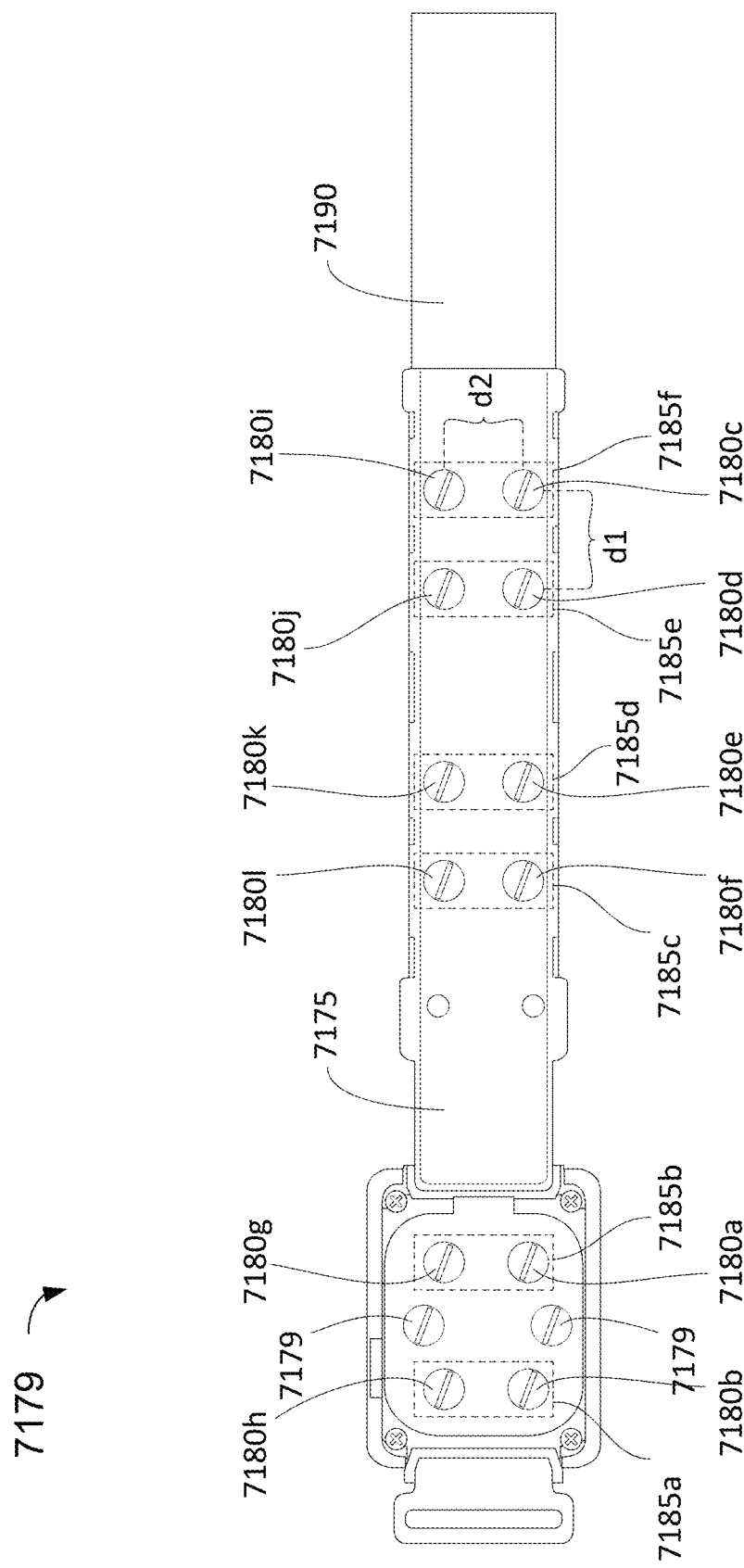

FIG. 7E illustrates a wearable device 7179 in accordance with some embodiments. The wearable device 7179 includes paired sensor channels 7185a-7185f along an interior surface of a wearable structure 7175 that are configured to detect biopotential signals. Different number of paired sensors channels may be used (e.g., one pair of sensors, three pairs of sensors, four pairs of sensors, or six pairs of sensors). The wearable structure 7175 may include a band portion 7190, a capsule portion 7195, and a cradle portion (not pictured) that is coupled with the band portion 7190 to allow for the capsule portion 7195 to be removably coupled with the band portion 7190. For embodiments in which the capsule portion 7195 is removable, the capsule portion 7195 may be referred to as a removable structure, such that in these embodiments the wearable device includes a wearable portion (e.g., band portion 7190 and the cradle portion) and a removable structure (the removable capsule portion which may be removed from the cradle). In some embodiments, the capsule portion 7195 includes the one or more processors and/or other components of the wearable device 988 described above in reference to FIG. 9. The wearable structure 7175 is configured to be worn by a user 9015. More specifically, the wearable structure 7175 is configured to couple the wearable device 7179 to a wrist, arm, forearm, or other portion of the user's body. Each paired sensor channels 7185*a*-7185*f* includes two electrodes 7180 (e.g., electrodes 7180*a*-7180*h*) for sensing biopotential signals based on differential sensing within each respective sensor channel. In accordance with some embodiments, the wearable device 7170 further includes an electrical ground and a shielding electrode.

The techniques described above may be used with any device for sensing biopotential signals, including the arm-wearable devices of FIGS. 7A-7C, but could also be used with other types of wearable devices for sensing biopotential signals (such as body-wearable or head-wearable devices that might have biopotential sensors closer to the brain or spinal column).

In some embodiments, a wrist-wearable device may be used in conjunction with a head-wearable device described below, and the wrist-wearable device may also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

As was noted earlier, the wrist-wearable device embodiments discussed herein (e.g., device 100) may be used in conjunction with controller certain artificial-reality headsets. As such, example aspects of such artificial-reality headsets will now be described.

Example Head-Wearable Devices

Figure 8A:
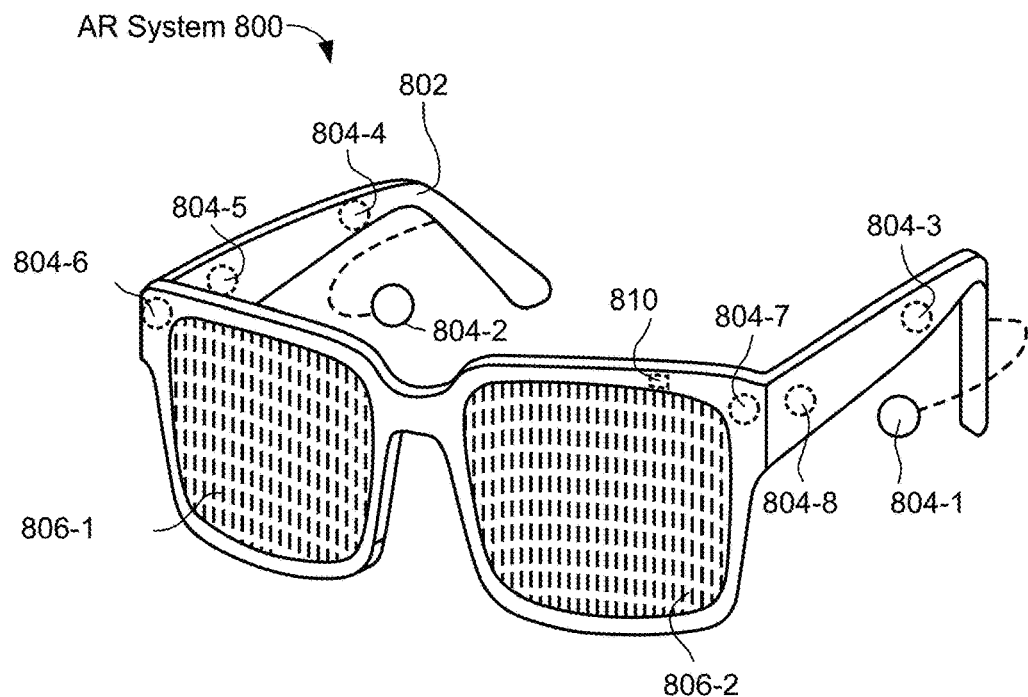
FIGS. 8A-8B illustrate example artificial-reality (AR) systems, in accordance with some embodiments.

FIG. 8A shows an example AR system 800 in accordance with some embodiments. In FIG. 8A, the AR system 800 includes an eyewear device with a frame 802 configured to hold a left display device 806-1 and a right display device 806-2 in front of a user's eyes. The display devices 806-1 and 806-2 may act together or independently to present an image or series of images to a user. While the AR system 800 includes two displays, embodiments of this disclosure may be implemented in AR systems with a single near-eye display (NED) or more than two NEDs.

In some embodiments, the AR system 800 includes one or more sensors, such as the acoustic sensors 804. For example, the acoustic sensors 804 may generate measurement signals in response to motion of the AR system 800 and may be located on substantially any portion of the frame 802. Any one of the sensors may be a position sensor, an IMU, a depth camera assembly, or any combination thereof. In some embodiments, the AR system 800 includes more or fewer sensors than are shown in FIG. 8A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 800 includes a microphone array with a plurality of acoustic sensors 804-1 through 804-8, referred to collectively as the acoustic sensors 804. The acoustic sensors 804 may be transducers that detect air pressure variations induced by sound waves. In some embodiments, each acoustic sensor 804 is configured to detect sound and convert the detected sound into an electronic format (e.g., an analog or digital format). In some embodiments, the microphone array includes ten acoustic sensors: 804-1 and 804-2 designed to be placed inside a corresponding ear of the user, acoustic sensors 804-3, 804-4, 804-5, 804-6, 804-7, and 804-8 positioned at various locations on the frame 802, and acoustic sensors positioned on a corresponding neckband, where the neckband is an optional component of the system that is not present in certain embodiments of the artificial-reality systems discussed herein.

The configuration of the acoustic sensors 804 of the microphone array may vary. While the AR system 800 is shown in FIG. 8A having ten acoustic sensors 804, the number of acoustic sensors 804 may be more or fewer than ten. In some situations, using more acoustic sensors 804 increases the amount of audio information collected and/or the sensitivity and accuracy of the audio information. In contrast, in some situations, using a lower number of acoustic sensors 804 decreases the computing power required by a controller to process the collected audio information. In addition, the position of each acoustic sensor 804 of the microphone array may vary. For example, the position of an acoustic sensor 804 may include a defined position on the user, a defined coordinate on the frame 802, an orientation associated with each acoustic sensor, or some combination thereof.

The acoustic sensors 804-1 and 804-2 may be positioned on different parts of the user's ear. In some embodiments, there are additional acoustic sensors on or surrounding the ear in addition to acoustic sensors 804 inside the ear canal. In some situations, having an acoustic sensor positioned next to an ear canal of a user enables the microphone array to collect information on how sounds arrive at the ear canal. By positioning at least two of the acoustic sensors 804 on either side of a user's head (e.g., as binaural microphones), the AR device 800 is able to simulate binaural hearing and capture a 3D stereo sound field around a user's head. In some embodiments, the acoustic sensors 804-1 and 804-2 are connected to the AR system 800 via a wired connection, and in other embodiments, the acoustic sensors 804-1 and 804-2 are connected to the AR system 800 via a wireless connection (e.g., a Bluetooth connection). In some embodiments, the AR system 800 does not include the acoustic sensors 804-1 and 804-2.

The acoustic sensors 804 on the frame 802 may be positioned along the length of the temples, across the bridge of the nose, above or below the display devices 806, or in some combination thereof. The acoustic sensors 804 may be oriented such that the microphone array is able to detect sounds in a wide range of directions surrounding the user that is wearing the AR system 800. In some embodiments, a calibration process is performed during manufacturing of the AR system 800 to determine relative positioning of each acoustic sensor 804 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 800 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 800. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 800. For example, the controller may process information from the acoustic sensors 804. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 800 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 850 in FIG. 8B, which mostly or completely covers a user's field of view.

Figure 8B:
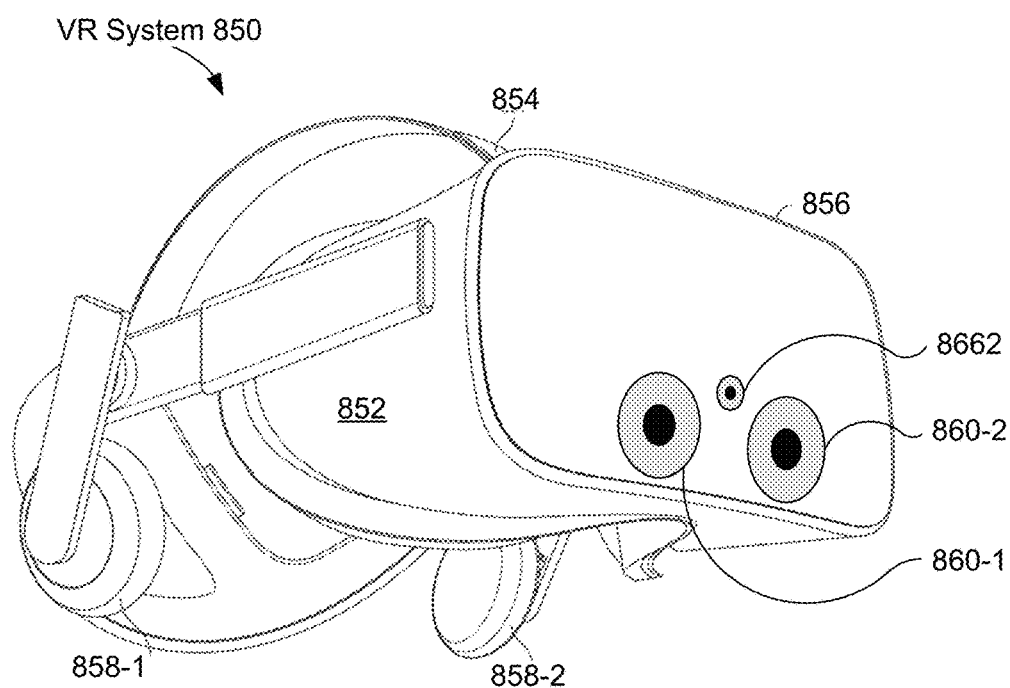

FIG. 8B shows a VR system 850 (e.g., also referred to herein as VR headsets or VR headset) in accordance with some embodiments. The VR system 850 includes a head-mounted display (HMD) 852. The HMD 852 includes a front body 856 and a frame 854 (e.g., a strap or band) shaped to fit around a user's head. In some embodiments, the HMD 852 includes output audio transducers 858-1 and 858-2, as shown in FIG. 8B (e.g., transducers). In some embodiments, the front body 856 and/or the frame 854 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 800 and/or the VR system 850 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 800 and/or the VR system 850 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 800 and/or the VR system 850 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 8B shows VR system 850 having cameras 860-1 and 860-2 that may be used to provide depth information for creating a voxel field and a two-dimensional mesh to provide object information to the user to avoid collisions. FIG. 8B also shows that the VR system includes one or more additional cameras 862 that are configured to augment the cameras 860-1 and 860-2 by providing more information. For example, the additional cameras 862 may be used to supply color information that is not discerned by cameras 860-1 and 860-2. In some embodiments, cameras 860-1 and 860-2 and additional cameras 862 may include an optional IR cut filter configured to remove IR light from being received at the respective camera sensors.

In some embodiments, the AR system 800 and/or the VR system 850 may include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above may be used with any device for interacting with an artificial-reality environment, including the head-wearable devices of FIG. 8A-8B, but could also be used with other types of wearable devices for sensing biopotential signals (such as body-wearable or head-wearable devices that might have biopotential sensors closer to the brain or spinal column). Having thus described example wrist-wearable device and head-wearable devices, attention will now be turned to example feedback systems that may be integrated into the devices described above or be a separate device.

Example Systems

Figure 9A:
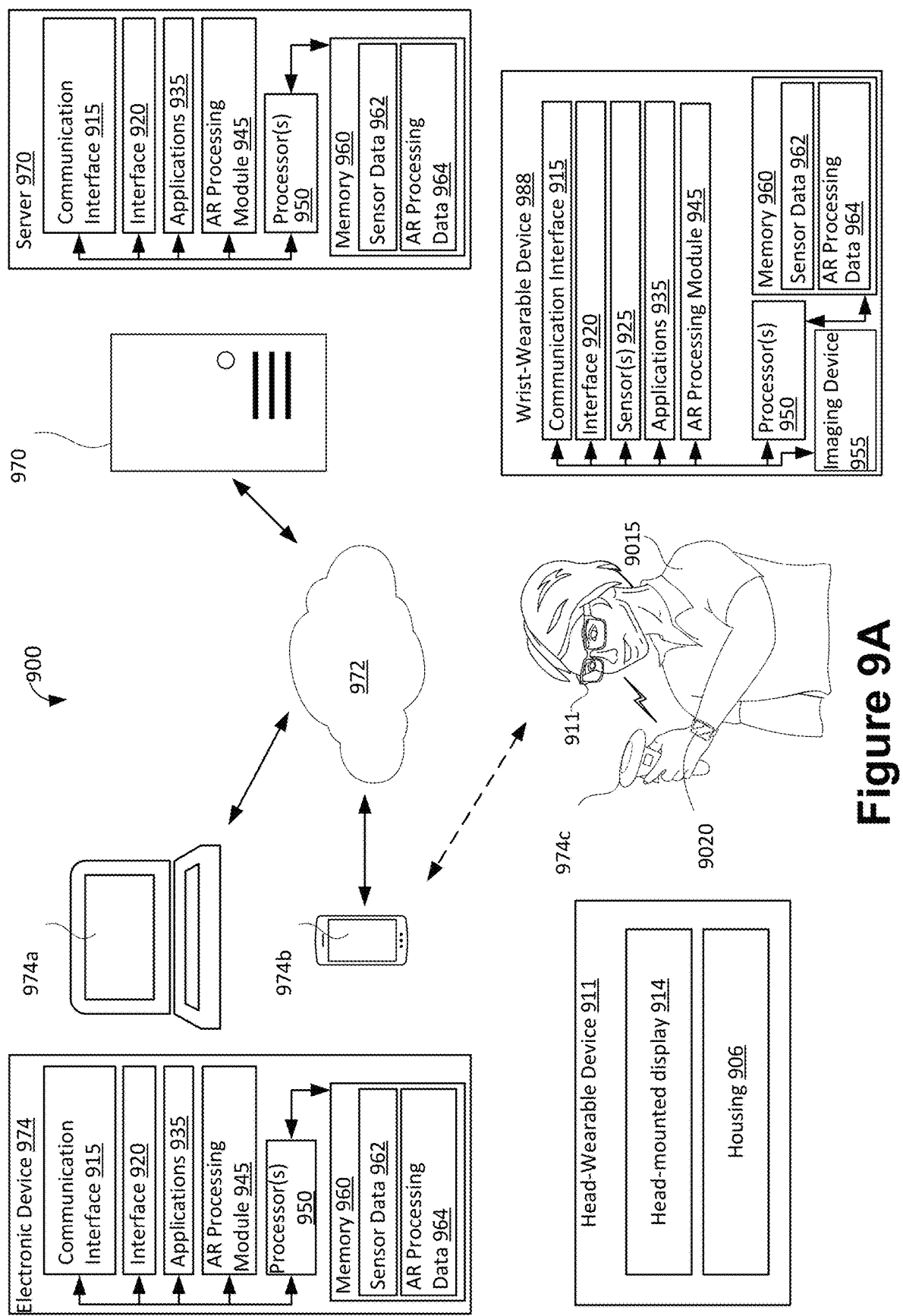
FIGS. 9A-9B are block diagrams illustrating an example artificial-reality system in accordance with some embodiments.

FIG. 9A is a block diagram illustrating an example artificial-reality system in accordance with some embodiments. The system 900 includes one or more devices for facilitating an interactivity with an artificial-reality environment in accordance with some embodiments. For example, the head-wearable device 911 may present to the user 9015 with a user interface within the artificial-reality environment. As a non-limiting example, the system 900 includes one or more wearable devices, which may be used in conjunction with one or more computing devices. In some embodiments, the system 900 provides the functionality of a virtual-reality device, an augmented-reality device, a mixed-reality device, hybrid-reality device, or a combination thereof. In some embodiments, the system 900 provides the functionality of a user interface and/or one or more user applications (e.g., games, word processors, messaging applications, calendars, clocks, etc.).

The system 900 may include one or more of servers 970, electronic devices 974 (e.g., a computer, 974a, a smartphone 974b, a controller 974c, and/or other devices), head-wearable devices 911 (e.g., the AR system 800 or the VR system 850), and/or wrist-wearable devices 988 (e.g., the wrist-wearable device 9020). In some embodiments, the one or more of servers 970, electronic devices 974, head-wearable devices 911, and/or wrist-wearable devices 988 are communicatively coupled via a network 972. In some embodiments, the head-wearable device 911 is configured to cause one or more operations to be performed by a communicatively coupled wrist-wearable device 988, and/or the two devices may also both be connected to an intermediary device, such as a smartphone 974b, a controller 974c, or other device that provides instructions and data to and between the two devices. In some embodiments, the head-wearable device 911 is configured to cause one or more operations to be performed by multiple devices in conjunction with the wrist-wearable device 988. In some embodiments, instructions to cause the performance of one or more operations are controlled via an artificial-reality processing module 945. The artificial-reality processing module 945 may be implemented in one or more devices, such as the one or more of servers 970, electronic devices 974, head-wearable devices 911, and/or wrist-wearable devices 988. In some embodiments, the one or more devices perform operations of the artificial-reality processing module 945, using one or more respective processors, individually or in conjunction with at least one other device as described herein. In some embodiments, the system 900 includes other wearable devices not shown in FIG. 9, such as rings, collars, anklets, gloves, and the like.

In some embodiments, the system 900 provides the functionality to control or provide commands to the one or more computing devices 974 based on a wearable device (e.g., head-wearable device 911 or wrist-wearable device 988) determining motor actions or intended motor actions of the user. A motor action is an intended motor action when before the user performs the motor action or before the user completes the motor action, the detected biopotential signals travelling through the biopotential pathways may be determined to be the motor action. Motor actions may be detected based on the detected biopotential signals, but may additionally (using a fusion of the various sensor inputs), or alternatively, be detected using other types of sensors (such as cameras focused on viewing hand movements and/or using data from an inertial measurement unit that may detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user may define one or more gestures using the learning module. In some embodiments, the user may enter a training phase in which a user defined gesture is associated with one or more input commands that when provided to a computing device cause the computing device to perform an action. Similarly, the one or more input commands associated with the user-defined gesture may be used to cause a wearable device to perform one or more actions locally. The user-defined gesture, once trained, is stored in the memory 960. Similar to the motor actions, the one or more processors 950 may use the detected biopotential signals by the one or more sensors 925 to determine that a user-defined gesture was performed by the user.

The electronic devices 974 may also include a communication interface 915, an interface 920 (e.g., including one or more displays, lights, speakers, and haptic generators), one or more sensors 925, one or more applications 935, an artificial-reality processing module 945, one or more processors 950, and memory 960. The electronic devices 974 are configured to communicatively couple with the wrist-wearable device 988 and/or head-wearable device 911 (or other devices) using the communication interface 915. In some embodiments, the electronic devices 974 are configured to communicatively couple with the wrist-wearable device 988 and/or head-wearable device 911 (or other devices) via an application programming interface (API). In some embodiments, the electronic devices 974 operate in conjunction with the wrist-wearable device 988 and/or the head-wearable device 911 to determine a hand gesture and cause the performance of an operation or action at a communicatively coupled device.

The server 970 includes a communication interface 915, one or more applications 935, an artificial-reality processing module 945, one or more processors 950, and memory 960. In some embodiments, the server 970 is configured to receive sensor data from one or more devices, such as the head-wearable device 911, the wrist-wearable device 988, and/or electronic device 974, and use the received sensor data to identify a gesture or user input. The server 970 may generate instructions that cause the performance of operations and actions associated with a determined gesture or user input at communicatively coupled devices, such as the head-wearable device 911.

The head-wearable device 911 includes smart glasses (e.g., the augmented-reality glasses), artificial reality headsets (e.g., VR/AR headsets), or other head worn device. In some embodiments, one or more components of the head-wearable device 911 are housed within a body of the HMD 914 (e.g., frames of smart glasses, a body of an AR headset, etc.). In some embodiments, one or more components of the head-wearable device 911 are stored within or coupled with lenses of the HMD 914. Alternatively or in addition, in some embodiments, one or more components of the head-wearable device 911 are housed within a modular housing 906. The head-wearable device 911 is configured to communicatively couple with other electronic device 974 and/or a server 970 using communication interface 915 as discussed above.

Figure 9B:
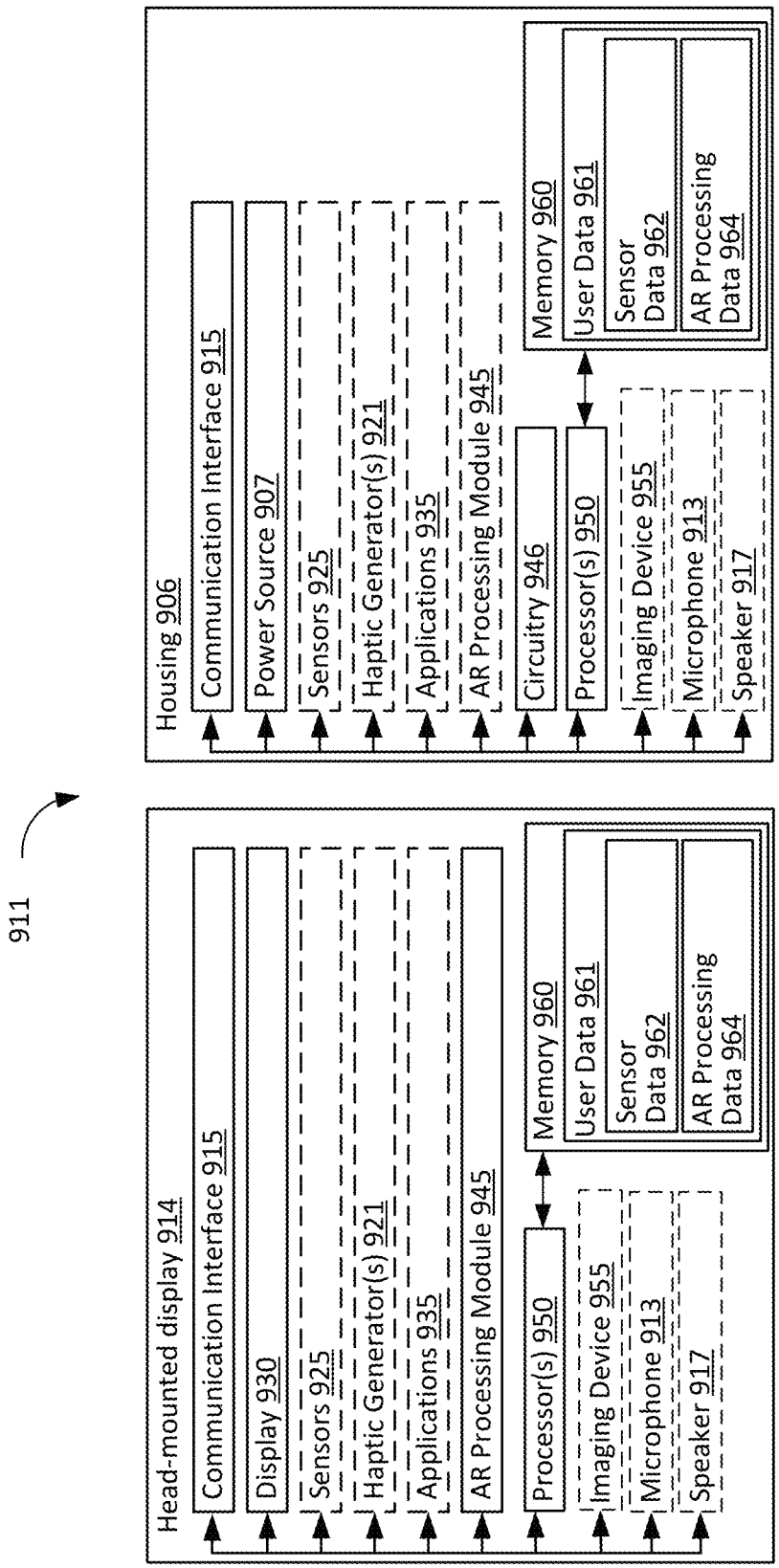

FIG. 9B describes additional details of the HMD 914 and modular housing 906 described above in reference to 9B, in accordance with some embodiments.

The housing 906 include(s) a communication interface 915, circuitry 946, a power source 907 (e.g., a battery for powering one or more electronic components of the housing 906 and/or providing usable power to the HMD 914), one or more processors 950, and memory 960. In some embodiments, the housing 906 may include one or more supplemental components that add to the functionality of the HMD 914. For example, in some embodiments, the housing 906 may include one or more sensors 925, an AR processing module 945, one or more haptic generators 921, one or more imaging devices 955, one or more microphones 913, one or more speakers 917, etc. The housing 906 is configured to couple with the HMD 914 via the one or more retractable side straps. More specifically, the housing 906 is a modular portion of the head-wearable device 911 that may be removed from head-wearable device 911 and replaced with another housing (which includes more or less functionality). The modularity of the housing 906 allows a user to adjust the functionality of the head-wearable device 911 based on their needs.

In some embodiments, the communications interface 915 is configured to communicatively couple the housing 906 with the HMD 914, the server 970, and/or other electronic device 974 (e.g., the wrist-wearable device 9020, a tablet, a computer, etc.). The communication interface 915 is used to establish wired or wireless connections between the housing 906 and the other devices. In some embodiments, the communication interface 915 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 906 is configured to communicatively couple with the HMD 914 and/or other electronic device 974 via an application programming interface (API).

In some embodiments, the power source 907 is a battery. The power source 907 may be a primary or secondary battery source for the HMD 914. In some embodiments, the power source 907 provides useable power to the one or more electrical components of the housing 906 or the HMD 914. For example, the power source 907 may provide usable power to the sensors 925, haptic generator(s) 921, the speakers 917, the HMD 914, and the microphone 913. In some embodiments, the power source 907 is a rechargeable battery. In some embodiments, the power source 907 is a modular battery that may be removed and replaced with a fully charged battery while it is charged separately.

The one or more sensors 925 may include heart rate sensors, biopotential-signal sensors (e.g., electromyography (EMG), electroencephalography (EEG), or electrocardiography (EKG) sensors), SpO2 sensors, altimeters, thermal sensors or thermal couples, ambient light sensors, ambient noise sensors, and/or inertial measurement units (IMU)s. Additional non-limiting examples of the one or more sensors 925 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 925 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 925 may include location sensing devices (e.g., GPS) configured to provide location information. In some embodiment, the data measured or sensed by the one or more sensors 925 is stored in memory 960. In some embodiments, the housing 906 receives sensor data from communicatively coupled devices, such as the HMD 914, the server 970, and/or other electronic device 974. Alternatively, the housing 906 may provide sensors data to the HMD 914, the server 970, and/or other electronic device 974.

The one or more haptic generators 921 may include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 921 are hydraulic, pneumatic, electric, and/or mechanical actuators. In some embodiments, the one or more haptic generators 921 are part of a surface of the housing 906 that may be used to generate a haptic response (e.g., a thermal change at the surface, a tightening or loosening of a band, increase or decrease in pressure, etc.). For example, the one or more haptic generators 921 may apply vibration stimulations, pressure stimulations, squeeze simulations, shear stimulations, temperature changes, or some combination thereof to the user. In addition, in some embodiments, the one or more haptic generators 921 include audio generating devices (e.g., speakers 917 and other sound transducers) and illuminating devices (e.g., light-emitting diodes (LED)s, screen displays, etc.). The one or more haptic generators 921 may be used to generate different audible sounds and/or visible lights that are provided to the user as haptic responses. The above list of haptic generators is non-exhaustive; any affective devices may be used to generate one or more haptic responses that are delivered to a user.

In some embodiments, the one or more applications 935 include social-media applications, banking applications, health applications, messaging applications, web browsers, gaming application, streaming applications, media applications, imaging applications, productivity applications, social applications, etc. In some embodiments, the one or more applications 935 include artificial reality applications. The one or more applications 935 are configured to provide data to the head-wearable device 911 for performing one or more operations. In some embodiments, the one or more applications 935 may be displayed via a display 930 of the head-wearable device 911 (e.g., via the HMD 914).

In some embodiments, instructions to cause the performance of one or more operations are controlled via an artificial reality (AR) processing module 945. The AR processing module 945 may be implemented in one or more devices, such as the one or more of servers 970, electronic devices 974, head-wearable devices 911, and/or wrist-wearable devices 9020. In some embodiments, the one or more devices perform operations of the AR processing module 945, using one or more respective processors, individually or in conjunction with at least one other device as described herein. In some embodiments, the AR processing module 945 is configured process signals based at least on sensor data. In some embodiments, the AR processing module 945 is configured process signals based on image data received that captures at least a portion of the user hand, mouth, facial expression, surrounding, etc. For example, the housing 906 may receive EMG data and/or IMU data from one or more sensors 925 and provide the sensor data to the AR processing module 945 for a particular operation (e.g., gesture recognition, facial recognition, etc.). The AR processing module 945, causes a device communicatively coupled to the housing 906 to perform an operation (or action). In some embodiments, the AR processing module 945 performs different operations based on the sensor data and/or performs one or more actions based on the sensor data.

In some embodiments, the one or more imaging devices 955 may include an ultra-wide camera, a wide camera, a telephoto camera, a depth-sensing cameras, or other types of cameras. In some embodiments, the one or more imaging devices 955 are used to capture image data and/or video data. The imaging devices 955 may be coupled to a portion of the housing 906. The captured image data may be processed and stored in memory and then presented to a user for viewing. The one or more imaging devices 955 may include one or more modes for capturing image data or video data. For example, these modes may include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active may automatically select the appropriate mode based on the environment (e.g., dark lighting may result in the use of low light image capture mode instead of HDR image capture mode). In some embodiments, the user may select the mode. The image data and/or video data captured by the one or more imaging devices 955 is stored in memory 960 (which may include volatile and non-volatile memory such that the image data and/or video data may be temporarily or permanently stored, as needed depending on the circumstances).

The circuitry 946 is configured to facilitate the interaction between the housing 906 and the HMD 914. In some embodiments, the circuitry 946 is configured to regulate the distribution of power between the power source 907 and the HMD 914. In some embodiments, the circuitry 746 is configured to transfer audio and/or video data between the HMD 914 and/or one or more components of the housing 906.

The one or more processors 950 may be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 960. The memory 960 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 950. The memory 960 also provides a storage area for data and instructions associated with applications and data handled by the processor 950.

In some embodiments, the memory 960 stores at least user data 961 including sensor data 962 and AR processing data 964. The sensor data 962 includes sensor data monitored by one or more sensors 925 of the housing 906 and/or sensor data received from one or more devices communicative coupled with the housing 906, such as the HMD 914, the smartphone 974*b*, the wrist-wearable device 9020, etc. The sensor data 962 may include sensor data collected over a predetermined period of time that may be used by the AR processing module 945. The AR processing data 964 may include one or more one or more predefined camera-control gestures, user defined camera-control gestures, predefined non-camera-control gestures, and/or user defined non-camera-control gestures. In some embodiments, the AR processing data 964 further includes one or more predetermined threshold for different gestures.

The HMD 914 includes a communication interface 915, a display 930, an AR processing module 945, one or more processors, and memory. In some embodiments, the HMD 914 includes one or more sensors 925, one or more haptic generators 921, one or more imaging devices 955 (e.g., a camera), microphones 913, speakers 917, and/or one or more applications 935. The HMD 914 operates in conjunction with the housing 906 to perform one or more operations of a head-wearable device 911, such as capturing camera data, presenting a representation of the image data at a coupled display, operating one or more applications 935, and/or allowing a user to participate in an AR environment.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described to best explain principles of operation and practical applications, to thereby enable others skilled in the art.

Applying Adjustments in Accordance with Selected Sensitivity-Stabilizing Mode

Figure 10A:
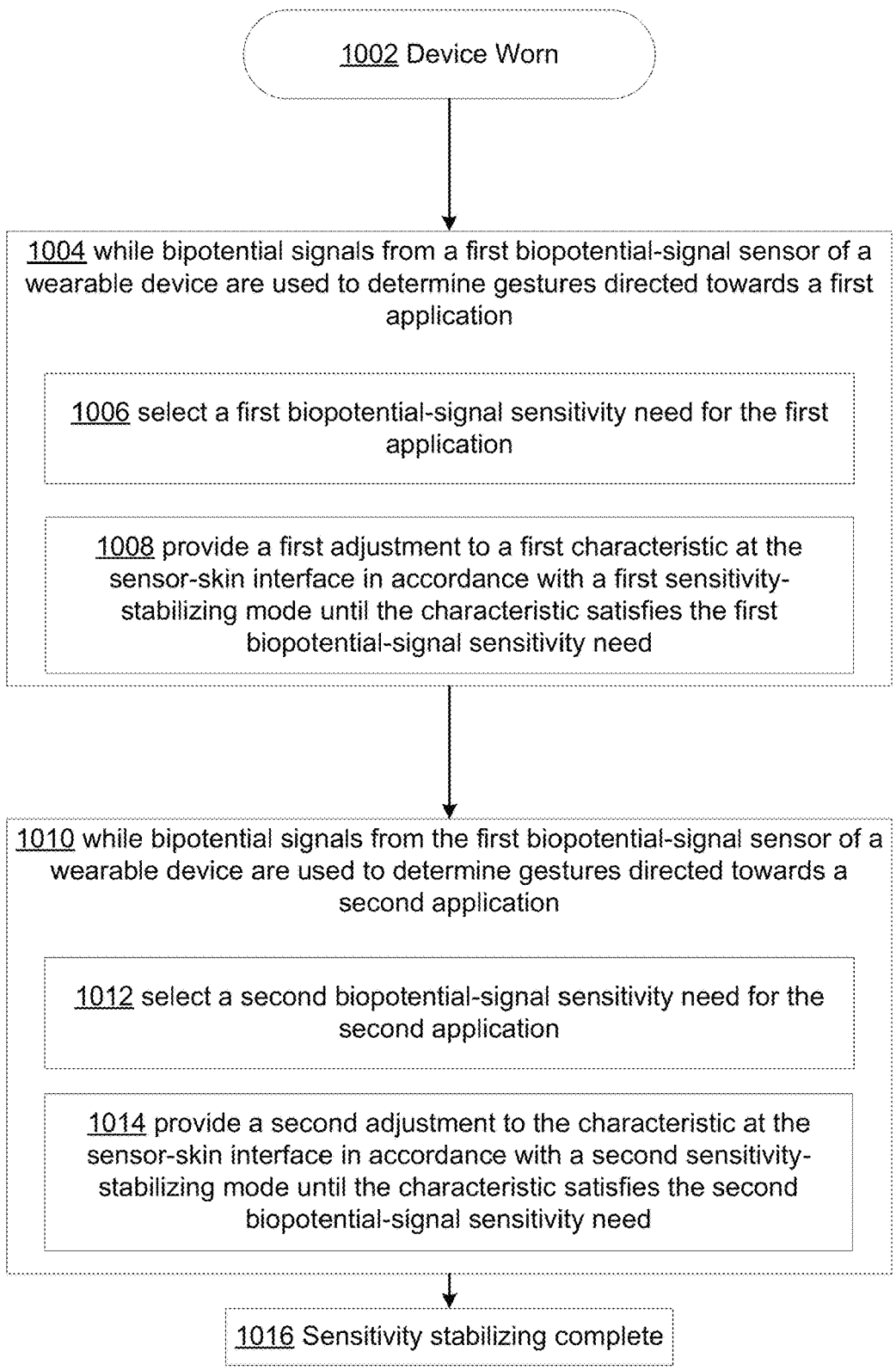

FIGS. 10A-10D are flow charts depicting example methods of selecting one or more sensitivity-stabilizing modes and providing adjustments in accordance with the one or more sensitivity-stabilizing modes, in accordance with some embodiments. FIG. 10A depicts a flow chart of an example embodiment. At step 1002, a device is worn or donned. The beginning of the method may begin when the user first puts on the device, or at some point after the user has donned the device. Step 1004 represents a point during which bipotential signals from a first biopotential-signal sensor of a wearable device are used to determine gestures directed towards a first application. During step 1004, at step 1006 the device selects a first biopotential-signal sensitivity need for the first application and, at 1008, provides a first adjustment to a first characteristic at the sensor-skin interface in accordance with a first sensitivity-stabilizing mode until the characteristic satisfies the first biopotential-signal sensitivity need. Step 1010 represents a point during which bipotential signals from the first biopotential-signal sensor of a wearable device are used to determine gestures directed towards a second application. Step 1010 may occur before, during, or after step 1004. During step 1010, at step 1006 the device selects a second biopotential-signal sensitivity need for the second application. During step 1014, the device provides a second adjustment to the characteristic at the sensor-skin interface in accordance with a second sensitivity-stabilizing mode until the characteristic satisfies the second biopotential-signal sensitivity need. When the first and second biopotential-signal sensitivity needs are satisfied, the sensitivity stabilizing is complete, as shown at step 1016.

Figure 10B:
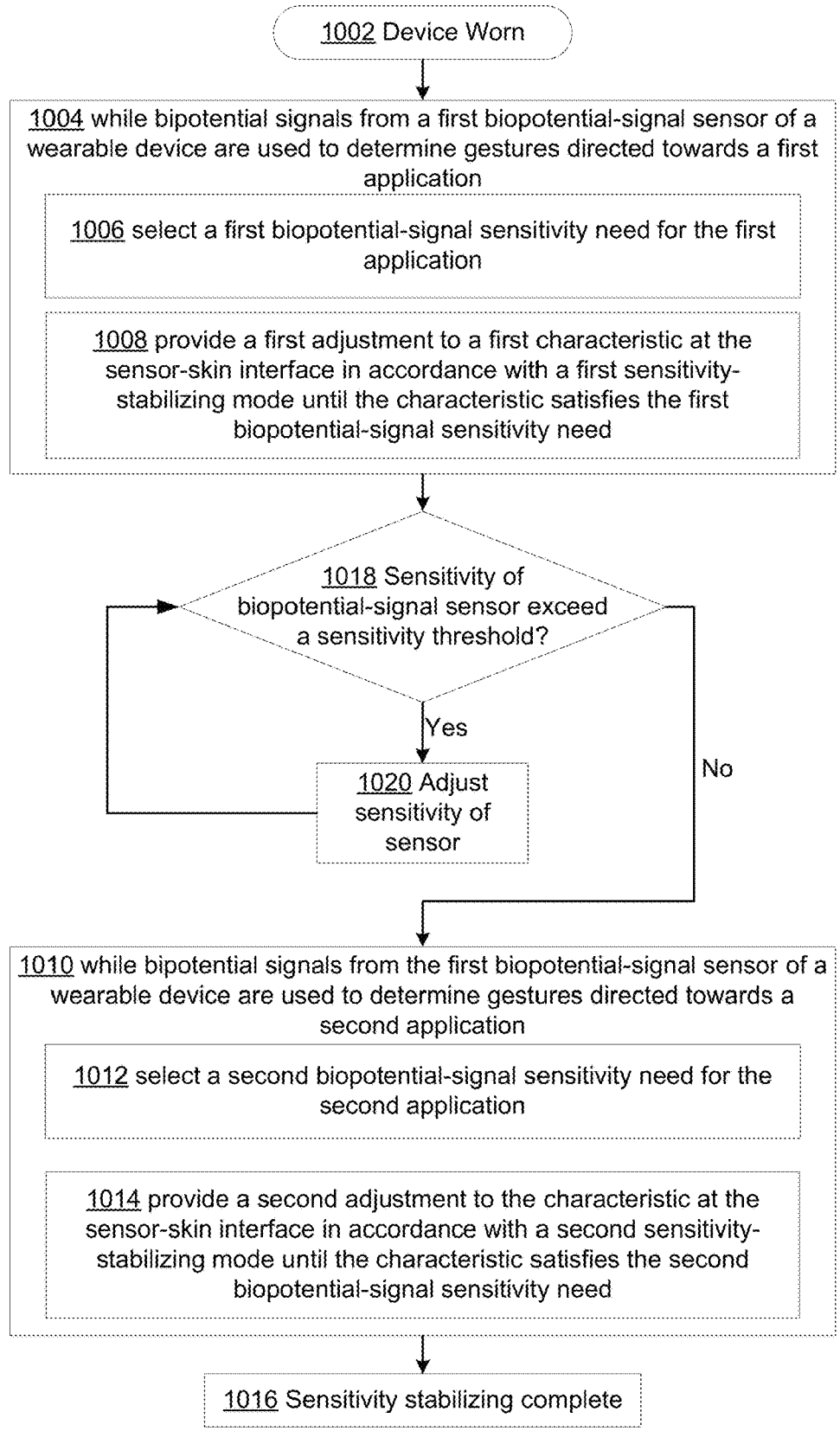

FIG. 10B depicts a flow chart of another example embodiment. Steps 1002 to 1008 are the same as discussed with respect to FIG. 10A. After step 1004 (and 1006 and 1008), at step 1018 the device queries whether the sensitivity of the biopotential-signal sensor exceeds a sensitivity threshold. The sensitivity of the biopotential-signal sensor may correspond to the characteristic, or may correspond to other factors. For example, if, after the first biopotential-signal sensitivity has been satisfied after steps 1004 to 1008, the sensitivity of the sensor may be, for example, too high such that a small movement in reality results in a much larger movement in a virtual environment. Another example of where it may be useful to adjust the sensitivity of the sensor is when the sensitivity of the sensor may be reduced to save battery life, processing or computing power, etc. In another example situation, after the characteristic satisfies the first biopotential-signal sensitivity need, the sensor may be better suited to increase the sensitivity of the sensor instead of providing any additional adjustments to a characteristic at a sensor-skin interface. In these, and other example situations, the device may determine that the sensitivity of the sensor itself may be adjusted, as shown at step 1020. After adjusting the sensitivity, the device queries again whether the sensitivity of the biopotential-signal sensor exceeds a sensitivity threshold at step 1018. If the sensitivity of the biopotential-signal sensor is satisfactory at step 1018, the method continues to step 1010. Steps 1010-1016 are the same as discussed with respect to FIG. 10A. In some embodiments, the biopotential-signal sensor sensitivity determinations and adjustment shown at steps 1018 and 1020 may be performed after both step 1004 and 1010, or after just one of step 1004 or 1010. In some embodiments, the determinations and adjustment to the biopotential-signal sensor sensitivity may occur at other times or after other steps. For example, the steps of 1018 and 1020 may occur at the same time as step 1004, or 1010, or both.

Figure 10C:
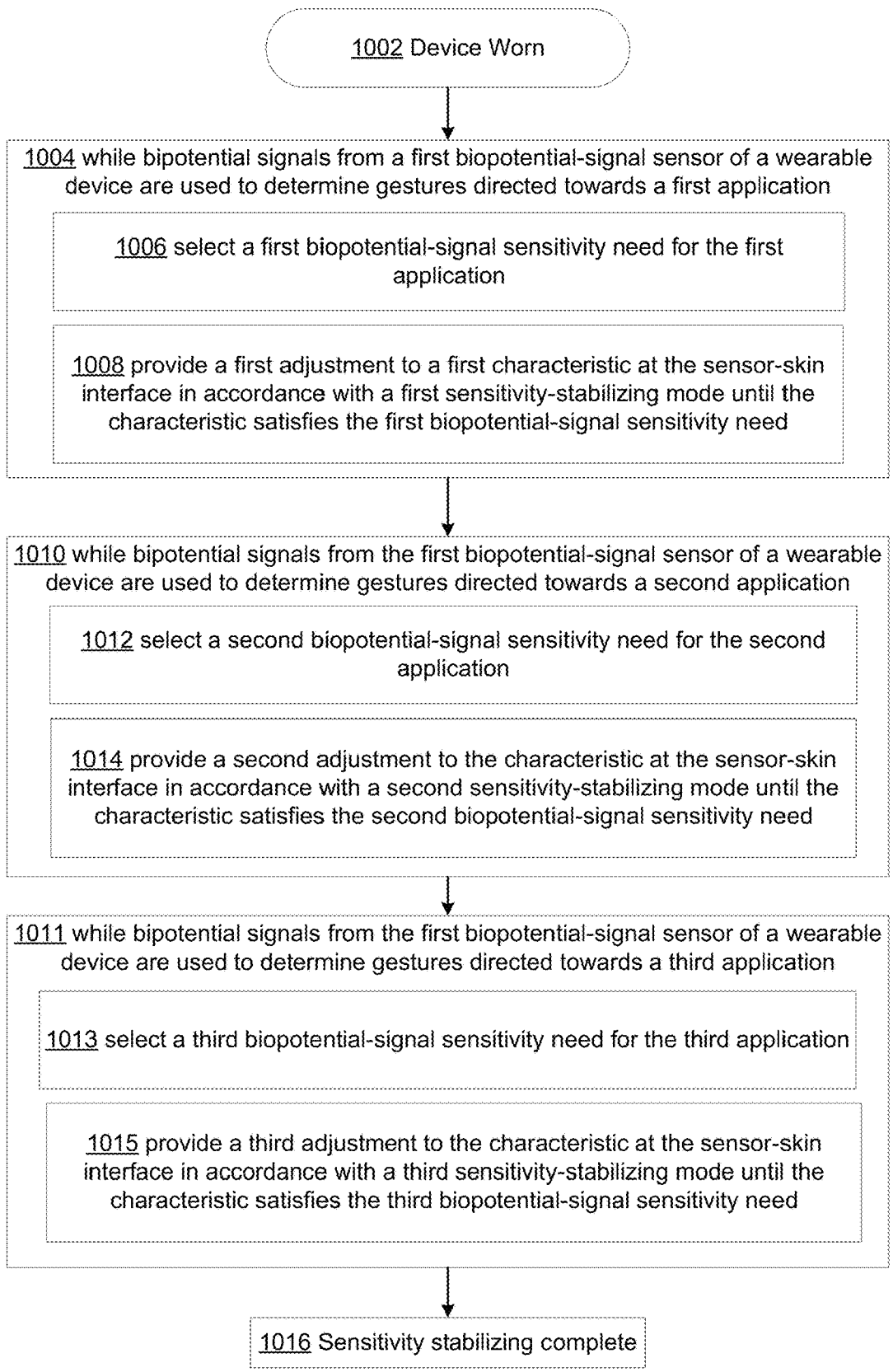

FIG. 10C depicts a flow chart of another example embodiment. Steps 1002 to 1014 are the same as discussed with respect to FIG. 10A. Step 1011 represents a point during which bipotential signals from the first biopotential-signal sensor of a wearable device are used to determine gestures directed towards a third application. During step 1011, at step 1013 the device selects a third biopotential-signal sensitivity need for the third application, and, at 1015, provides a third adjustment to the characteristic at the sensor-skin interface in accordance with a third sensitivity-stabilizing mode until the characteristic satisfies the third biopotential-signal sensitivity need. Steps 1004, 1010, and 1011 may occur after, before, or at the same time as each other. When the first, second, and third biopotential-signal sensitivity needs are satisfied, the sensitivity stabilizing is complete, as shown at step 1016.

FIG. 10D depicts a flow chart of another example embodiment. Steps 1002 to 1014 are the same as discussed with respect to FIG. 10A.

Step 1030 represents a point during which bipotential signals from a second biopotential-signal sensor of a wearable device are used to determine gestures directed towards a third application. During step 1011, at step 1013 the device selects a third biopotential-signal sensitivity need for the third application and, at 1015, provides a third adjustment to a second characteristic at a second sensor-skin interface in accordance with a third sensitivity-stabilizing mode until the second characteristic satisfies the third biopotential-signal sensitivity need. Steps 1004, 1010, and 1030 may occur after, before, or at the same time as each other. When the first, second, and third biopotential-signal sensitivity needs are satisfied, the sensitivity stabilizing is complete, as shown at step 1016.

Figure 11A:
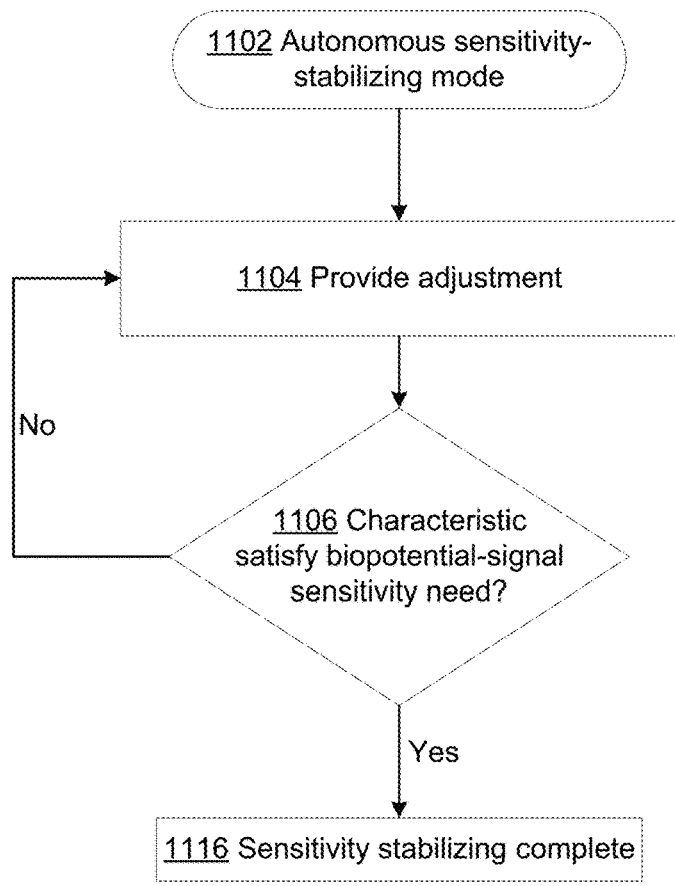
FIGS. 11A-11D are charts depicting example methods of sensitivity-stabilizing modes, in accordance with some embodiments.
Figure 11A:
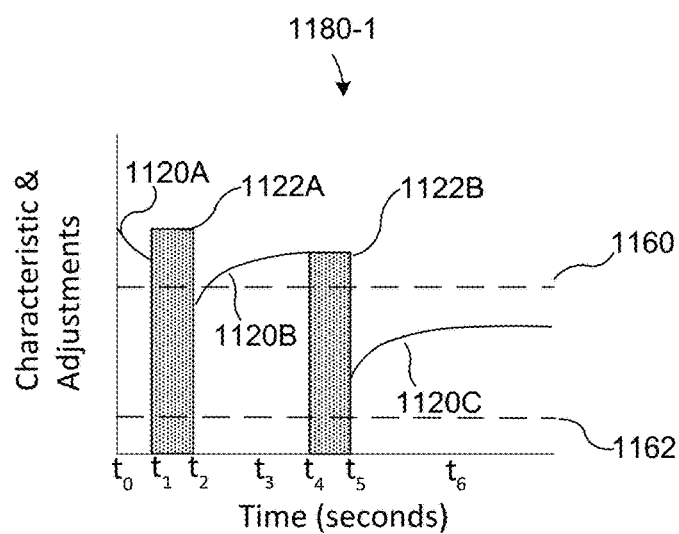

FIGS. 11A-11D are charts depicting example methods of sensitivity-stabilizing modes, in accordance with some embodiments. FIG. 11A shows a flow chart and depiction of an example sensitivity-stabilizing mode. FIG. 11A depicts one embodiment of the autonomous sensitivity-stabilizing mode. After being selected at step 1102 as the sensitivity-stabilizing mode to be utilized—for example in response to being selected as shown in FIGS. 10A-10D (e.g., steps 1006, 1012, etc.)—the autonomous sensitivity-stabilizing mode provides an adjustment at step 1104. The adjustment (or stimulation as used elsewhere in this specification) may be provided in a variety of ways, intensities, etc. as also discussed elsewhere in this specification. For example, the adjustment provided at step 1104 may be one or more adjustment. In some embodiments, the adjustment provided at step 1104 may be in accordance with one or more of the adjustments described elsewhere in this specification, for example in connection with FIGS. 1-4 and 6. After step 1104, at 1106 the method determines whether a characteristic satisfies the biopotential-signal sensitivity need. If the biopotential-signal sensitivity need is not satisfied, the method returns to step 1104 to provide another one or more adjustments as discussed with respect to step 1104 above. If the biopotential-signal sensitivity need is satisfied at step 1106, the sensitivity stabilizing is complete at step 1116.

FIG. 11A also includes a graph 1180-1 depicting an example of the adjustments and characteristics made in some embodiments of the autonomous sensitivity-stabilizing mode. Times $t_0$ to $t_6$ represent points in time. The duration of these times are presented for example purposes and the duration, or relative durations, of the times as shown may be different in some embodiments. At time $t_0$, the characteristic (e.g., impedance, hydration level, etc.) as indicated by line 1120A is above the biopotential-signal sensitivity need as indicated by dotted line 1160. At $t_1$, an adjustment 1122A is provided automatically in connection with step 1104. The adjustment 1122A is provided from time $t_1$ to $t_2$. At $t_2$, the characteristic is measured (or estimated, etc. as described elsewhere in this specification) until $t_4$, as shown by characteristic line 1120B.

At time $t_3$, the method queries whether the characteristic represented by line 1120B satisfies the biopotential-signal sensitivity need. In some embodiments this determination will occur immediately after the adjustment is applied. In some embodiments, the determination will occur at some time after the adjustment is applied, for example so that the characteristic has sufficient time to level off. In the example embodiment shown in graph 1180-1, the characteristic line 1120B at time $t_3$ is above the biopotential-signal sensitivity need 1160. The determination made at $t_3$ in accordance with step 1106 would be to provide another adjustment 1122B in accordance with step 1104. This adjustment 1122B is occurs from time $t_4$ to $t_5$. In some embodiments, one adjustment may vary (e.g., in time, intensity, etc.) from another adjustment. After time $t_5$, the characteristic value has lowered and leveled off below biopotential-signal sensitivity need line 1160 as shown by characteristic line 1120C. At time $t_6$, another query as to whether the characteristic (as shown by characteristic line 1120C) satisfies the biopotential-signal sensitivity need 1160 in accordance with step 1106. In the example embodiment shown in graph 1180-1, the characteristic 1120C at time $t_6$ satisfies the biopotential-signal sensitivity need 1160 and the sensitivity stabilizing is complete.

In some embodiments, there may be a lower bound on the biopotential-signal sensitivity, as shown by dotted line 1162. This lower bound may correspond to, for example, the sensitivity threshold and related process as discussed with respect to FIG. 10B (e.g., steps 1018-1020). In some embodiments, this sensitivity threshold or lower bound on the biopotential-signal sensitivity need may be present (as it is in FIG. 11A). In some embodiments, the lower sensitivity threshold may not exist or be applied.

Figure 11B:
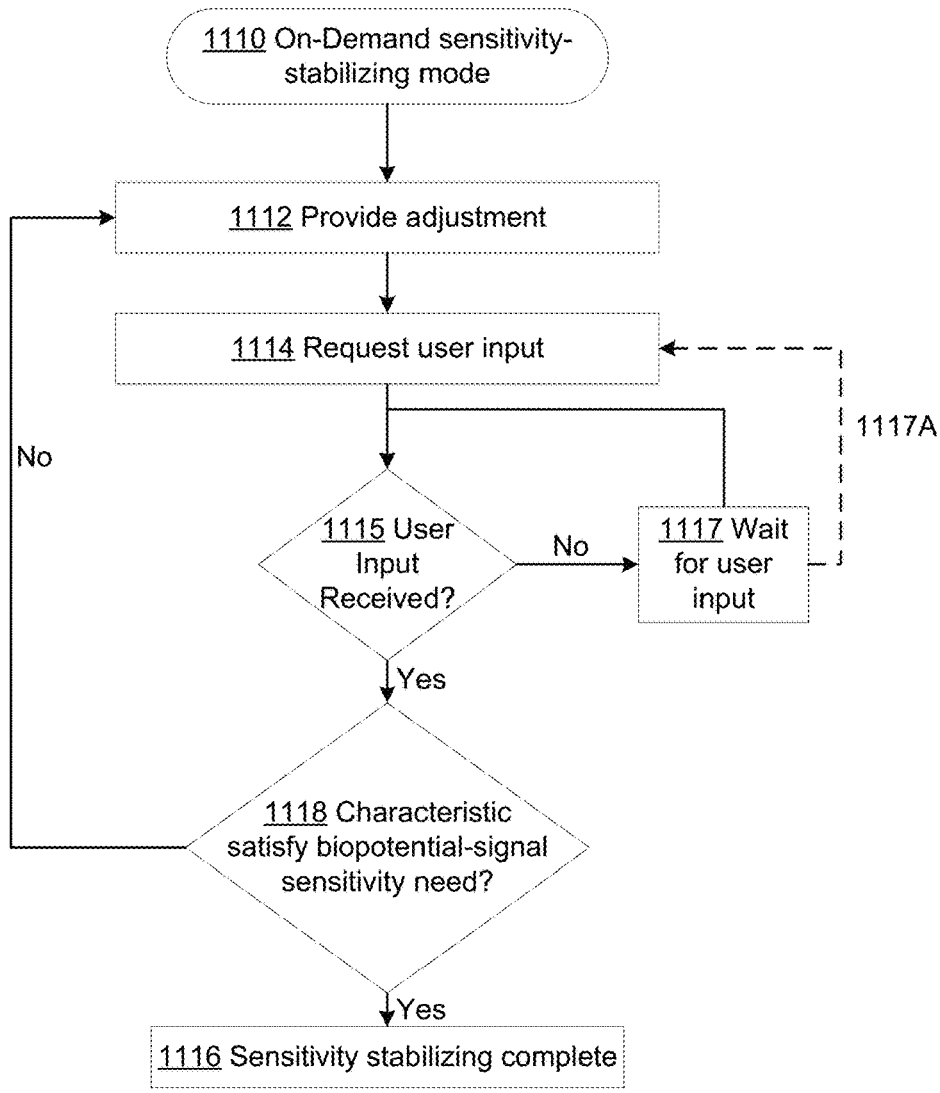
Figure 11B:
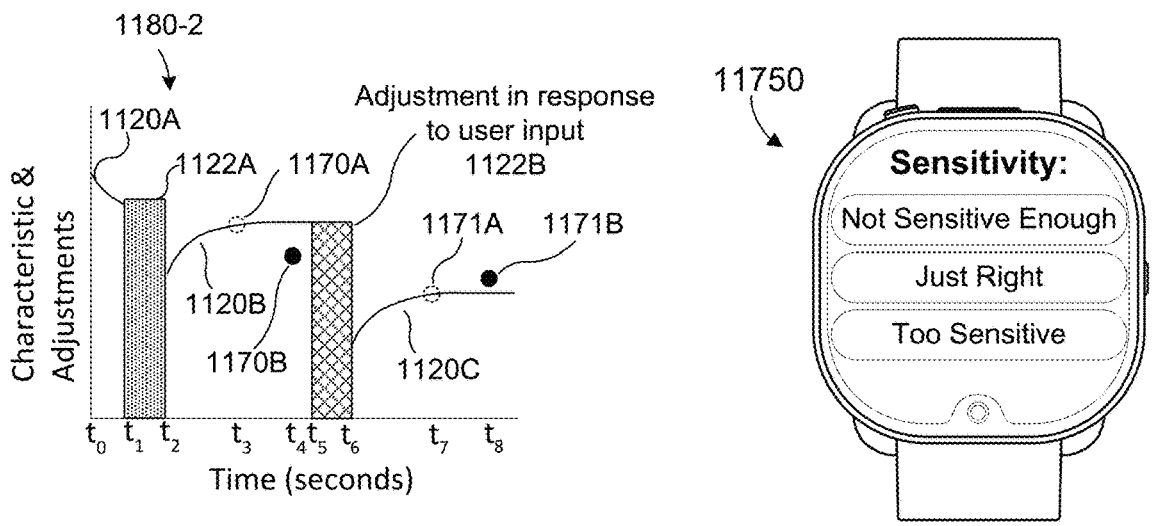

FIG. 11B shows a flow chart and depiction of another example sensitivity-stabilizing mode. FIG. 11B depicts one embodiment of the on-demand sensitivity-stabilizing mode. After being selected at step 1110 as the sensitivity-stabilizing mode to be utilized—for example in response to being selected as shown in FIGS. 10A-10D (e.g., steps 1006, 1012, etc.)—the on-demand sensitivity-stabilizing mode provides an adjustment at step 1112. The adjustment (or stimulation as used elsewhere in this specification) may be provided in a variety of ways, intensities, etc. as also discussed elsewhere in this specification. For example, the adjustment provided at step 1112 may be one or more adjustment. In some embodiments, the adjustment provided at step 1112 may be in accordance with one or more of the adjustments described elsewhere in this specification, for example in connection with FIGS. 1-4 and 6. After step 1112, at 1114 the method requests input from a user as to whether the characteristic (e.g., the user's perceived sensitivity) satisfies the biopotential-signal sensitivity need (e.g., whether the user's perceived sensitivity/sensitivity experience is at an acceptable or desirable level of sensitivity).

After requesting input from the user at step 1114, the method queries whether user input has been received at step 1115. If the user's input has been received at step 1115, the method proceeds to step 1118 to query whether the characteristic satisfies the biopotential-signal sensitivity need. If user input has not been received at step 1115, the method will proceed to step 1117, which instructs the method to wait until the user input is received at step 1115 before proceeding to step 1118. In some embodiments, at least one example of which will be discussed elsewhere in this specification, the method will wait a certain amount of time before taking another action, for example applying another adjustment automatically, querying whether (after the amount of time has passed) the characteristic satisfies the biopotential-signal sensitivity need, sending a notification to the user to request user input, etc. If the biopotential-signal sensitivity need is not satisfied at step 1118, the method returns to step 1112 to provide another one or more adjustment. If the biopotential-signal sensitivity need is satisfied at step 1118, the sensitivity stabilizing is complete at step 1116.

FIG. 11B also shows example device 11750 where the user may provide feedback on the sensitivity level. In some embodiments, the device may be a wearable device, an application on a device such as a phone, tablet, etc., feedback on a headset, or other device. In some embodiments, the device may request whether the sensitivity is too high (e.g., "Too Sensitivity"), too low (e.g., "Not Sensitive Enough"), or acceptable ("Just Right") as shown on the face of the device 11750. In some embodiments, other input options are available, for example, additional options to adjust sensitivity a lot versus a little, by providing a slider bar for adjustable sensitivity, etc.

FIG. 11B also includes a graph 1180-2 depicting an example of the adjustments made and characteristics sensed in some embodiments of the on-demand sensitivity-stabilizing mode. Times $t_0$ to $t_6$ represent points in time. The duration of these times are presented for example purposes and the duration, or relative durations, of the times as shown may be different in some embodiments. Times $t_0$ to $t_6$ represent times that may be before, during, or after times $t_0$ to $t_6$ discussed with respect to other Figures or embodiments in this specification. At time $t_0$, the characteristic (e.g., impedance, hydration level, etc.) is indicated by line 1120A. At $t_1$, an adjustment 1122A is provided in connection with step 1112. The adjustment 1122A is provided from time $t_1$ to $t_2$. At $t_2$ the characteristic is measured (or estimated, etc. as described elsewhere in this specification) until $t_5$, as shown by characteristic line 1120B. At time $t_3$, the method requests user input as to the current sensitivity level in accordance with step 1114. This request is shown by the dotted circle 1170A in graph 1180-2. Dark circle 1170B indicates the point in time when user input is received. In some embodiments a request will occur immediately after the adjustment is applied. In some embodiments, a request will occur at some time after the adjustment is applied, for example so that the characteristic has sufficient time to level off. From the time $t_3$ until time $t_4$ when user input is received—as indicated by dark circle 1170B—the method is performing steps 1115 and 1117 where it is querying and waiting for user input. At time $t_4$, the user indicates that the sensitivity is too low and that that the characteristic does not satisfy the biopotential-signal sensitivity need as shown with element 1170B—showing that the desired biopotential-signal sensitivity need (e.g., 1170B) is below the current characteristic value as shown by characteristic line 1120B. The time from $t_4$ to is represents the time during which the method is processing steps 1115 and 1118—where the method has received user input, and is determining whether the characteristic (e.g., current sensitivity, characteristic level, etc.) satisfies the biopotential-signal sensitivity need (e.g., user's input as to the desired sensitivity).

Because the desired biopotential-signal sensitivity need (e.g., 1170B) is below the current characteristic value as shown by characteristic line 1120B, another adjustment 1122B is provided from time is to $t_6$. The characteristic value after the application of adjustment 1122B is shown with characteristic line 1120C. A request for user input as described with respect to step 1114 is shown at dotted circle 1171A at time $t_7$. From the time $t_7$ until time $t_8$ when user input is received—as indicated by dark circle 1171B—the method is performing steps 1115 and 1117 such that the method is querying and waiting for user input. At time $t_8$, the user indicated at 1171B that the characteristic satisfies the biopotential-signal sensitivity need (for example, as shown by the circle 1171B being above the characteristic line 1120C), and the method proceeds to step 1116 indicating that the sensitivity stabilizing is complete. In some embodiments of this or other sensitivity-stabilizing modes, one or more device may provide a notification that the sensitivity stabilization is complete. In some embodiments, one or more device may not provide a notification and the user may be automatically directed back to the application that the user was engaged in when the sensitivity-stabilizing mode was selected.

Figure 11C:
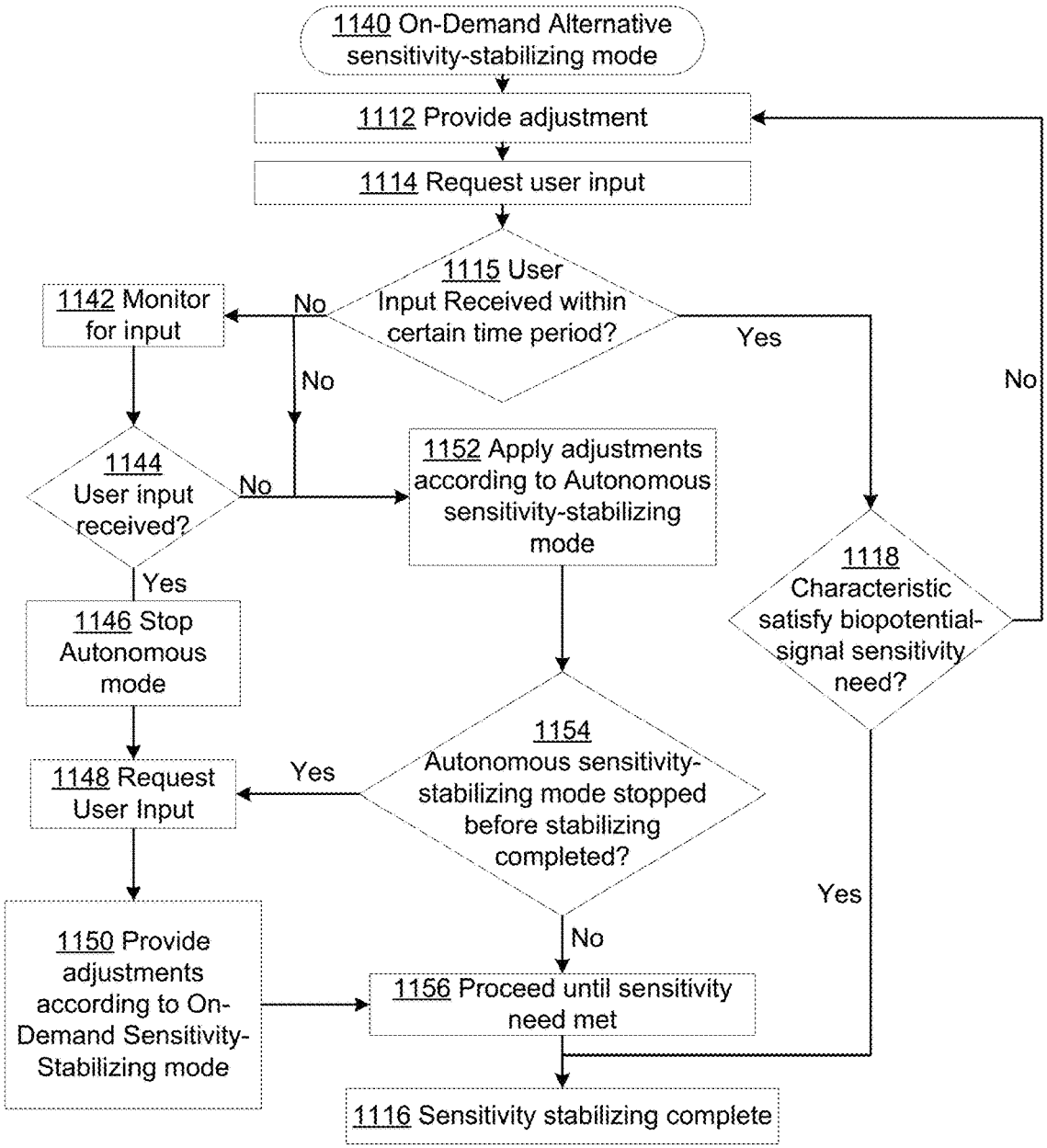
Figure 11C:
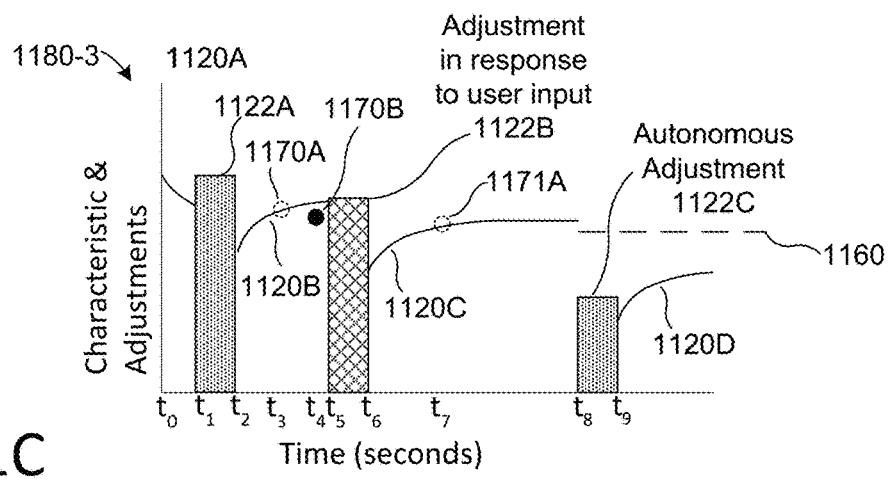

FIG. 11C shows a flow chart and depiction of another example sensitivity-stabilizing mode. FIG. 11C depicts one embodiment of an alternative embodiment of the on-demand sensitivity-stabilizing mode. After being selected at step 1140 as the sensitivity-stabilizing mode to be utilized—for example in response to being selected as shown in FIGS. 10A-10D (e.g., steps 1006, 1012, etc.)—the alternative on-demand sensitivity-stabilizing mode provides an adjustment at step 1112. The adjustment (or stimulation as used elsewhere in this specification) may be provided in a variety of ways, intensities, etc. as also discussed elsewhere in this specification. After step 1112, at 1114 the method requests input from a user as to whether the characteristic (e.g., the user's perceived sensitivity) satisfies the biopotential-signal sensitivity need (e.g., whether the user's perceived sensitivity/sensitivity experience is an acceptable or desirable level of sensitivity). After requesting input from the user at step 1114, the method queries whether user input has been received within a certain time period at step 1115. In some embodiments, the certain time period may be 5 seconds, 10 seconds, or 15, seconds. In some embodiments, the certain time period may depend on user settings or other determinations such as the deviation of the current characteristic value from an expected biopotential-signal sensitivity need (which may be based on, for example, prior user input, the application's indication as to a required sensitivity need, etc.). For example, if the deviation is large, the method may wait a longer time period (e.g., 10-20 s); or, if the deviation is small, the method may wait a shorter time period (e.g., <5s).

If user input has not been received within the certain time period at step 1115, the method will proceed to both step 1142 and to step 1152. Throughout the remainder of the duration of the sensitivity stabilizing mode being performed (e.g., before the method reaches step 1116 indicating that the sensitivity stabilizing is complete), the method will monitor for user input as indicated at step 1142. While the method is monitoring for user input (step 1142), the method will proceed to step 1152 and begin providing adjustments according to another sensitivity-stabilizing mode, for example the autonomous sensitivity-stabilizing mode as described in FIG. 11A. As long as user input is not received as indicated by query step 1144, the method will continue to provide adjustments according to the autonomous sensitivity-stabilizing mode, for example as discussed with respect to FIG. 11A.

If user input is received at step 1144, the method sends a signal 1146 to stop the autonomous sensitivity-stabilizing mode and to request user input in step 1148 as to the sensitivity. After user input is requested at 1148, the method proceeds to provide adjustments in accordance with another sensitivity-stabilizing mode at step 1150. In some embodiments, the method would proceed to provide adjustments in accordance with the on-demand sensitivity-stabilizing mode as discussed with respect to, for example, FIG. 11B. In some embodiments, the adjustments would be provided in accordance with the alternative on-demand mode. For example, after the request for user input 1148, the method may return to step 1115 and continue until sensitivity stabilizing was complete at step 1116.

If user input is not received at step 1144, the method will continue to provide adjustments in accordance with, for example, the autonomous sensitivity-stabilizing mode, for example as shown and discussed with respect to FIG. 11A. The method also queries, at step 1154, whether the autonomous autonomous-sensitivity stabilizing mode has been stopped before the biopotential-signal sensitivity need is met—for example being stopped in response to receive user input at step 1144 and the signal to stop the autonomous mode at step 1146 being issued. This query 1154 as to whether the autonomous sensitivity-stabilizing mode has been stopped may occur, for example, after step 1104 or after step 1106 as shown in FIG. 11A. If the query 1154 occurs after step 1106 in FIG. 11A, the autonomous sensitivity-stabilizing mode method would first ask whether the autonomous sensitivity-stabilizing mode has been stopped (step 1154 in FIG. 11C), before proceeding back to step 1104 (in FIG. 11A) to provide an adjustment. If at step 1154 the autonomous sensitivity-stabilizing mode has been stopped, the method proceeds to step 1148 as discussed herein. If at step 1154 the autonomous sensitivity-stabilizing mode has not been stopped, the autonomous sensitivity-stabilizing mode continues until the sensitivity need is met at step 1156, which then indicates that the sensitivity stabilizing process is complete at step 1116.

Returning to step 1115, if the user's input has been received at step 1115 within the certain time period, the method proceeds to step 1118 to query whether the characteristic satisfies the biopotential-signal sensitivity need. If the characteristic satisfies the biopotential-signal sensitivity need, the method proceeds to step 1116 where sensitivity stabilizing is complete. If the characteristic does not satisfy the biopotential-signal sensitivity need, the method provides an adjustment at step 1112, requests user input at step 1114, queries whether user input has been received within a certain time period at step 1115, and, based on whether user input is received within the time period, proceeds with the method as discussed herein.

FIG. 11C also includes a graph 1180-3 depicting an example of the adjustments made and characteristics sensed in some embodiments of the alternative on-demand sensitivity-stabilizing mode. Times $t_0$ to $t_9$ represent points in time. The duration of these times are presented for example purposes and the duration, or relative durations, of the times as shown may be different in some embodiments. Times $t_0$ to $t_9$ represent times that may be before, during, or after times discussed with respect to other Figures or embodiments in this specification. At time $t_0$, the characteristic (e.g., impedance, hydration level, etc.) is indicated by line 1120A. At time $t_1$ until time $t_2$, an adjustment 1122A is provided in connection with step 1112. At $t_2$ the characteristic is measured (or estimated, etc. as described elsewhere in this specification) until $t_5$, as shown by characteristic line 1120B. At time $t_3$, the method requests user input as to the current sensitivity level in accordance with step 1114. This request is shown in graph 1180-3 by the dotted circle 1170A. Dark circle 1170B indicates the point in time when user input is received, which corresponds to the user providing within the certain time period and to a "Yes" response to step 1115. As indicated by the dark circle 1170B at $t_4$, the user indicated that the user desired a lower characteristic (or sensitivity) value, which corresponds to step 1118. The method returns to step 1112 and provides an adjustment 1222B from $t_5$ to $t_6$ in response to the user's input that the characteristic did not satisfy the biopotential-signal sensitivity need.

The characteristic value from $t_6$ to $t_8$ is shown by characteristic value line 1120C. The method requests input from the user in accordance with step 1114, as shown by dotted circle 1171A in graph 1180-3. The certain time period in this embodiment is the time from $t_7$ to $t_8$. In the example embodiment, during step 1115 no user input was received within the time period between $t_7$ to $t_8$. As a result, the method proceeded to steps 1142 and 1152. In accordance with step 1152, an adjustment 1122C is provided according to the autonomous sensitivity-stabilizing mode. In addition to providing an adjustment, the method implements a biopotential-signal sensitivity need 1160 in accordance with, for example, the methods and systems discussed with respect to FIG. 10. After the adjustment 1122C from $t_8$ to $t_9$, the characteristic value is shown with characteristic line 1120D. The characteristic value 1120D is below the biopotential-signal sensitivity need 1160. No user input has been received at the point where it is determined that the characteristic is below the biopotential-signal signal sensitivity need 1160. Therefore, the method proceeds through steps 1154 and 1156 and completes the sensitivity stabilizing process at step 1116.

In the embodiment depicted in graph 1180-3, user input is not received before the autonomous adjustment mode is able to be completed (e.g., before the adjustments provided according to the sensitivity-stabilizing mode cause the characteristic to satisfy the biopotential-signal sensitivity need). In some embodiments, if user input was received, the process would be achieved in the way shown in the flow chart—e.g., through steps 1144, 1146, 1148, and 1150 as described in this specification.

Figure 11D:
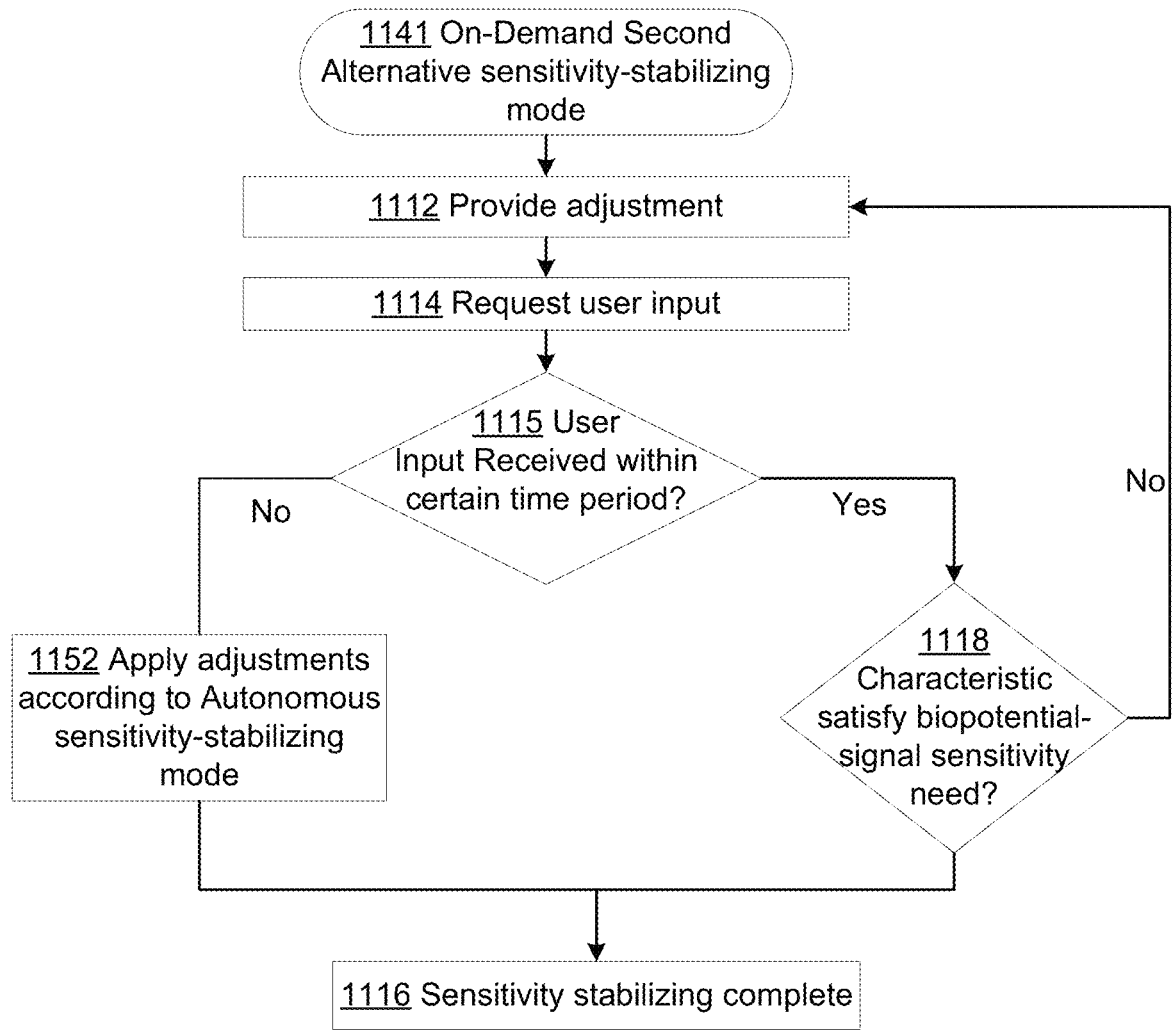

FIG. 11D shows a flow chart of another example sensitivity-stabilizing mode. FIG. 11D depicts one embodiment of a second alternative embodiment of the on-demand sensitivity-stabilizing mode. In some embodiments, the ability for a user's input to interrupt the autonomous mode would not be included. In such an embodiment, the system would not monitor for input.

After being selected at step 1141 as the sensitivity-stabilizing mode to be utilized—for example in response to being selected as shown in FIGS. 10A-10D (e.g., steps 1006, 1012, etc.)—the second alternative on-demand sensitivity-stabilizing mode provides an adjustment at step 1112 as discussed elsewhere in the specification. After step 1112, at 1114 the method requests user input as discussed elsewhere in the specification. After requesting input from the user at step 1114, the method queries whether user input has been received within a certain time period at step 1115 as discussed elsewhere in the specification. If user input has not been received within the certain time period at step 1115, the method proceeds to apply adjustments in accordance with another sensitivity stabilization mode in step 1152, for example the autonomous sensitivity-stabilizing mode. In some embodiments, the other sensitivity-stabilizing mode may be a mode other than the autonomous mode, for example the on-demand, alternative on-demand, or another mode. The sensitivity-stabilization mode utilized at step 1152 proceeds until sensitivity stabilizing is completed according to the sensitivity-stabilization mode selected and utilized in step 1152.

If the user's input has been received at step 1115 within the certain time period, the method proceeds to step 1118 to query whether the characteristic satisfies the biopotential-signal sensitivity need. If the characteristic satisfies the biopotential-signal sensitivity need, the method proceeds to step 1116 where sensitivity stabilizing is complete. If the characteristic does not satisfy the biopotential-signal sensitivity need, the method provides an adjustment at step 1112, requests user input at step 1114, queries whether user input has been received within a certain time period at step 1115, and, based on whether user input is received within the time period, proceeds with the method as discussed herein.

Figure 12A:
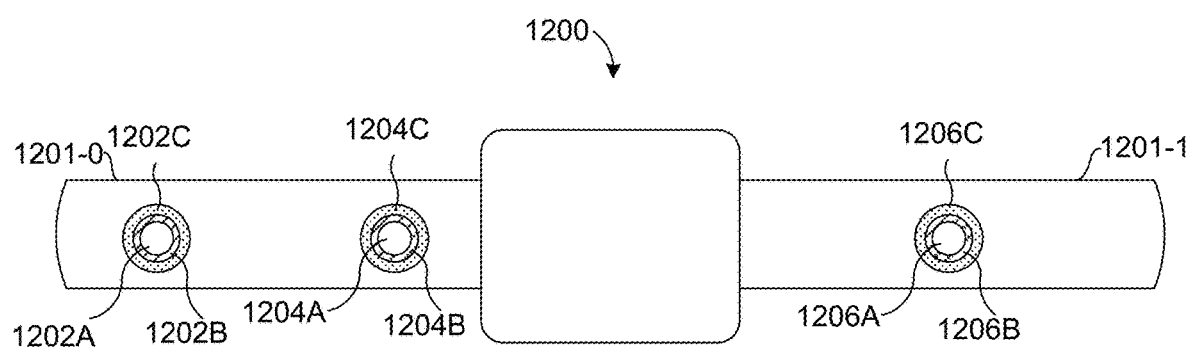
FIGS. 12A-12B illustrate example configurations for certain components (e.g., including biopotential-signal sensing, stabilizing, and monitoring components) on band portions of a wrist-wearable device, in accordance with some embodiments.

FIG. 12A shows an embodiment of an exemplary configuration of components on band portions 1201 of wrist-wearable device 1200. Band portions 1201-0 and 1201-1 include biopotential-signal electrodes 1202A, 1204A, 1206A, which are configured to sense biopotential-signals. Band portions 1201-0 and 1201-1 further include characteristic-initiating electrodes 1202B, 1204B, 1206B that are configured to provide a signal or adjustment—for example, current or voltage. Band portions 1201-0 and 1201-1 further include characteristic-return electrodes 1202C, 1204C, 1206C that are configured to sense, measure, estimate, determine, etc. the signal sent from the respective characteristic-initiating electrode. In some embodiments the function of the characteristic-initiating electrodes could be provided by the biopotential-signal electrodes. In some embodiments, the components may be utilized in a capacitance based hydration measurement using high frequencies. For example, the characteristic-initiating electrodes 1202B, 1204B, 1206B provide a signal (e.g., DC current, voltage, low frequency, high frequency, etc. signals) and the respective characteristic-return electrodes 1202C, 1204C, 1206C measure the signal after traveling the distance between the characteristic-initiating electrodes 1202B, 1204B, 1206B and the respective characteristic-return electrodes 1202C, 1204C, 1206C to determine a resistance. This may be utilized to measure a skin-hydration value or other characteristic values.

Figure 12B:
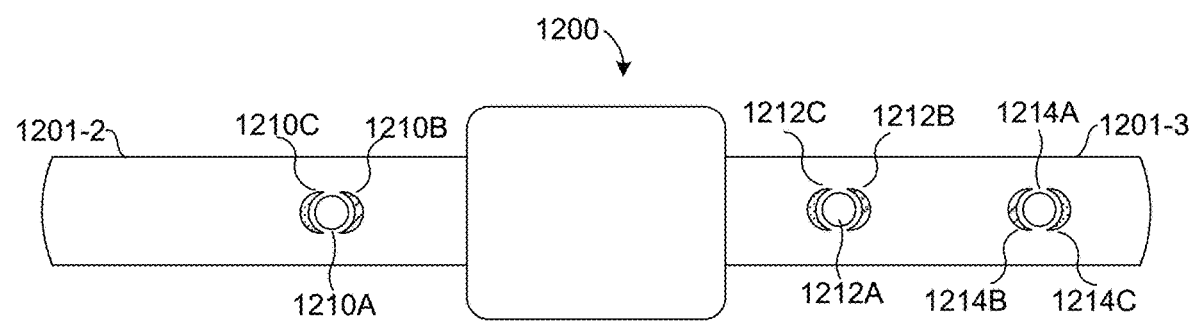

FIG. 12B shows an embodiment of another exemplary configuration of components on band portions 1201 of wrist-wearable device 1200. Band portions 1201-2 and 1201-3 include biopotential-signal electrodes 1210A, 1212A, 1214A, which are configured to sense biopotential-signals. Band portions 1201-0 and 1201-1 further include characteristic-initiating electrodes 1210B, 1212B, 1214B that are configured to provide a signal—for example, current or voltage. Band portions 1201-0 and 1201-1 further include characteristic-return electrodes 1210C, 1212C, 1214C that are configured to sense, measure, estimate, determine, etc. the signal sent from the respective characteristic-initiating electrode. In some embodiments the function of the characteristic-initiating electrodes could be provided by the biopotential-signal electrodes. In some embodiments, the components may be utilized in an impedance based hydration measurement using high frequencies. For example, the characteristic-initiating electrodes 1210B, 1212B, 1214B provide a signal (e.g., DC current, voltage, low frequency, high frequency, etc. signals) and the respective characteristic-return electrodes 1210C, 1212C, 1214C measure the signal after traveling the distance between the characteristic-initiating electrodes 1210B, 1212B, 1214B and the respective characteristic-return electrodes 1210C, 1212C, 1214C to determine a resistance. This may be utilized to measure a skin-hydration value or other characteristic values.

The components shown in FIG. 12 may be used instead of or in addition to other components discussed herein, for example the components shown in FIG. 5. The configurations and variations shown in FIG. 12 are merely presented as an example and other configurations and variations are contemplated, for example as discussed with respect to FIG. 5. Like the components and configurations discussed with respect to FIG. 5, the components may be utilized with any wearable device (e.g., headset, glove, ankle, leg, arm, etc.) and are not limited to wrist-wearable devices. In some embodiments, only the characteristic-initiating electrodes and characteristic-return electrodes would be provided to determine a characteristic value and no biopotential-signal electrode would be provided. In some embodiments, only some of the component groupings would include the biopotential-signal electrodes, characteristic-initiating electrodes, and the characteristic-return electrodes, while other component groupings would include only biopotential-signal electrodes. Other combinations of components, for example the components shown in FIGS. 5 and 7, are also contemplated.

In addition to altering the impedance of the skin-electrode interface, the skin-electrode interface modulation techniques disclosed herein can be used to reduce noise, improve SnR, and/or improve system settling time.

To provide further examples, paragraphs preceded with E1-E16 (and F1-11) below describe a more detailed example of systems, methods, and apparatuses for biopotential-signal and sensitivity stabilization and example sensitivity-stabilizing modes.

(E1) In some embodiments, a method for sensing biopotential signals comprising a method for sensing biopotential signals is provided. While bipotential signals from a first biopotential-signal sensor of a wearable device are used to determine gestures directed towards a first application, the method includes selecting a first biopotential-signal sensitivity need for the first application. The biopotential-signal sensor is configured to be in contact with skin of a wearer of the wearable device at a first sensor-skin interface. In accordance with selecting the first biopotential-signal sensitivity need for the first application, the method includes providing a first adjustment to a first characteristic at the sensor-skin interface in accordance with a first sensitivity-stabilizing mode until the characteristic satisfies the first biopotential-signal sensitivity need. While bipotential signals from the biopotential-signal sensor of the wearable device are used to determine gestures directed towards a second application, the method includes selecting a second biopotential-signal sensitivity need for the second application. In accordance with selecting the second biopotential-signal sensitivity need for the second application, the method includes providing a second adjustment to the characteristic at the sensor-skin interface in accordance with a second sensitivity-stabilizing mode until the characteristic satisfies the second biopotential-signal sensitivity need. In some embodiments, the first biopotential-signal sensitivity need and the second biopotential-signal sensitivity need are distinct.

In some embodiments, the first and second applications are different programs running on the wearable device or a connected headset. For example, the first and second programs may include at least different games (e.g. Beat Saber, Walkabout Mini Golf, Golf+TopGolf, etc.), different media programs or platforms (e.g., YouTube, Netflix, etc.), the operating software, etc. In some embodiments, the first and second applications are the actions to be performed and the applications in which those applications are performed. For example, the first and second applications that trigger the first and second sensitivity-stabilizing modes may occur within the same program such that the first application involves an action (e.g., waving) that requires less sensitivity and the second application involves an action (e.g., typing) that requires more sensitivity. As another example, if an application requires high sensitivity of a wearer's pointer finger, but low sensitivity on the user's pinky, the sensitivity need of a biopotential-signal sensor that corresponds to detecting pointer finger movement may be higher than the sensitivity need of the biopotential-signal sensor that corresponds to detecting pinky finger movement.

In some embodiments, the biopotential-signal sensitivity need may be different for the same actions based on a variety of factors, for example if the biopotential-signal sensors are located on different parts of the user's skin. For example, if the same action requires detecting biopotential signals associated with a pointer finger and the biopotential-signal sensor is located directly adjacent to the nerve, muscle, etc. being sensed for movement associated with the pointer finger, the sensitivity need may be lower than if the biopotential-signal sensor is not located adjacent to the nerve, muscle, etc. being sensed for movement associated with the pointer finger. The sensitivity need may vary based on a variety of other factors as discussed herein. In some embodiments, the biopotential-signal sensitivity need may be based on user input. In some embodiments, the user's input may override or supplement the biopotential-signal sensitivity need indicated by the first application.

In some embodiments, the biopotential signals include electromyography (EMG), electroencephalography (EEG), or electrocardiography (EKG) signals. In some embodiments the biopotential-signal sensors include electromyography (EMG), electroencephalography (EEG), or electrocardiography (EKG) signal sensors. In some embodiments, the biopotential-signal sensors and the neuromuscular-signal sensors are the same.

Providing the first and second adjustments to the characteristic at the sensor-skin interface may involve various different types of actions, for instance, reducing a skin moisture level at the sensor-skin interface through provision of an electrical current at the sensor-skin interface or soaking up a portion of the skin moisture to reduce moisture level at a particular location. The characteristic may thus be something like skin moisture, which may be a proxy used to understand impedance at the sensor-skin interface, but it may also be the impedance directly, among other things.

An example of the biopotential-signal sensitivity need may be an acceptable false positive rate (or true positive rate) for detection of a certain baseline gesture (e.g., a thumb to index finger pinch gesture) based on the biopotential signals. In one example, the biopotential-signal sensitivity needs may be numerical values for impedance values associated with certain false positive rates, such as an impedance value associated with a false positive rate between 1-5%, including ranges of values. For instance, the first biopotential-signal sensitivity need may be a range of impedance values associated with a false positive rate between 3-5% (e.g., a lower level of accuracy in gesture detection will be acceptable), and the second biopotential-signal sensitivity need may be impedance values associated with a false positive rate between 1-2% (e.g., a higher level of accuracy in gesture detection is needed).

This is shown, for example, in at least FIGS. 10-11. Methods of providing adjustments (e.g., stimulations) may be the same as shown and described elsewhere, for example in at least FIGS. 1-4, 6. Examples of adjustment (e.g., stimulation) generating components are shown in at least FIGS. 1-3, 5, 7A, 12.

(E2) In some embodiments of E1, the first sensitivity-stabilizing mode provides the first adjustment at the sensor-skin interface without input from the wearer, and the second sensitivity-stabilizing mode provides the second adjustment at the sensor-skin interface based on input from the wearer in conjunction with the provision of the second adjustment.

In some embodiments, one sensitivity-stabilizing mode is an autonomous mode wherein adjustments (e.g., stimulations) are applied until the sensitivity need is met without user input. In some embodiments, the sensitivity need associated with the autonomous mode is pre-selected or pre-configured. For example, the sensitivity need for certain actions or applications may require greater than 50% sensitivity. In such an example, the autonomous sensitivity-stabilizing mode may run until the pre-determined sensitivity need is met—e.g., adjustments may be directed until the sensitivity is detected to be 50% or better.

In some embodiments, the application may indicate that a particular biopotential-signal sensitivity need is likely within a certain time period. For example, the application may know or expect that a certain action requiring a high level of sensitivity (that may be higher than the current sensitivity level) is likely to occur (e.g., a user is walking into a room and the user is likely to use a computer in the room and is likely to use a keyboard soon). In such a case, the application may indicate that a particular biopotential-signal sensitivity need is required or desired. In some embodiments, this indication would also include a time value (e.g., 5 seconds) associated with when the particular biopotential-signal sensitivity need is required. A determination may then be made as to whether the required biopotential-signal sensitivity need is higher than the current sensitivity level. This determination may be made by one or more of the application itself, the wearable device, the headset, remote servers, or other circuitry related to the system.

The biopotential-signal sensitivity need may enable the autonomous mode to run a different type of adjustment program that best suits the user, the application, or otherwise. In some embodiments, the autonomous mode may direct adjustments until the sensitivity level is close to (e.g., within 5% of) the required sensitivity level if the autonomous mode has a certain degree of confidence (e.g., greater than 90%) that, by the time the higher biopotential-signal sensitivity need is required, the sensitivity level will have risen the extra 5% to the minimum sensitivity level for the upcoming action or application.

In some embodiments, one sensitivity-stabilizing mode is an on-demand mode. In some embodiments, the biopotential-signal sensitivity need for the on-demand mode may be determined in the same way as discussed elsewhere in this specification (e.g., based on the program being used or action about to be performed) or may be pre-set by the user, or may be up to user preference each time, etc. In some embodiments, the biopotential-signal sensitivity need may be different each time depending on the user's input and level of sensitivity desired by the user for a particular action, application, or based on the user's input at a particular moment. For example, the user may want higher or lower sensitivity for certain actions that the application would not expect would be needed or desired for that particular action. In some embodiments the wearer's input could be a lack of input, as discussed elsewhere in the specification.

In some embodiments, the system—e.g., within the wearable device, a headset, an associated application, or otherwise—may include a user interface where the user may accept or reject the current level of sensitivity and decide whether the current level satisfies the biopotential-signal sensitivity need. In some embodiments, the user could indicate that the sensitivity characteristic is too high or too low and the system could adjust the sensitivity accordingly. In some embodiments, the user could also indicate the degree of how far the current sensitivity is from the desired sensitivity need—e.g., the current sensitivity is way too low or high, or just a little too low or high. The user's input may affect the application of the adjustment in at least intensity, frequency, etc. The user's input may also affect the use of one sensitivity-stabilizing mode or the other. For example, if the user has used the on-demand stabilization mode and greatly increased the sensitivity, but has most recently indicated that the current sensitivity is just a little too low, the system may cease using the on-demand stabilization mode and use the autonomous stabilization mode to achieve the smaller increase in sensitivity requested from the user.

In some embodiments, a measured characteristic at the sensor-skin interface (e.g., a biopotential-signal sensitivity level) of the wearer may vary based on the biopotential-signal sensor's contact, fit, location on the user's body, etc.

Sensitivity levels may also vary based on the user (e.g., physical or biophysical properties) or the user's environment (hot, sweaty, humid, dry, etc.). The measured sensitivity level may be determined based on a variety of measurements or other factors. In some embodiments, the measured sensitivity level may be based on at least one of: impedance, skin temperature, skin electrode pressure, skin extracellular ionic concentration, hair follicle size, skin hydration, etc.

In some embodiments, the system may provide a notification to the user that sensitivity stabilization is underway or about to occur. In some embodiments, the notification may also include a prompt for the user to select one sensitivity stabilization mode or another. In some embodiments, the user may not be prompted or notified and the sensitivity stabilization mode may run without notice to the user or without the user's input.

This is shown, for example, in at least FIG. 11. Methods of providing adjustments (e.g. stimulations) may be the same as shown and described elsewhere, for example in at least FIGS. 1-4, 6.

(E3) In some embodiments of E1-E2, the selecting of the first biopotential-signal sensitivity need for the first application and the selecting of the second biopotential-signal sensitivity need for the second application is based on at least one of: a notification from a program, a profile of the wearer, the characteristic at the sensor-skin interface, an input from the wearer, a physiological property of the wearer, or a pre-determined sensitivity need.

In some embodiments, the biopotential-signal sensitivity need may vary based on a variety of factors. These factors could include at least a program notification, a user's profile, a user's characteristic at the sensor-skin interface, a user's input, a user's physiology, or a pre-determined sensitivity need. The biopotential-signal sensitivity need may be based on one or more factors.

In some embodiments, and as also discussed elsewhere in this specification, the biopotential-signal sensitivity need may be based on an application's requirements or the action to be performed within one or more applications. The application may send a notification, indication, or other information that initiates a determination of the biopotential-signal sensitivity need. The following are example actions and applications that may require different levels of biopotential-signal sensitivity needs: moving a thumb, turning thumb a certain amount to one direction or the other (e.g., 30 degrees, 45 degrees), thumbs up or thumbs down, typing. In some embodiments, actions that require more movement, granularity, dexterity, etc. will require higher sensitivity (e.g., typing, moving fingers in different directions or in circles) than others (e.g., thumbs up). In some embodiments, if more actions are required, then a higher sensitivity need may be required. The sensitivity needs may be determined by the application. In some embodiments, there may be a level of sensitivity that is too high (e.g., a user's hand or finger moves too fast or is wobbly as a result of having the sensitivity be too high where, for example, a small movement in the wearer's hand results in a large movement during use).

In some embodiments, a user's profile may provide the biopotential-signal sensitivity need. In some embodiments, this would be a result of, for example, previous biopotential-signal measurements, a user's preference of biopotential-signal sensitivity, deviations in biopotential-signal measurements from normal measurements, from previous user measurements, rapid variations in measurements, a preference of using a certain sensitivity-stabilizing mode, etc. In some embodiments, the biopotential-signal sensitivity need is determined by the wearer, who may—before, during, or after an adjustment is provided—indicate a desired sensitivity need In some embodiments, the biopotential-signal sensitivity need may be determined based on a user's characteristic at the sensor-skin interface (e.g., the measured, estimated, or determined current sensitivity level). For example, the biopotential-signal sensitivity need may be determined based on whether a user's current characteristic at the sensor-skin interface is lower or higher than expected, is rapidly varying or varying more than expected, is much lower or higher than desired, etc. As another example, if a measured sensitivity (e.g., measured impedance, hydration level, etc.) was far from the biopotential-signal sensitivity need or if the effect of the adjustment is not having the effect that is expected, the system may enter the on-demand mode (or may ask the user whether the user wishes to use the on-demand mode). If the measured sensitivity is close to the biopotential-signal sensitivity need, the system may utilize the autonomous mode without asking the user. In some embodiments, the opposite may occur—e.g., the autonomous mode may be the default mode for a measured sensitivity level that is far from the biopotential-signal sensitivity need and the on-demand mode may be used if the measured level is close to the biopotential-signal sensitivity need.

In some embodiments, the biopotential-signal sensitivity need may be determined based on the user's input. In some embodiments, the user may believe that the current sensitivity level is too low or too high and wishes to adjust the sensitivity. The user's selection or input to adjust the sensitivity may be established as the biopotential-signal sensitivity need. In some embodiments, the user may be able to indicate that the user likes a certain sensitivity level they are experiencing at a certain point (currently or at another time) and wants to save their settings.

In some embodiments, the biopotential-signal sensitivity need may be determined based on a user's physiology. This may include user-specific factors, for example, skin-muscle-tissue physiologies of a user (which may lead to different biopotential signal transmission efficiencies and thus different resulted biopotential signals sensitivities). These physiologies may be adjusted or added by the user or may be sensed and determined by the system.

In some embodiments, the biopotential-signal sensitivity need may be determined based on a pre-determined sensitivity need. For example, one application may indicate that a low sensitivity need (e.g., 5%) is required to perform an action, but another application (or the system itself) may have a threshold for the lowest level of acceptable sensitivity (e.g., 10-15%) required to utilize the system with an acceptable user experience. In some embodiments, this pre-determined biopotential-signal sensitivity need may be higher or lower than the biopotential-signal sensitivity need that has been determined by other factors and the biopotential-signal sensitivity need would be selected accordingly. In some embodiments, the pre-determined sensitivity need may establish that a certain level of sensitivity (e.g., 99%) is too high and only allow sensitivity levels to rise above a particular sensitivity level (95%). This is shown, for example, in at least FIGS. 10-11.

(E4) In some embodiments of E1-E3, the provision of the first adjustment in accordance with the first sensitivity-stabilizing mode and the provision of the second adjustment in accordance with the second sensitivity-stabilizing mode is further determined based on at least one of: a profile of the wearer, the characteristic at the sensor-skin interface of the wearer, or input from the wearer.

The determination as to which sensitivity stabilization mode to use may depend on a variety of factors. For example, it may depend on one or more of the following factors: the biopotential-signal sensitivity need, a user's profile, the user's characteristic at the sensor-skin interface, or the user's input, among others.

In some embodiments, the sensitivity-stabilizing mode is determined based on the biopotential-signal sensitivity need. As discussed in this specification, the biopotential-signal sensitivity need may be determined based on a variety of factors. If the biopotential-signal sensitivity need is high (as an absolute value or in comparison to a user's characteristic at the sensor-skin interface), the system may determine that one sensitivity-stabilizing mode is preferable to another.

In some embodiments, the sensitivity-stabilizing mode is determined based on a user's profile. For example, the user may have the ability to configure settings such that the user wishes to use one sensitivity-stabilizing mode or the other in certain situations: e.g., always, never, when the sensitivity has to be changed more than a certain amount (e.g., 40%), for certain actions, applications, programs, etc.

In some embodiments, the sensitivity-stabilizing mode is determined based on a user's characteristic at the sensor-skin interface. For example, if the user's characteristic at the sensor-skin interface is far from, or close $t_0$, the biopotential-signal sensitivity need, one sensitivity-stabilizing mode may be used instead of another mode.

In some embodiments, the sensitivity-stabilizing mode is determined based on a user's input. For example, the system may ask the user whether the use wishes to use one mode or the other. Or the user may indicate that the sensitivity is too low and the system, in response to this input, will execute a sensitivity-stabilizing mode. This is shown, for example, in at least FIGS. 10-11.

(E5) In some embodiments of E1-E4, the characteristic at the sensor-skin interface is determined as a function of at least one of: impedance, skin temperature, skin electrode pressure, skin extracellular ionic concentration, or hair follicle size.

While the primary example described herein is that the characteristic is something that directly impacts sensing functions performed by the biopotential-signal sensor, e.g., the characteristic is an impedance value, numerous other examples are also contemplated, including skin hydration, skin temperature, skin-electrode pressure (how far is the electrode pushed into a user's skin), skin extracellular ionic concentration, and hair follicle size. Methods of providing adjustments (e.g., stimulations) may be the same as shown and described elsewhere, for example in at least FIGS. 1-4, 6.

(E6) In some embodiments of E1-E5, the characteristic at the sensor-skin interface is determined as a function of skin hydration.

Techniques for measuring or otherwise determining a biopotential-signal sensitivity level as a function of may be accomplished in a variety of ways. In some embodiments, the skin hydration is an impedance based hydration measurement, using, for example, direct current (DC) or low-frequency methods. In some embodiments, the hydration is a capacitance based hydration measurement using, for example, high-frequency methods. Example components that may be used in connection with this measurement, determination, estimation, etc. are shown, for example, in at least FIGS. 12A & 12B.

(E7) In some embodiments of E1-E6, the bipotential signals are one or more of electromyography (EMG), electroencephalography (EEG), or electrocardiography (EKG) signals. Methods of providing adjustments may be the same as shown and described elsewhere, for example in at least FIGS. 1-4, 6. Examples of adjustment (e.g., stimulation) generating components are shown in at least FIGS. 5, 7A, 12.

(E8) In some embodiments of E1-E7, while bipotential signals from the biopotential-signal sensor of the wearable device are used to determine gestures directed towards a third application, the method selects a third biopotential-signal sensitivity need for the third application. And, in accordance with selecting the third biopotential-signal sensitivity need for the third application, the method provides a third adjustment to the characteristic at the sensor-skin interface in accordance with a third sensitivity-stabilizing mode until the characteristic satisfies the third biopotential-signal sensitivity need.

In some embodiments, more than two applications are contemplated. Indeed a large number of applications could be utilized or take place over the course of a wearer's use. In some embodiments, a third application is utilized and a third biopotential-signal sensitivity need is selected. In accordance with this selection, a third adjustment is provided until the characteristic at the sensor-skin interface is within the third biopotential-signal sensitivity need. The third adjustment may be provided in accordance with the first or second sensitivity-stabilizing mode or may be made in accordance with a third sensitivity-stabilizing mode. This is shown, for example, in at least FIG. 10C.

(E9) In some embodiments of E1-E8, the first application and the second application are distinct.

As discussed elsewhere in this specification, in some embodiments, an application may constitute different software programs (e.g., a game like Temple Run v. Mini Golf v. video applications, etc.). In some embodiments, different applications may constitute different actions within a single software program (e.g., selecting large icons on a menu screen v. selecting smaller icons v. typing, etc.).

(E10) In some embodiments of E1-E9, the first application is a first action within a software program, and the second application is a second action within the software program.

(E11) In some embodiments of E1-E10, after the providing of the first adjustment or the second adjustment to the characteristic, further determining whether a sensitivity of the biopotential-signal sensor exceeds a sensitivity threshold. In accordance with the determination of whether the sensitivity of the biopotential-signal sensor exceeds the sensitivity threshold, adjust the sensitivity of the biopotential-signal sensor.

In some embodiments, achieving a lower sensitivity level for the sensing of biopotential signals may include at least reducing a sensitivity characteristic of the biopotential-signal sensor component. In some embodiments, if the sensitivity of a signal or sensor is too high, there may not be a need to direct further adjustments to reduce the impedance, hydration, or other aspects interfering with the sensitivity or reception of biopotential signals and the system may adjust (e.g., a downward adjustment) the sensitivity characteristic of the biopotential-signal sensor. In some embodiments, the system may direct an adjustment in accordance with a sensitivity stabilization mode in addition to adjusting the sensitivity of the biopotential-signal sensor. For example, the system may determine that the biopotential-signal sensor is consuming more power (and battery) than desired in order to detect a requisite biopotential signal from the user and that it would be advantageous to direct an adjustment to reduce interference and increase the sensitivity of the reception of a biopotential-signal from the user, but to lower a sensitivity characteristic of the sensor itself. It may also be advantageous to do this if, for example, the quality of the signal would be enhanced by executing a sensitivity stabilization mode and by reducing the sensitivity of the biopotential-signal sensor. This is shown, for example, in FIG. 10B.

(E12) In some embodiments of E1-E11, in accordance with providing the first adjustment to the characteristic at the sensor-skin interface in accordance with the first sensitivity-stabilizing mode until the characteristic satisfies the first biopotential-signal sensitivity need, the characteristic satisfies the first biopotential-signal sensitivity need in less than 5 seconds. In accordance with providing the second adjustment to the characteristic at the sensor-skin interface in accordance with the second sensitivity-stabilizing mode until the characteristic satisfies the second biopotential-signal sensitivity need, the characteristic satisfies the second biopotential-signal sensitivity need in less than 3 seconds.

In some embodiments, the sensitivity-stabilizing modes are effective within a certain time period. For example, the sensitivity-stabilizing mode is capable of adjusting a characteristic at the sensor-skin interface within a certain number of seconds (or milliseconds). In some embodiments, each stabilizing mode utilized by the method may be capable of satisfying the biopotential-signal sensitivity need within the same time period (e.g., 1 second, 5 s, 10 s, etc.). In some embodiments, the sensitivity-stabilizing modes may be capable of satisfying the biopotential-signal sensitivity need within different time periods—e.g., one mode within 5 seconds, another within 1 second or 3 seconds. Other combinations are contemplated. For example, the first sensitivity-stabilizing mode may require more time to satisfy the first biopotential-signal sensitivity need, and the second sensitivity-stabilizing mode may require less time (because the adjustment made by the first sensitivity-stabilizing mode was larger than the adjustment that needs to be achieved by the second sensitivity-stabilizing mode). In some embodiments, the opposite may also be true (the second mode may require less time than the first mode because the first adjustment was small and the second adjustment (e.g., that may be made during gameplay when a certain action is required) is larger). This is shown, for example, in at least FIGS. 1-4 and 10-11.

(E13) In some embodiments of E1-E12, if the second sensitivity-stabilizing mode receives no input from the wearer within a pre-determined time period, the second sensitivity-stabilizing mode will provide the second adjustment at the sensor-skin interface without input from the wearer until either: the characteristic satisfies the second biopotential-signal sensitivity need or input is received from the wearer.

In some embodiments, the on-demand mode may also include a sub-mode that operates similar to the autonomous mode (or to a semi-autonomous mode). In some embodiments, the on-demand mode may begin and provide an adjustment and request that the user provide input regarding the sensitivity, adjustment, or other aspects of the sensitivity-stabilizing mode. In some circumstances, the user may not provide input to the system after one or more adjustments. This may be for a variety of reasons, for example, the user may not wish to be involved in the sensitivity-stabilization process and refuse to provide feedback or input. Instead of engaging in a standoff between the sensitivity-stabilization mode and the wearer, the sensitivity-stabilization mode may revert to an alternative sensitivity-stabilization mode or sub-mode such that the adjustment is provided without user input.

The decision to provide an adjustment without user input may be based on a variety of factors. In some embodiments, for example, there may be a time limit—e.g. 10 s—within which the user may provide input. If no input is received, the sensitivity-stabilization mode will perform the adjustment and stabilization process without user input. In some embodiments, it may be software program or action specific. For example, if the user is using an application where having the requisite level of sensitivity is deemed less important than interrupting the user, the time limit may be shorter—e.g., 3-5 seconds. For example, if the user is watching a live sporting event and the notification appears to engage in the on-demand sensitivity enhancement mode because the user wishes to use their hands while watching the sporting event (e.g., golf, bike racing, Formula 1 racing, hockey, etc.), the time period for requesting user input may be shorter than another application if the uninterrupted and unobstructed viewing is deemed to be more important than user input in the sensitivity-stabilization mode. In some embodiments, the time period may be adjusted based on a pre-set user setting where the user has indicated to allow for a certain amount of time to pass for providing input. In some embodiments, it may be based on the deviation of the current characteristic from the need. For example, if the deviation of the current state from the biopotential-signal sensitivity need is large, the time limit for input may be larger (e.g., 15 seconds) than if the deviation is small (e.g., the time limit may instead be 5 seconds).

In some embodiments, the on-demand mode may request user input (e.g., acknowledging sensitivity adjustment will begin, asking for the level of adjustment desired, etc.) before providing and adjustment. For example, the system may request that the user acknowledge that the on-demand sensitivity-stabilization mode is about to proceed. If the user does not respond to this query within a certain period, the system may instead utilize the autonomous sensitivity-stabilization mode (or sub-mode of the on-demand mode).

In some embodiments, the on-demand mode may utilize autonomous adjustment until a certain stopping event is reached. In some embodiments, a stopping event would be that the biopotential-signal sensitivity need has been reached. In some embodiments, the user may be able to interrupt or provide input on sensitivity while the autonomous adjustments are taking place, in which case the on-demand mode may pause the application of adjustments and wait for the user's input. In such a case, the system may implement a longer delay period for user inputs—e.g., in an embodiment where the system waited 10 seconds, did not receive an input, began the autonomous provision of adjustments, and then the user provided input 2 seconds later, the system may increase the waiting time period for user input (e.g., to 13 seconds, 15 seconds, etc.). This is shown, for example, in at least FIGS. 10B and 10C.

(E14) In some embodiments of E1-E13, the first sensitivity-stabilizing mode and the second sensitivity-stabilizing mode are distinct. In some embodiments, one sensitivity-stabilizing mode will be used to provide all adjustments to the characteristic. In some embodiments, at least two different sensitivity-stabilizing modes will be used. This is shown, for example, in at least FIGS. 10-11.

(E15) In some embodiments of E1-E14, while bipotential signals from a second biopotential-signal sensor of a wearable device are used to determine gestures directed towards a third application, select a third biopotential-signal sensitivity need for the third application, the second biopotential-signal sensor being in contact with skin of the wearer at a second sensor-skin interface. In accordance with selecting the third biopotential-signal sensitivity need for the third application, provide a third adjustment to a second characteristic at the second sensor-skin interface in accordance with a third sensitivity-stabilizing mode until the second characteristic satisfies the third biopotential-signal sensitivity need. In some embodiments, the first biopotential-signal sensor and the second biopotential-signal sensor are distinct. In some embodiments, the first sensor-skin interface and the second sensor-skin interface are distinct. In some embodiments, the first biopotential-signal sensitivity need, the second biopotential-signal sensitivity need, and the third biopotential-signal sensitivity need are distinct.

In some embodiments, more than one biopotential-signal sensor is contemplated and utilized in the method and wearable device, as discussed elsewhere in this specification. A second (or third, fourth, etc.) biopotential-signal sensor may be in contact with the user's skin and have a sensor-skin interface that is distinct from the interface of the first sensor and further have a characteristic that is different than the characteristic of the first biopotential-signal sensor's sensor-skin interface.

In some embodiments, the third adjustment may utilize a sensitivity-stabilizing mode that is the same as either the first or second sensitivity-stabilizing mode. In some embodiments, the third sensitivity-stabilizing mode is different than both the first and second sensitivity-stabilizing modes. In some embodiments, the biopotential-signal sensitivity needs may also be different or may be the same as the first and second biopotential-signal sensitivity needs.

In some embodiments, the adjustments made to the second biopotential-signal sensor may be provided at the same or different times as the adjustments being made to the first biopotential-signal sensor. In some embodiments, the system could utilize different adjustment modes at different sensors. For example, the method may utilize an autonomous mode for the first sensor, but utilize an on-demand mode for the second sensor. This may be useful in a situation where, for example, the characteristic of the first sensor is close (e.g., within 10% of) to the biopotential-signal sensitivity need and the characteristic of the second sensor is not close (e.g., more than 35% away from) to the biopotential-signal need for the second sensor. This may be a result of many factors, for example, that one sensor is not seated correctly, is in a location where the sensor is not close to the related nerve, muscle, etc., or otherwise. As another non-limiting example, it could also be a result of the first sensor being associated with a nerve, muscle, etc. where the biopotential-signal sensitivity need is lower because the action being performed does not require sensitive sensing of that corresponding nerve, muscle, etc. but the second sensor is associated with a nerve, muscle, etc. that corresponds to a movement that does require a high biopotential-signal sensitivity need. For example, if the first sensor is associated with a nerve that corresponds to elbow movement, but the reason for the need for increased sensitivity is for typing or utilizing a cell phone (where sensitive elbow movement is not as important as sensitive finger movement), the adjustments made at the first and second sensors may be made according to different sensitivity-stabilizing modes.

In some embodiments, the adjustments could be provided to a first sensor-skin interface according to one sensitivity-stabilizing mode at the same time that separate adjustments are being provided to a second sensor-skin interface according to a second sensitivity-stabilizing mode. In some embodiments, the system may provide the adjustments at different times. This is shown, for example, in at least FIG. 10D.

(E16) In some embodiments of E1-E15, the first adjustment or second adjustment to the first characteristic at the first sensor-skin interface is provided at the same time as the third adjustment to the second characteristic at the second sensor-skin interface.

(F1) Another aspect example described herein is a non-transitory, computer-readable storage medium including instructions that, when executed by a wrist-wearable device, cause the wrist-wearable device to perform or cause performance of the method of embodiments E1-E16.

(G1) Another aspect example described herein is a wrist-wearable device, the wrist-wearable configured to perform or cause performance of the method of embodiments E1-E16.

(H1) Another aspect example described herein is a system including a wrist-wearable device and a head-worn device (e.g., augmented-reality glasses or a virtual-reality headset), the system configured to present user interfaces via the head-worn device, the wrist-wearable configured to perform or cause performance of the method of embodiments E1-E16.

(I1) Another aspect example described herein is a wrist-wearable device for sensing neuromuscular signals that includes a first sensing means of a wearable means configured for sensing bipotential signals used to determine gestures directed towards a first application, the sensing means configured to be in contact with skin of a wearer of the wearable means at a first sensor-skin interface. The wrist-wearable device further includes processing means configured for selecting a first biopotential-signal sensitivity need for the first application. The wrist-wearable device further includes adjustment means configured for, in accordance with selecting the first biopotential-signal sensitivity need for the first application, providing a first adjustment to a first characteristic at the sensor-skin interface in accordance with a first sensitivity-stabilizing mode. The sensing means is further configured for sensing bipotential signals used to determine gestures directed towards a second application. The processing means is further configured for selecting a second biopotential-signal sensitivity need for the second application. The adjustment means is further configured for, in accordance with selecting the second biopotential-signal sensitivity need for the second application, providing a second adjustment to a second characteristic at the sensor-skin interface in accordance with a second sensitivity-stabilizing mode. In some embodiments, the first biopotential-signal sensitivity need and the second biopotential-signal sensitivity need are distinct.

(J1) In some embodiments, a wrist-wearable device is configured to perform or cause performance of a method including sensing, via a plurality of biopotential-signal sensors, biopotential signals of a user. Each respective biopotential-signal sensor is configured to contact a user's skin at a respective sensor-skin interface. The method includes directing, via a first impedance-stabilizing component associated with at least a first biopotential-signal sensor, a stimulation to a first sensor-skin interface associated with the first biopotential-signal sensor until an impedance value at the first sensor-skin interface is within a first desired range. The stimulation is compliant with a predefined safety standard. The method further includes directing, via a second impedance-stabilizing component associated with at least a second biopotential-signal sensor, another stimulation to a second sensor-skin interface, distinct from the first sensor-skin interface, associated with the second biopotential-signal sensor until an impedance value at the second sensor-skin interface is within a second desired range. The other stimulation is compliant with the predefined safety standard.

(K1) Another aspect example described herein is a non-transitory, computer-readable storage medium including instructions that, when executed by a wrist-wearable device, cause the wrist-wearable device to perform or cause performance of the method of embodiment J1.

(L1) Another aspect example described herein is a means for performing or causing performance of the method of embodiment J1.

(M1) Another aspect example described herein is a system including a wrist-wearable device and a head-worn device, the system configured to perform or cause performance of the method of embodiment J1.

What is claimed is:

1. A wrist-wearable device for sensing biopotential signals comprising:
   a plurality of biopotential-signal sensors, each respective biopotential-signal sensor configured to contact a user's skin at a respective sensor-skin interface and further configured to sense biopotential signals of the user;
   a first impedance-stabilizing component associated with at least a first biopotential-signal sensor of the plurality of biopotential-signal sensors, the first impedance-stabilizing component configured to direct a stimulation to a first sensor-skin interface associated with the first biopotential-signal sensor until an impedance value at the first sensor-skin interface is within a first desired range, the stimulation being compliant with a predefined safety standard; and
   a second impedance-stabilizing component associated with at least a second biopotential-signal sensor of the plurality of biopotential-signal sensors, the second impedance-stabilizing component configured to direct another stimulation to a second sensor-skin interface, distinct from the first sensor-skin interface, associated with the second biopotential-signal sensor until an impedance value at the second sensor-skin interface is within a second desired range, the other stimulation being compliant with the predefined safety standard.

2. The wrist-wearable device of claim 1, further comprising:
   circuitry configured for detecting that the wrist-wearable device has been worn by the user;
   the first impedance-stabilizing component further configured to direct the stimulation as a result of the circuitry detecting that the wrist-wearable device has been worn; and
   the second impedance-stabilizing component further configured to direct the other stimulation as a result of the circuitry detecting that the wrist-wearable device has been worn.

3. The wrist-wearable device of claim 1, wherein:
   the first impedance-stabilizing component is further configured to direct the stimulation to the first sensor-skin interface associated with the first biopotential-signal sensor for no more than a particular duration of time; and
   the second impedance-stabilizing component is configured to direct the stimulation to the second sensor-skin interface associated with the second biopotential-signal sensor for no more than the particular duration of time.

4. The wrist-wearable device of claim 1, further comprising:
   a plurality of electrodes;
   a first impedance monitor configured to determine the impedance value at the first sensor-skin interface;
   a second impedance monitor configured to determine the impedance value at the second sensor-skin interface;
   wherein the first impedance monitor, the first impedance-stabilizing component, and the first biopotential-signal sensor are within a first electrode of the plurality of electrodes; and
   wherein the second impedance monitor, the second impedance-stabilizing component, and the second biopotential-signal sensor are within a second electrode of the plurality of electrodes.

5. The wrist-wearable device of claim 1, further comprising:
   circuitry configured for learning at least one characteristic of the user;
   the circuitry further configured for storing the at least one characteristic of the user; and
   wherein the first and second impedance-stabilizing components are further configured to direct respective stimulations based on at least one stored characteristic of the user.

6. The wrist-wearable device of claim 1, wherein:
   the first impedance-stabilizing component is further configured to direct the stimulation for a certain time period; and
   the certain time period being within a range of 1 millisecond to 60 seconds.

7. The wrist-wearable device of claim 1, wherein:
   the first impedance-stabilizing component is further configured to measure one or more properties of the first impedance-stabilizing component;
   the first impedance-stabilizing component is further configured to determine stimulation parameters from the measured properties and from at least one stored characteristic of the user; and
   the first impedance-stabilizing component is further configured to direct a stimulation based on the determination.

8. The wrist-wearable device of claim 1, wherein:
   the first impedance-stabilizing component being configured to direct the stimulation to the first sensor-skin interface associated with the first biopotential-signal sensor until the impedance value at the first sensor-skin interface is within the first desired range includes the impedance-stabilizing component being configured to direct a first stimulation with a first value for a stimulation characteristic at the first sensor-skin interface;
   an impedance monitor configured to, after the first stimulation, measure or estimate a first impedance value at the first sensor-skin interface; and
   the first impedance-stabilizing component being further configured to, after the measurement or estimation of the first impedance value at the first sensor-skin interface, apply a second stimulation with a second value for the stimulation characteristic, the second value being distinct from the first value.

9. A method comprising:
   at a wrist-wearable device including a plurality of biopotential-signal sensors:
   sensing, via the plurality of biopotential-signal sensors, biopotential signals of a user, each respective biopotential-signal sensor configured to contact a user's skin at a respective sensor-skin interface; and
   directing, via a first impedance-stabilizing component associated with at least a first biopotential-signal sensor, a stimulation to a first sensor-skin interface associated with the first biopotential-signal sensor until an impedance value at the first sensor-skin interface is within a first desired range, the stimulation being compliant with a predefined safety standard; and directing, via a second impedance-stabilizing component associated with at least a second biopotential-signal sensor, another stimulation to a second sensor-skin interface associated with the second biopotential-signal sensor until an impedance value at the second sensor-skin interface is within a second desired range, the other stimulation being compliant with the predefined safety standard.

10. The method of claim 9, further comprising:
directing the stimulation to the first sensor-skin interface associated with the first biopotential-signal sensor for no more than a particular duration of time; and
directing the stimulation to the second sensor-skin interface associated with the second biopotential-signal sensor for no more than the particular duration of time.

11. The method of claim 9, further comprising:
detecting, via circuitry, that the wrist-wearable device has been worn by the user;
directing, via the first impedance-stabilizing component, the stimulation as a result of the circuitry detecting that the wrist-wearable device has been worn;
directing, via the second impedance-stabilizing component, the other stimulation as a result of the circuitry detecting that the wrist-wearable device has been worn.

12. The method of claim 9, wherein:
the first impedance-stabilizing component is further configured to direct the stimulation to the first sensor-skin interface associated with the first biopotential-signal sensor for no more than a particular duration of time; and
the second impedance-stabilizing component is configured to direct the stimulation to the second sensor-skin interface associated with the second biopotential-signal sensor for no more than the particular duration of time.

13. The method of claim 9, further comprising:
learning, via circuitry, at least one characteristic of the user;
storing, via the circuitry, the at least one characteristic of the user; and
directing, via the first and second impedance-stabilizing components, respective stimulations based on at least one stored characteristic of the user.

14. The method of claim 9, wherein:
the first impedance-stabilizing component is further configured to direct the stimulation for a certain time period; and
the certain time period being within a range of 1 millisecond to 60 seconds.

15. A non-transitory, computer-readable storage medium including instructions that, when executed by a wrist-wearable device, cause the wrist-wearable device to perform or cause performance of:
sensing, via a plurality of biopotential-signal sensors, biopotential signals of a user, each respective biopotential-signal sensor configured to contact the user's skin at a respective sensor-skin interface; and
directing, via a first impedance-stabilizing component associated with at least a first biopotential-signal sensor, a stimulation to a first sensor-skin interface associated with the first biopotential-signal sensor until an impedance value at the first sensor-skin interface is within a first desired range, the stimulation being compliant with a predefined safety standard directing, via a second impedance-stabilizing component associated with at least a second biopotential-signal sensor, another stimulation to a second sensor-skin interface, distinct from the first sensor-skin interface, associated with the second biopotential-signal sensor until an impedance value at the second sensor-skin interface is within a second desired range, the other stimulation being compliant with the predefined safety standard.

16. The non-transitory, computer-readable storage medium of claim 15, wherein the instructions, when executed by the wrist-wearable device, further cause the wrist-wearable device to perform or cause performance of:
directing the stimulation to the first sensor-skin interface associated with the first biopotential-signal sensor for no more than a particular duration of time; and
directing the stimulation to the second sensor-skin interface associated with the second biopotential-signal sensor for no more than the particular duration of time.

17. The non-transitory, computer-readable storage medium of claim 15, wherein the instructions, when executed by the wrist-wearable device, further cause the wrist-wearable device to perform or cause performance of:
determining an impedance value at a first monitor-skin interface associated with the first biopotential-signal sensor, or the first impedance-stabilizing component, or both, wherein the first monitor-skin interface is distinct from the first sensor-skin interface; and
determining an impedance value at a second monitor-skin interface associated with the second biopotential-signal sensor, or the second impedance-stabilizing component, or both, wherein the second monitor-skin interface is distinct from the second sensor-skin interface; and
wherein each respective impedance monitor is different from each respective biopotential-signal sensor and different from each respective impedance-stabilizing component.

18. The non-transitory, computer-readable storage medium of claim 15, wherein the instructions, when executed by the wrist-wearable device, further cause the wrist-wearable device to perform or cause performance of:
detecting, via circuitry, that the wrist-wearable device has been worn by the user;
directing, via the first impedance-stabilizing component, the stimulation as a result of the circuitry detecting that the wrist-wearable device has been worn;
directing, via the second impedance-stabilizing component, the other stimulation as a result of the circuitry detecting that the wrist-wearable device has been worn.

19. The non-transitory, computer-readable storage medium of claim 15, wherein:
the first impedance-stabilizing component is further configured to direct the stimulation to the first sensor-skin interface associated with the first biopotential-signal sensor for no more than a particular duration of time; and
the second impedance-stabilizing component is configured to direct the stimulation to the second sensor-skin interface associated with the second biopotential-signal sensor for no more than the particular duration of time.

20. The non-transitory, computer-readable storage medium of claim 15, wherein:

the first impedance-stabilizing component is further configured to direct the stimulation for a certain time period; and the certain time period being within a range of 1 millisecond to 60 seconds.

* * * * *